(12) United States Patent
Machida

(10) Patent No.: US 11,474,333 B2
(45) Date of Patent: Oct. 18, 2022

(54) ZOOM OPTICAL SYSTEM, OPTICAL APPARATUS AND IMAGING APPARATUS USING THE ZOOM OPTICAL SYSTEM, AND METHOD FOR MANUFACTURING THE ZOOM OPTICAL SYSTEM

(71) Applicant: Nikon Corporation, Tokyo (JP)

(72) Inventor: Kosuke Machida, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 385 days.

(21) Appl. No.: 16/345,034

(22) PCT Filed: Nov. 21, 2016

(86) PCT No.: PCT/JP2016/084392
§ 371 (c)(1),
(2) Date: Aug. 2, 2019

(87) PCT Pub. No.: WO2018/092292
PCT Pub. Date: May 24, 2018

(65) Prior Publication Data
US 2019/0361210 A1 Nov. 28, 2019

(51) Int. Cl.
*G02B 15/14* (2006.01)
*G02B 15/20* (2006.01)
*G02B 27/64* (2006.01)

(52) U.S. Cl.
CPC ........... *G02B 15/145121* (2019.08); *G02B 15/1451* (2019.08); *G02B 15/145105* (2019.08);
(Continued)

(58) Field of Classification Search
CPC ............ G02B 15/1441; G02B 15/1451; G02B 15/20; G02B 27/646; G02B 15/145121; G02B 15/145105; G02B 15/144105
(Continued)

(56) References Cited

U.S. PATENT DOCUMENTS 5,748,383 A * 5/1998 Ohtake .......... G02B 15/145113
359/764
6,031,669 A * 2/2000 Ohtake .......... G02B 15/144105
359/687
(Continued)

FOREIGN PATENT DOCUMENTS

CN  108292027 A  7/2018
JP  04-293007 A  10/1992
(Continued)

OTHER PUBLICATIONS

Lowepro Lens Case, https://www.amazon.com/Lowepro-Lens-Case-11-Black/dp/B004KJE8GY/ref=zg_bs_3346101_48?_encoding=UTF8&psc=1&refRID=R9H1HPTTMXGF3C5A563E (Year: 2012).*
(Continued)

*Primary Examiner* — George G. King
(74) *Attorney, Agent, or Firm* — SGPatents PLLC

(57) ABSTRACT

A zoom optical system (ZL) comprises, in order from an object: a first lens group (G1) having a positive refractive power; a second lens group (G2) having a negative refractive power; a third lens group (G3) having a positive refractive power; and a subsequent lens group (GR), wherein upon zooming, a distance between the first lens group (G1) and the second lens group (G2) changes, a distance between the second lens group (G2) and the third lens group (G3) changes, and a distance between the third lens group (G3) and the subsequent lens group (GR) changes, the subsequent lens group (GR) comprises a focusing lens group that moves upon focusing, and following conditional expressions are satisfied, $3.70 < f1/(-f2) < 5.00$, $3.20 < f1/f3 < 5.00$, where f1: a focal length of the first lens group (G1), f2: a focal length of the second lens group (G2), and f3: a focal length of the third lens group (G3).

14 Claims, 44 Drawing Sheets

(52) U.S. Cl.
CPC ........... *G02B 15/20* (2013.01); *G02B 27/646* (2013.01); *G02B 15/1441* (2019.08); *G02B 15/144105* (2019.08)

(58) Field of Classification Search
USPC ......... 359/686–688, 763, 764, 766, 771–774
See application file for complete search history.

(56) References Cited

U.S. PATENT DOCUMENTS

| | | | | |
|---|---|---|---|---|
| 2001/0006432 | A1* | 7/2001 | Ohtake | G02B 15/144105 359/686 |
| 2001/0046383 | A1* | 11/2001 | Hagimori | G02B 15/144105 396/72 |
| 2009/0174952 | A1* | 7/2009 | Satori | G02B 15/145121 359/683 |
| 2011/0157719 | A1* | 6/2011 | Yoneyama | G02B 15/144113 359/684 |
| 2011/0205636 | A1* | 8/2011 | Ito | G02B 27/646 359/683 |
| 2011/0261250 | A1 | 10/2011 | Touchi et al. | |
| 2011/0292252 | A1* | 12/2011 | Mihara | G02B 15/144105 348/240.1 |
| 2012/0019931 | A1* | 1/2012 | Ogata | G02B 15/144105 359/684 |
| 2012/0242887 | A1 | 9/2012 | Matsumura et al. | |
| 2012/0307367 | A1* | 12/2012 | Bito | G02B 15/145129 359/557 |
| 2013/0335617 | A1 | 12/2013 | Imaoka et al. | |
| 2014/0184856 | A1* | 7/2014 | Iwasawa | G02B 15/1461 348/240.99 |
| 2014/0333821 | A1 | 11/2014 | Hagiwara | |
| 2014/0375844 | A1* | 12/2014 | Matsumura | G02B 15/14 359/557 |
| 2016/0349491 | A1* | 12/2016 | Suzuki | G02B 27/646 |
| 2017/0184824 | A1* | 6/2017 | Bito | G02B 15/1461 |
| 2017/0329112 | A1* | 11/2017 | Koga | G02B 15/145113 |
| 2018/0341091 | A1 | 11/2018 | Machida | |

FOREIGN PATENT DOCUMENTS

| | | | | |
|---|---|---|---|---|
| JP | 2006-106111 | A | 4/2006 | |
| JP | 2009-163066 | A | 7/2009 | |
| JP | 2011-232543 | A | 11/2011 | |
| JP | 2012-212106 | A | 11/2012 | |
| JP | 2013-235218 | A | 11/2013 | |
| JP | 2014-016601 | A | 1/2014 | |
| JP | 2014-219616 | A | 11/2014 | |
| JP | 2015069040 | * | 4/2015 | ............. G02B 15/20 |
| JP | 5907800 | B2 | 4/2016 | |
| JP | 2017120382 | * | 7/2017 | ......... G02B 15/1461 |
| WO | WO-2015075904 | A1 * | 5/2015 | ............. G02B 15/14 |

OTHER PUBLICATIONS

Office Action from Japanese Patent Application No. 2018-550985, dated Feb. 4, 2020.
English Translation of International Search Report from International Patent Application No. PCT/JP2016/084392, dated Jan. 31, 2017.
English Translation of International Preliminary Report on Patentability from International Patent Application No. PCT/JP2016/084392, dated May 31, 2019.
Decision of Refusal dated Apr. 28, 2020, in Japanese Patent Application No. 2018-550985.
Office Action dated Oct. 12, 2020, in Chinese Patent Application No. 201680090865.9.
Office Action dated Jun. 4, 2021, in Chinese Patent Application No. 201680090865.9.

* cited by examiner

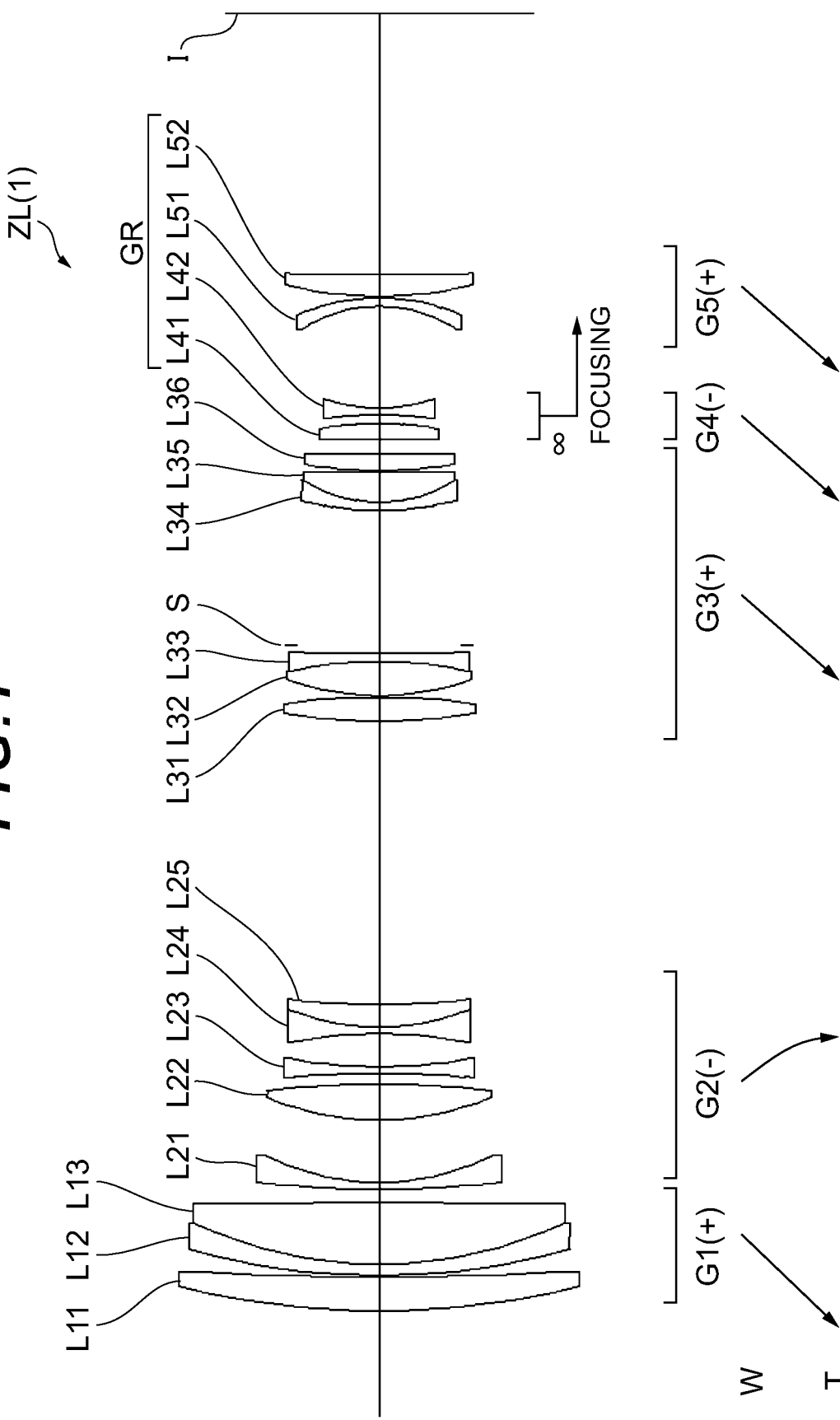

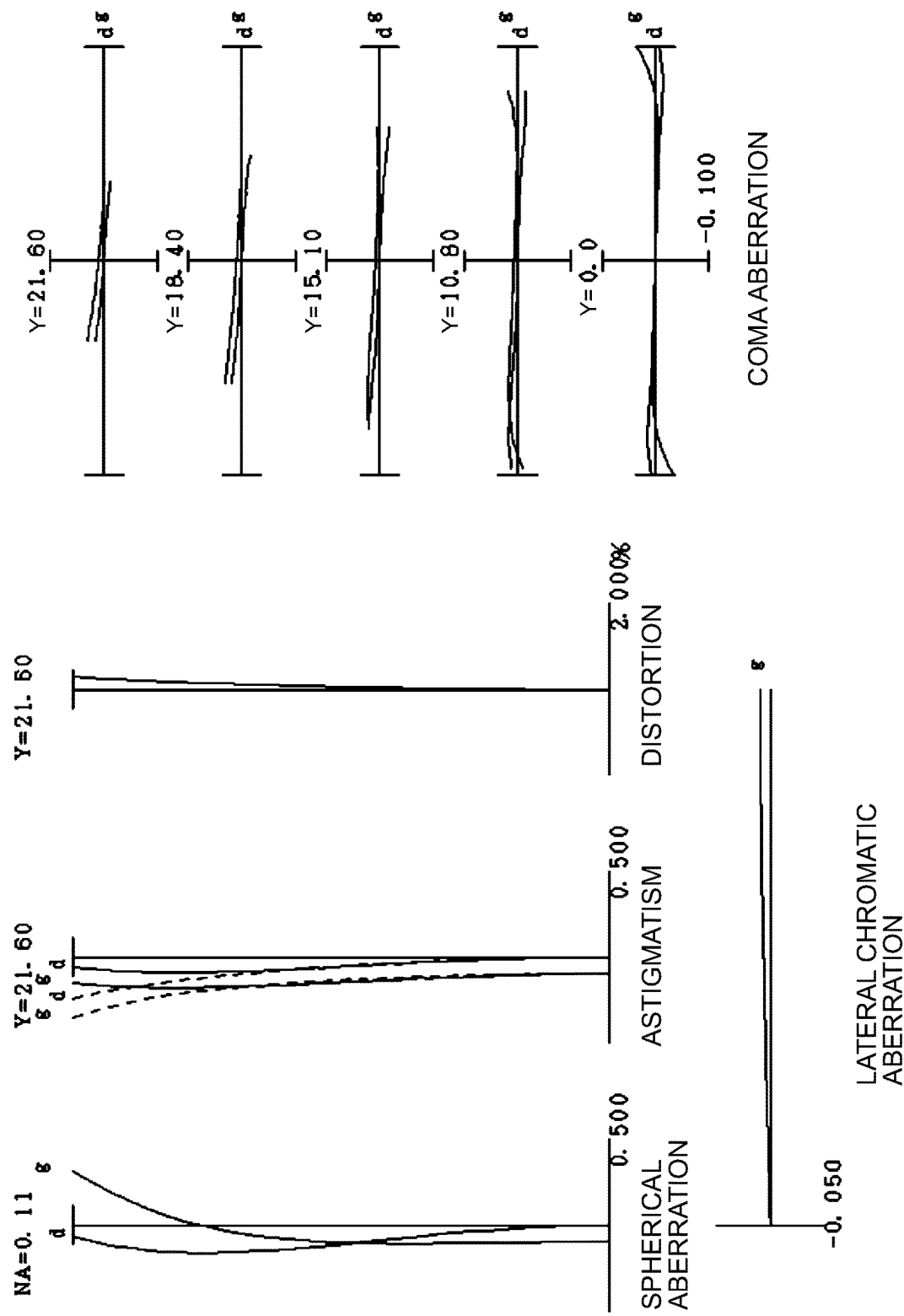

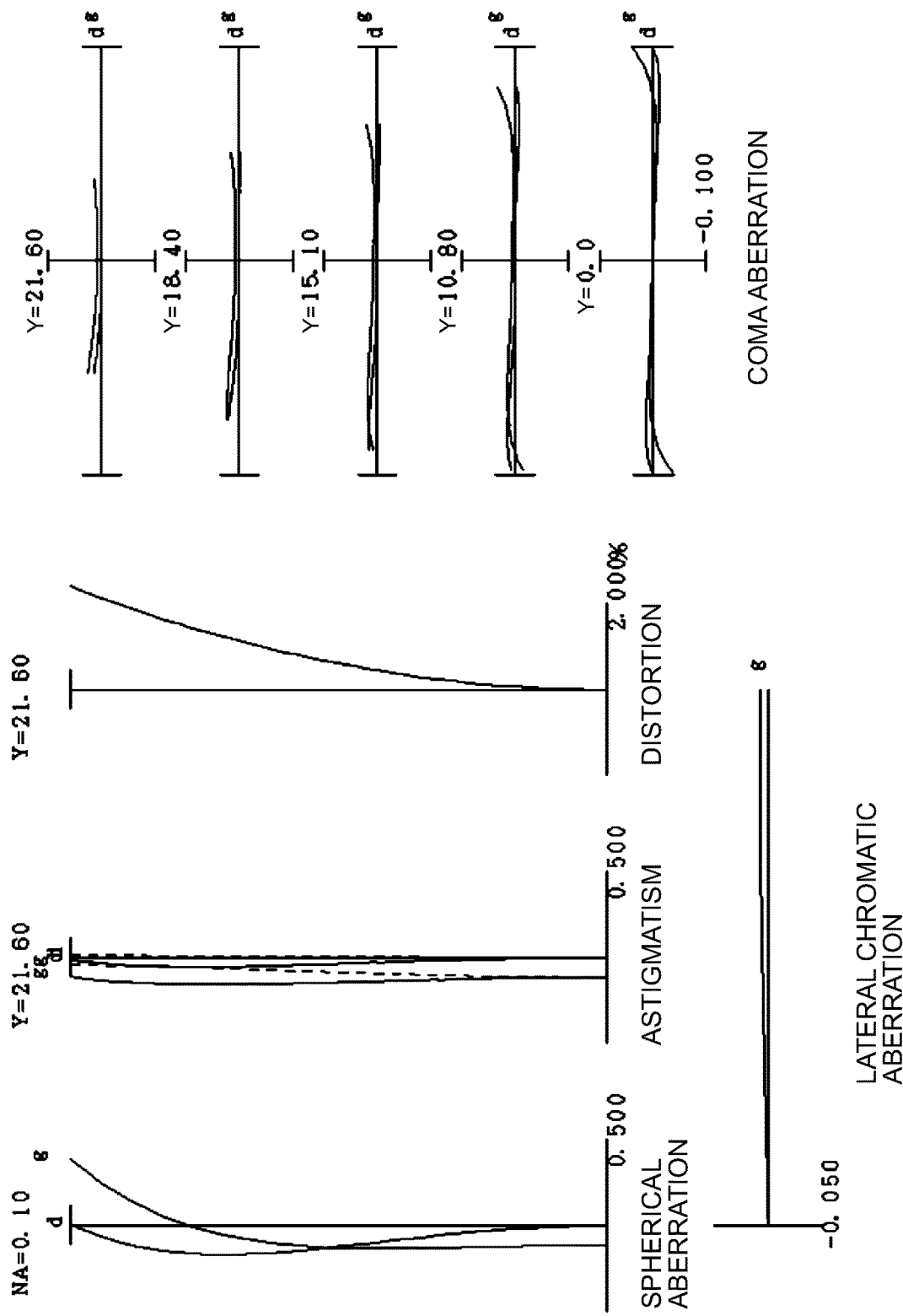

COMA ABERRATION

COMA ABERRATION

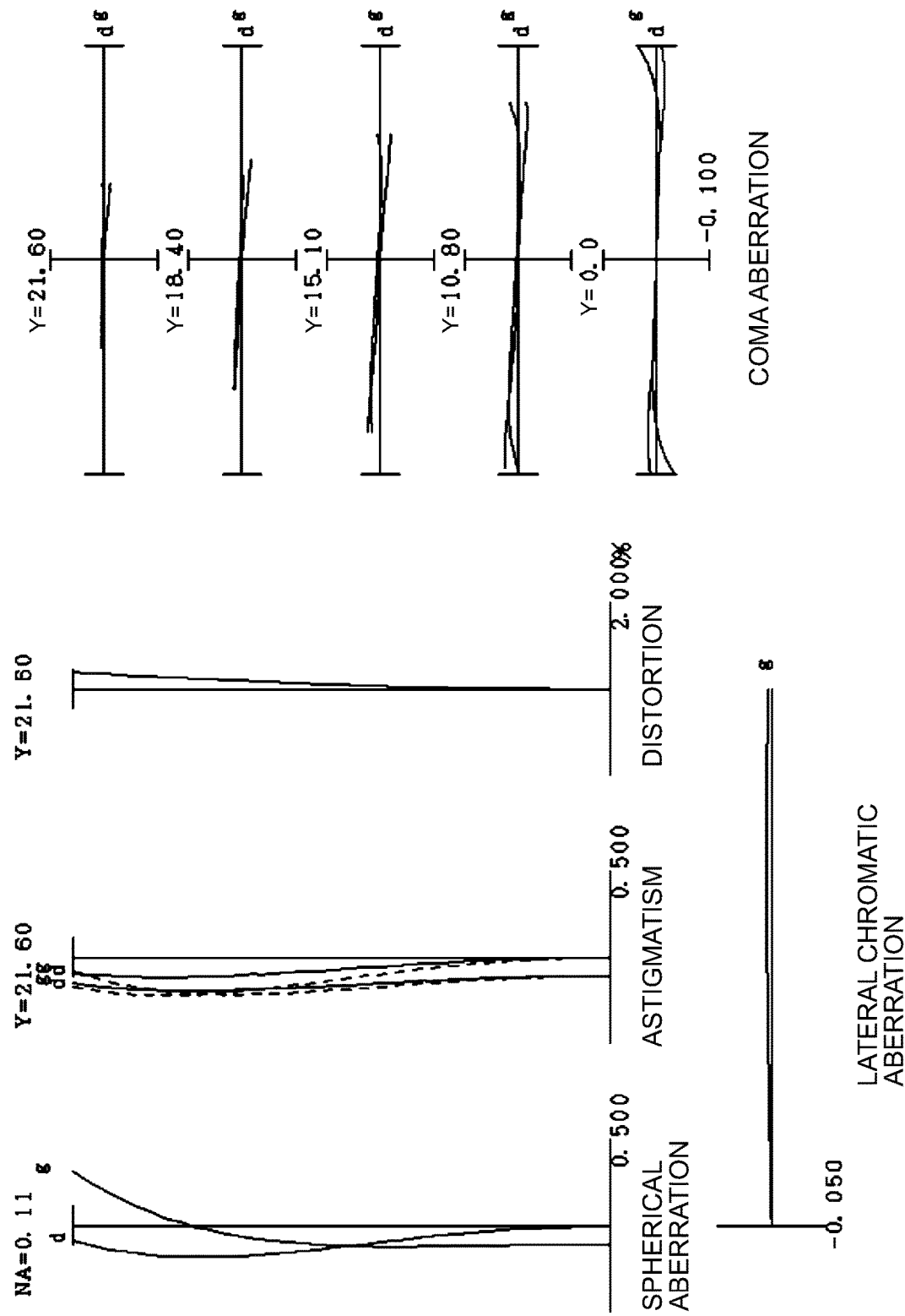

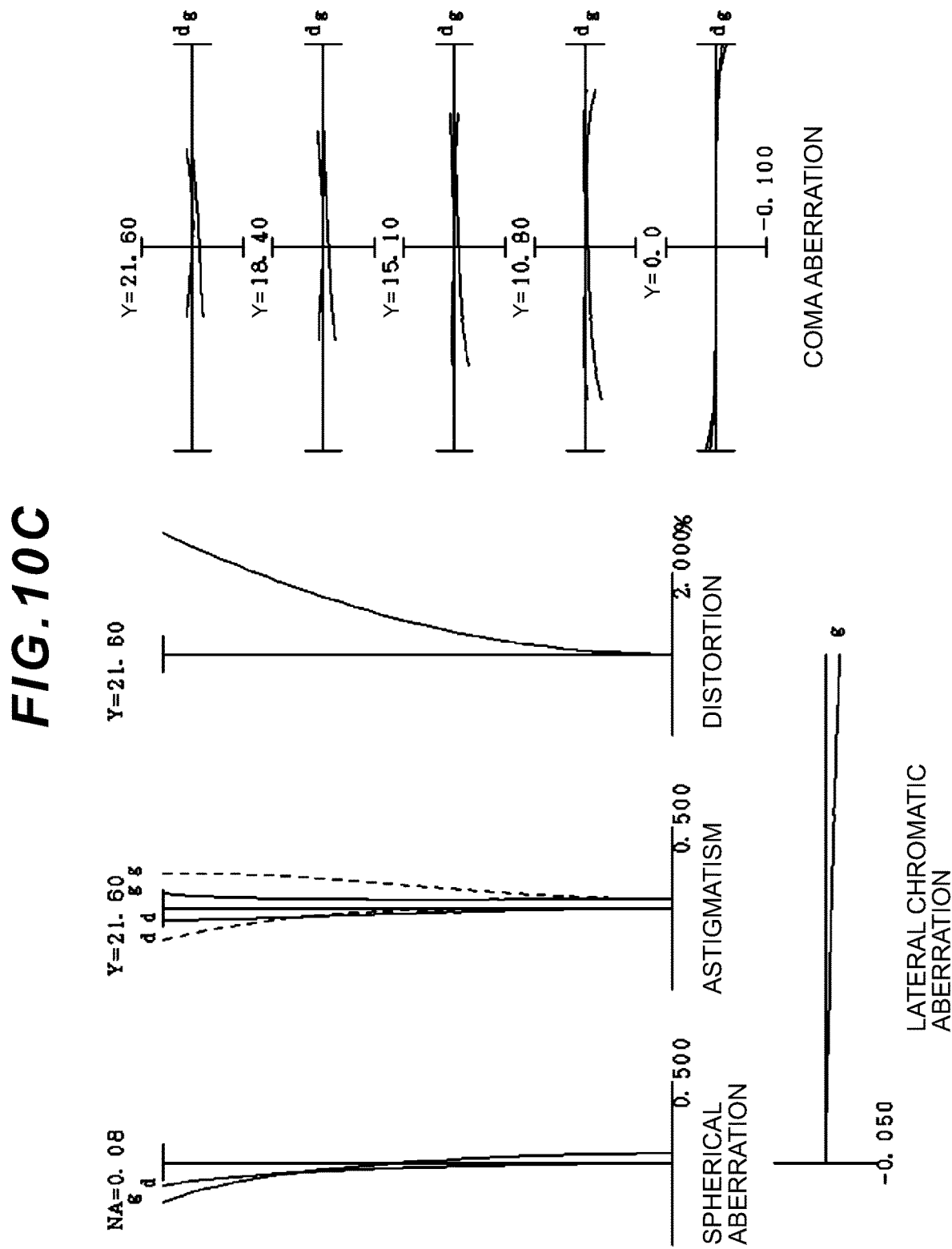

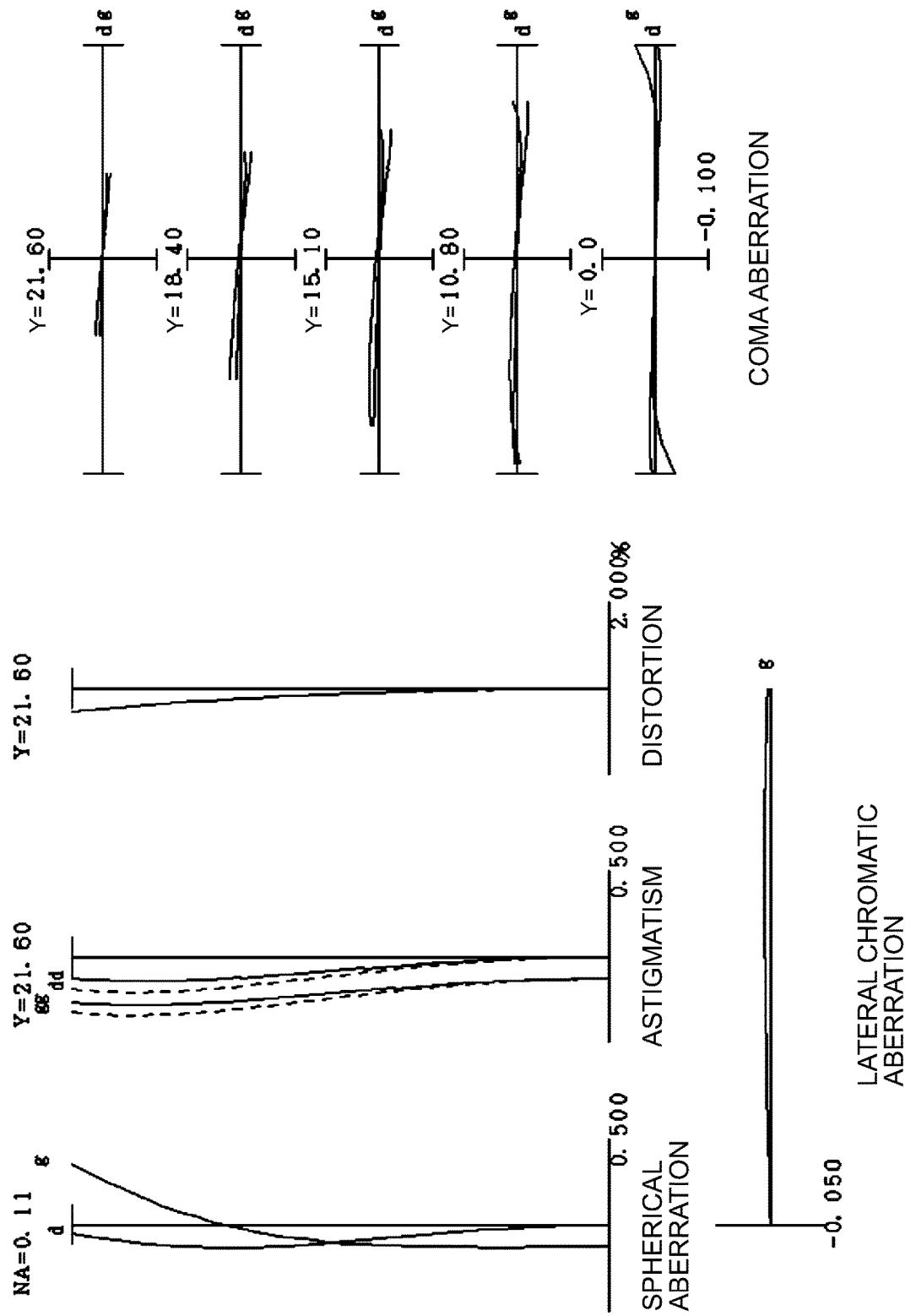

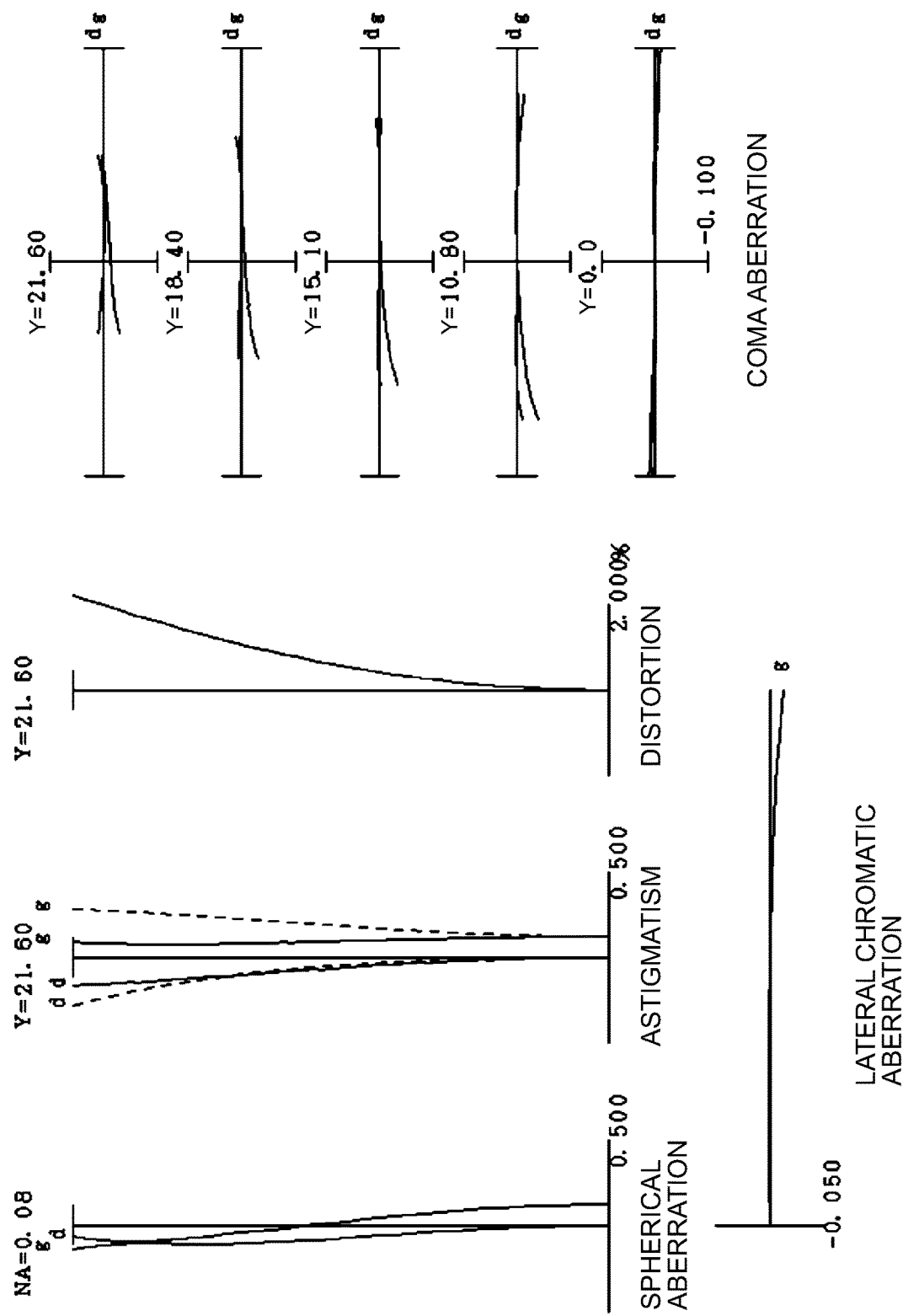

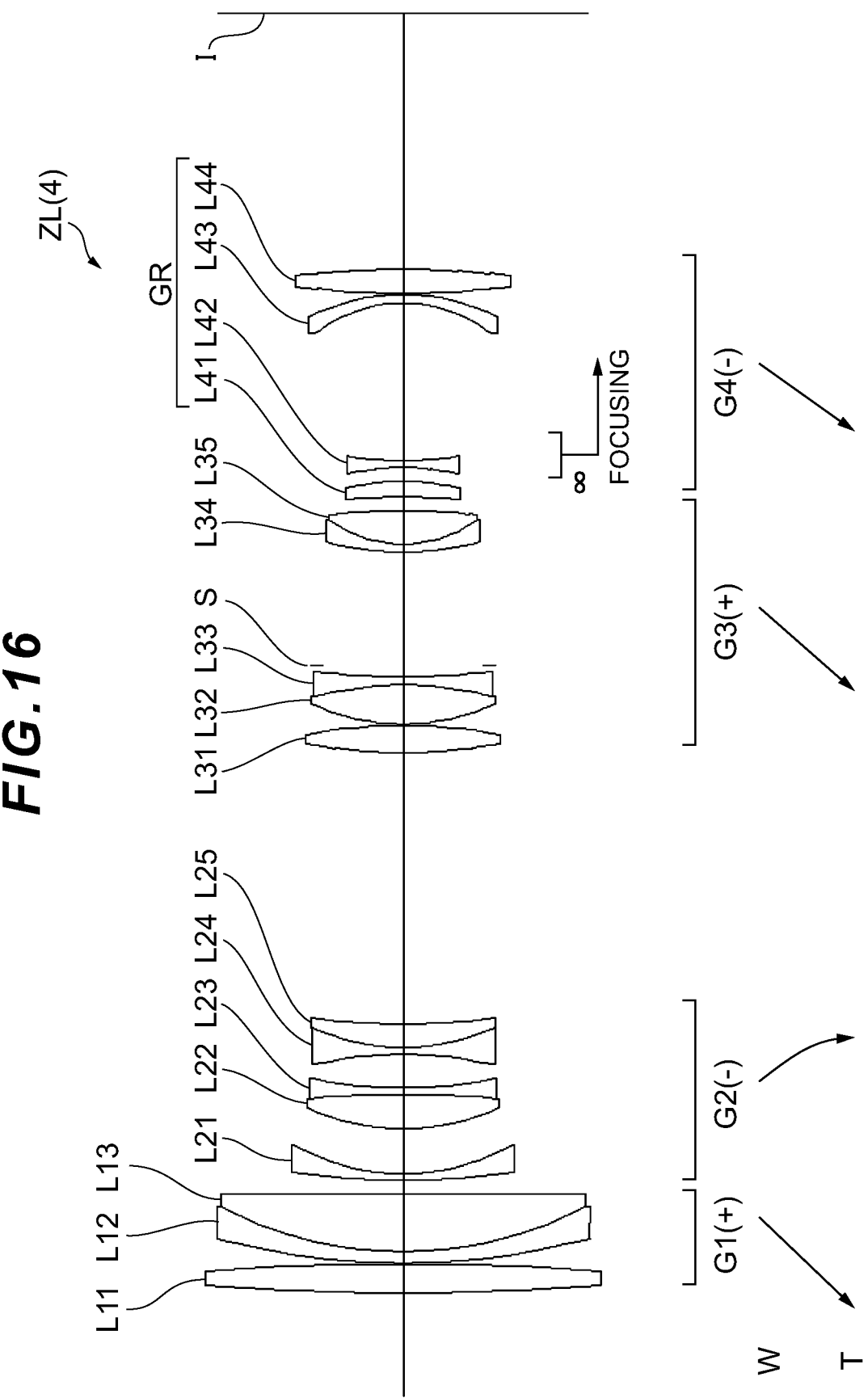

COMA ABERRATION

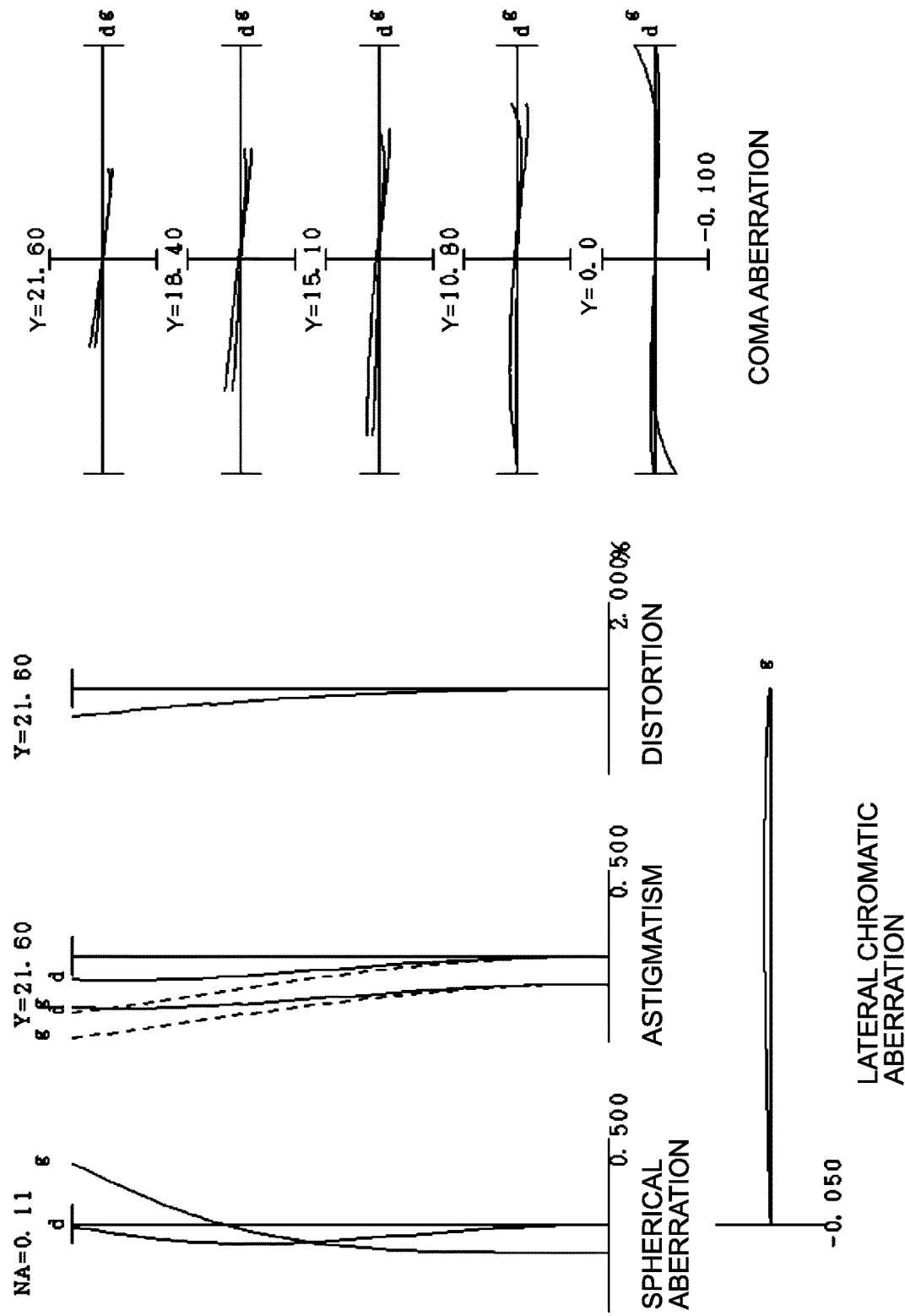

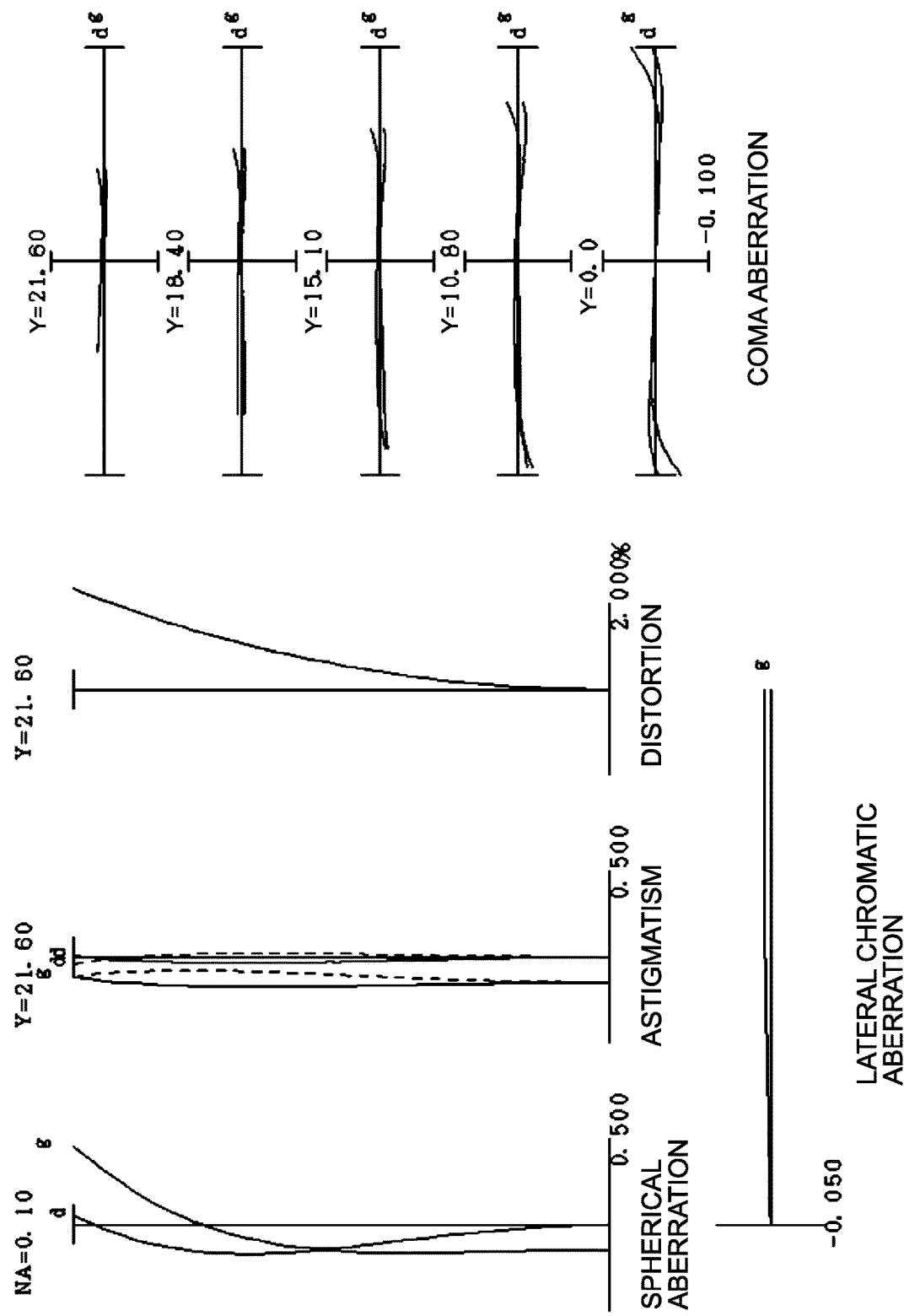

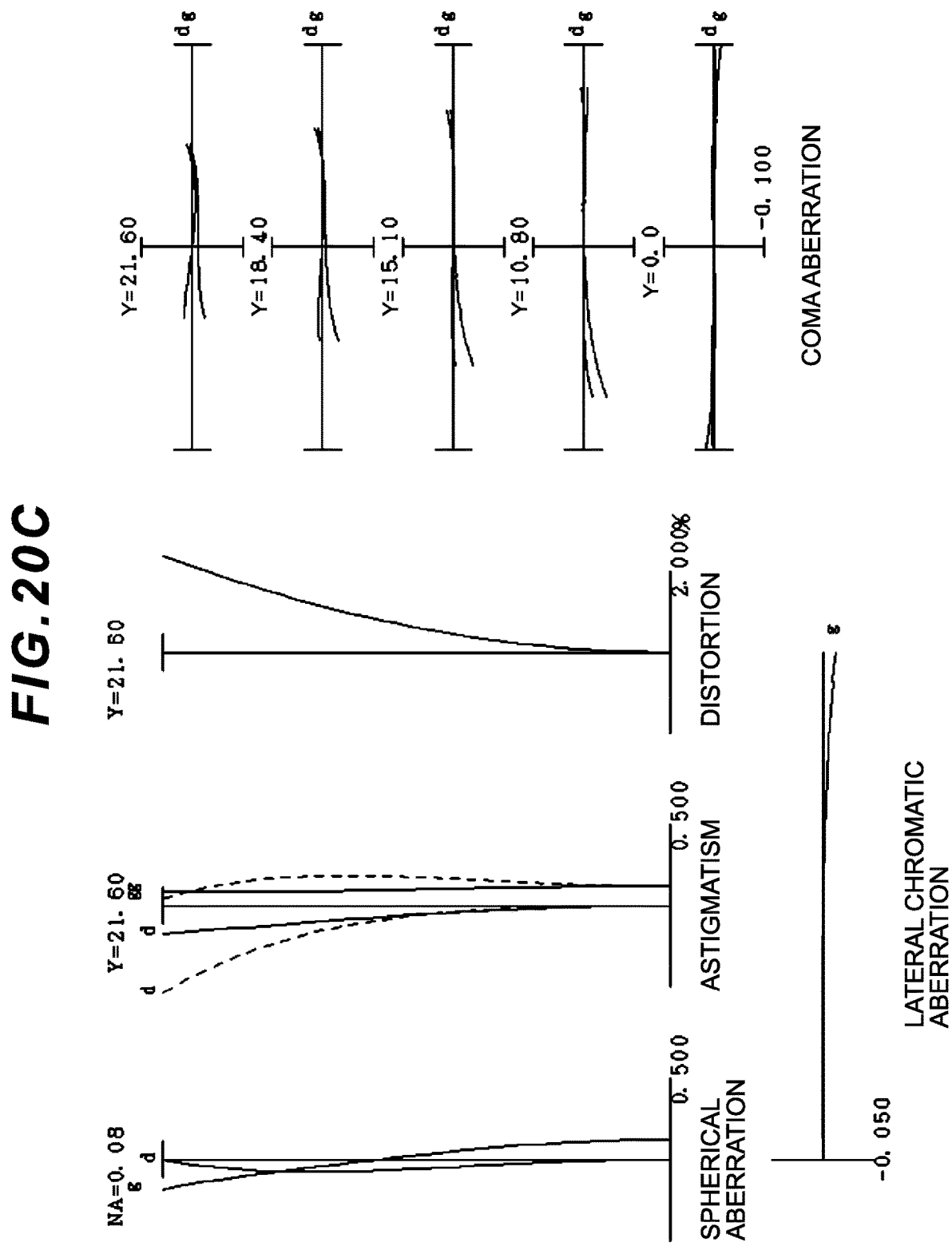

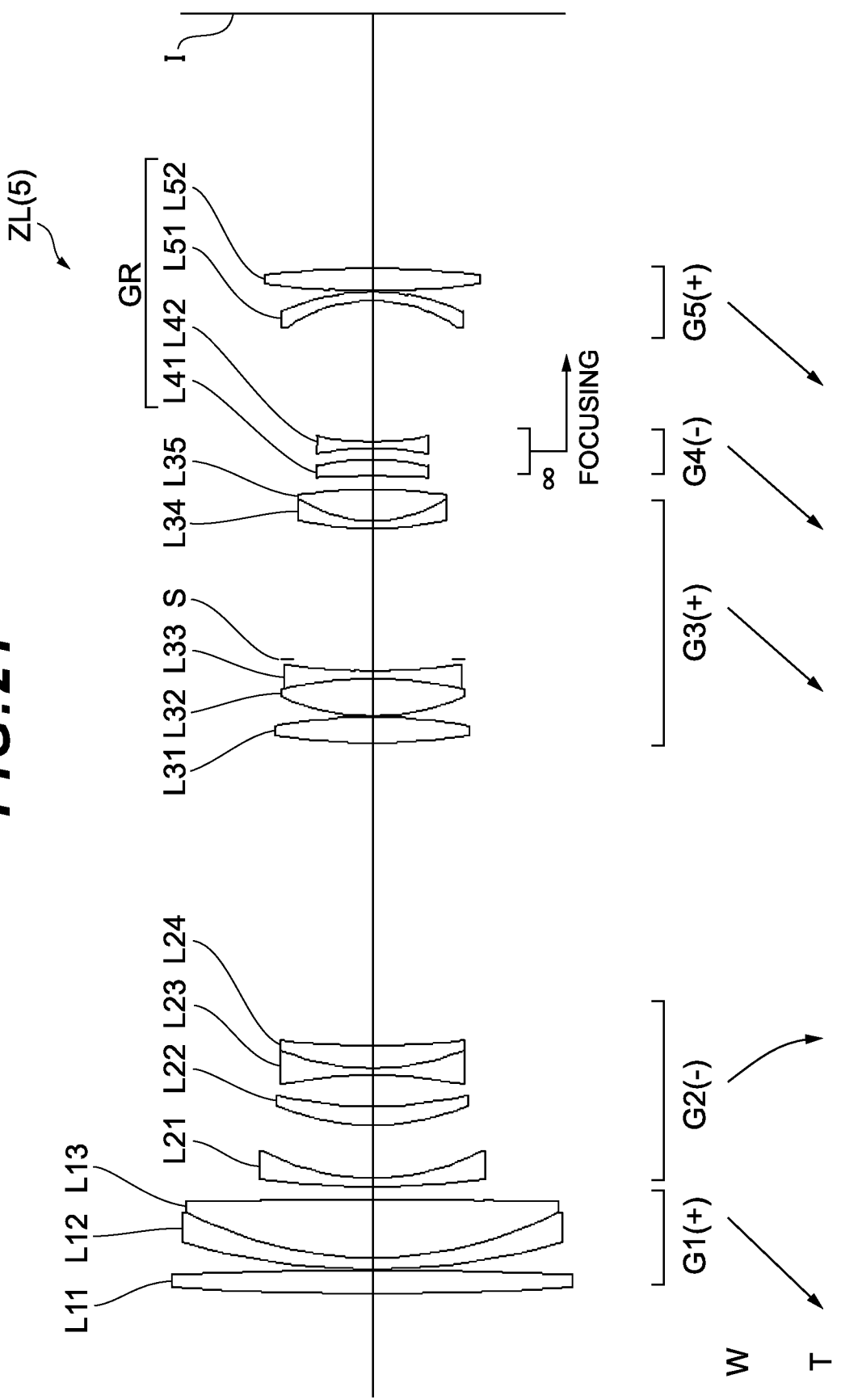

COMA ABERRATION

COMA ABERRATION

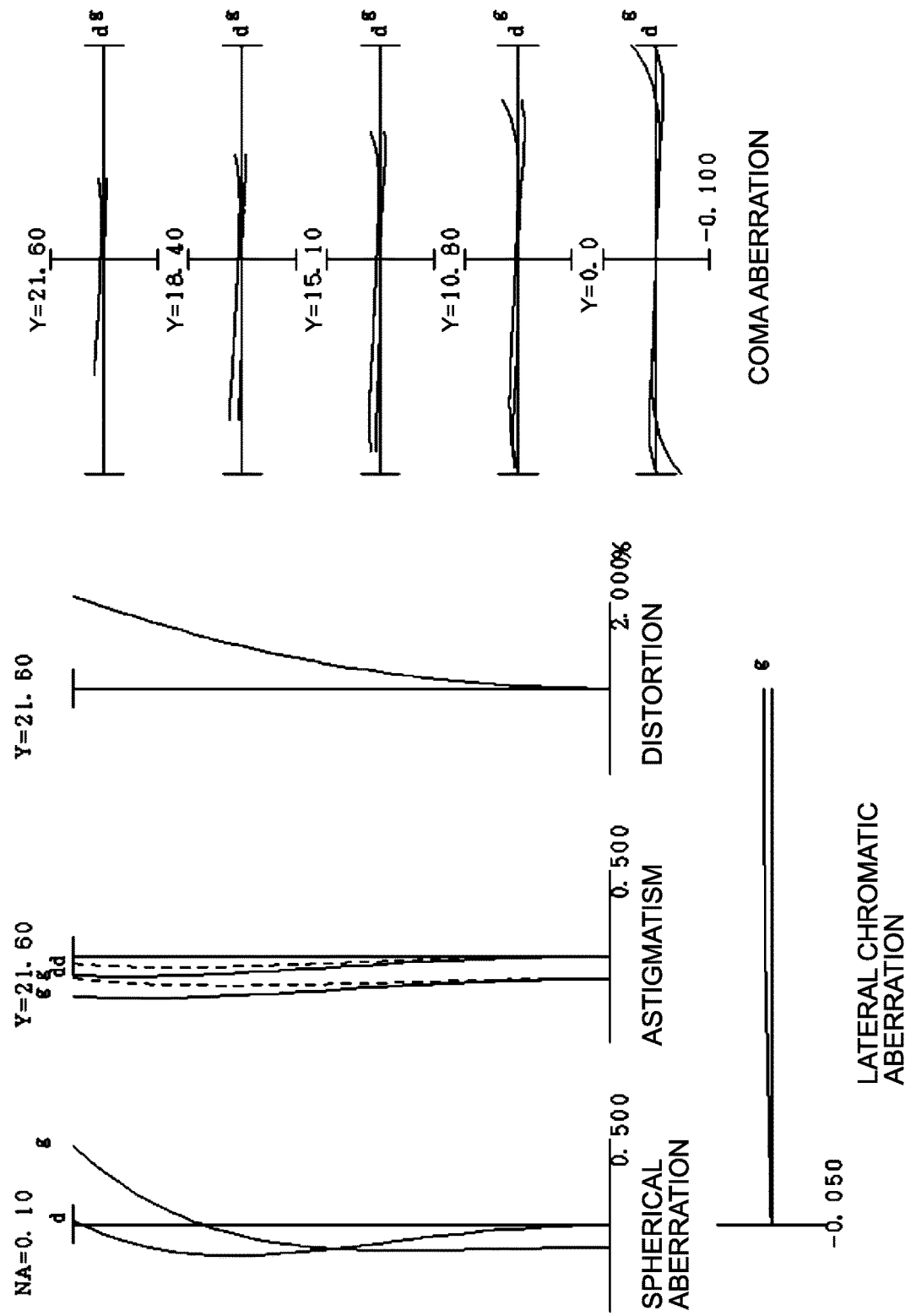

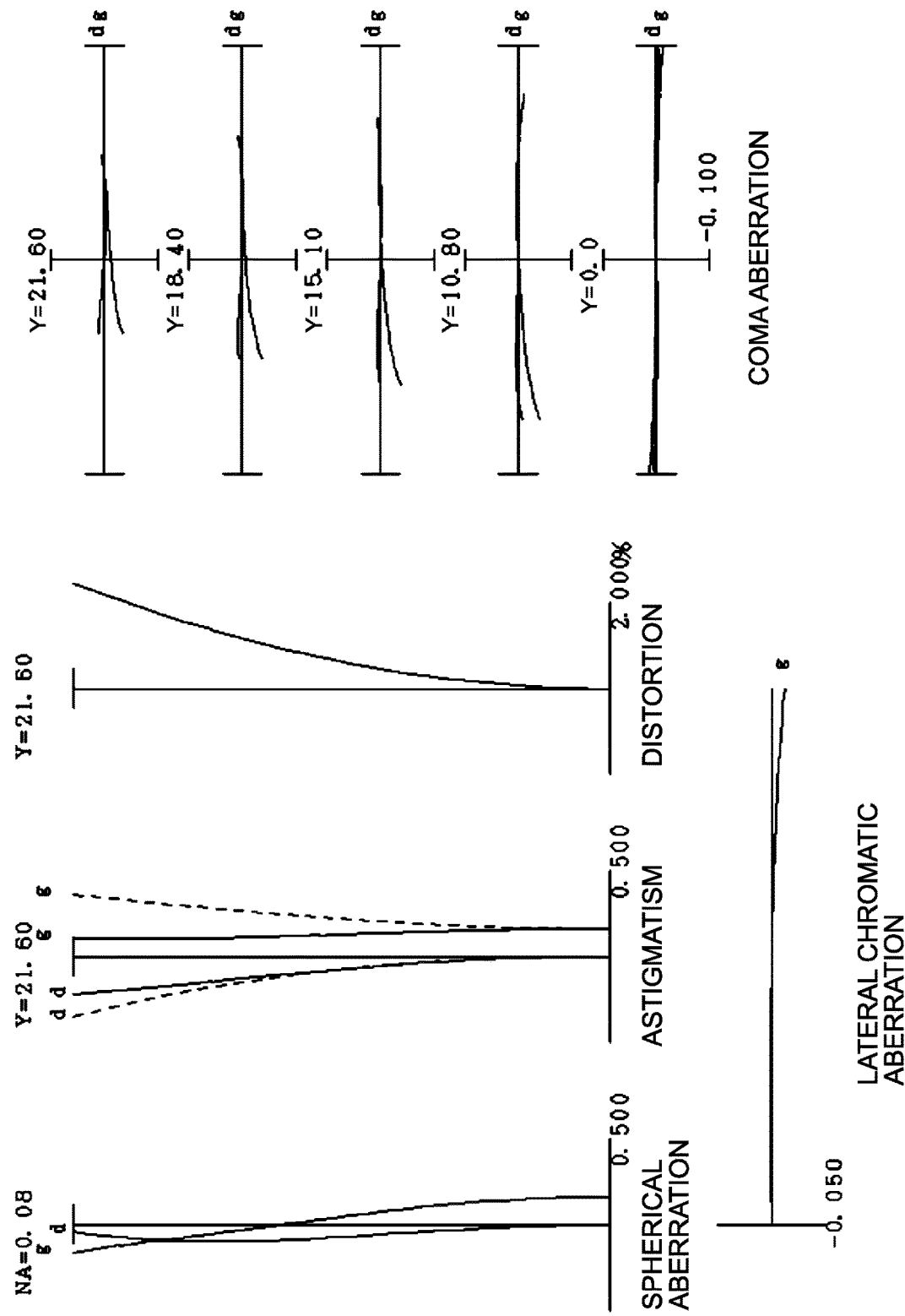

COMA ABERRATION

COMA ABERRATION

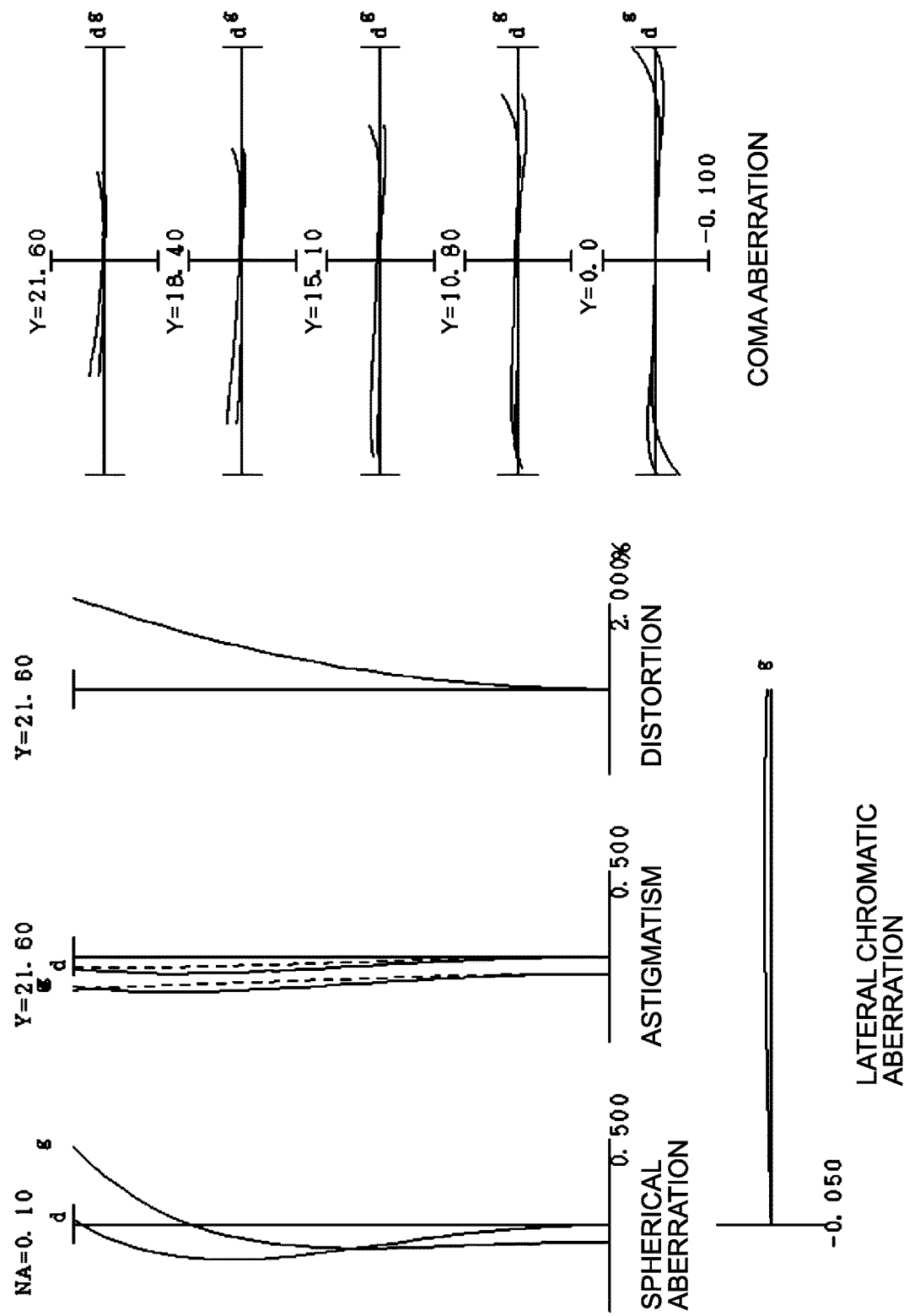

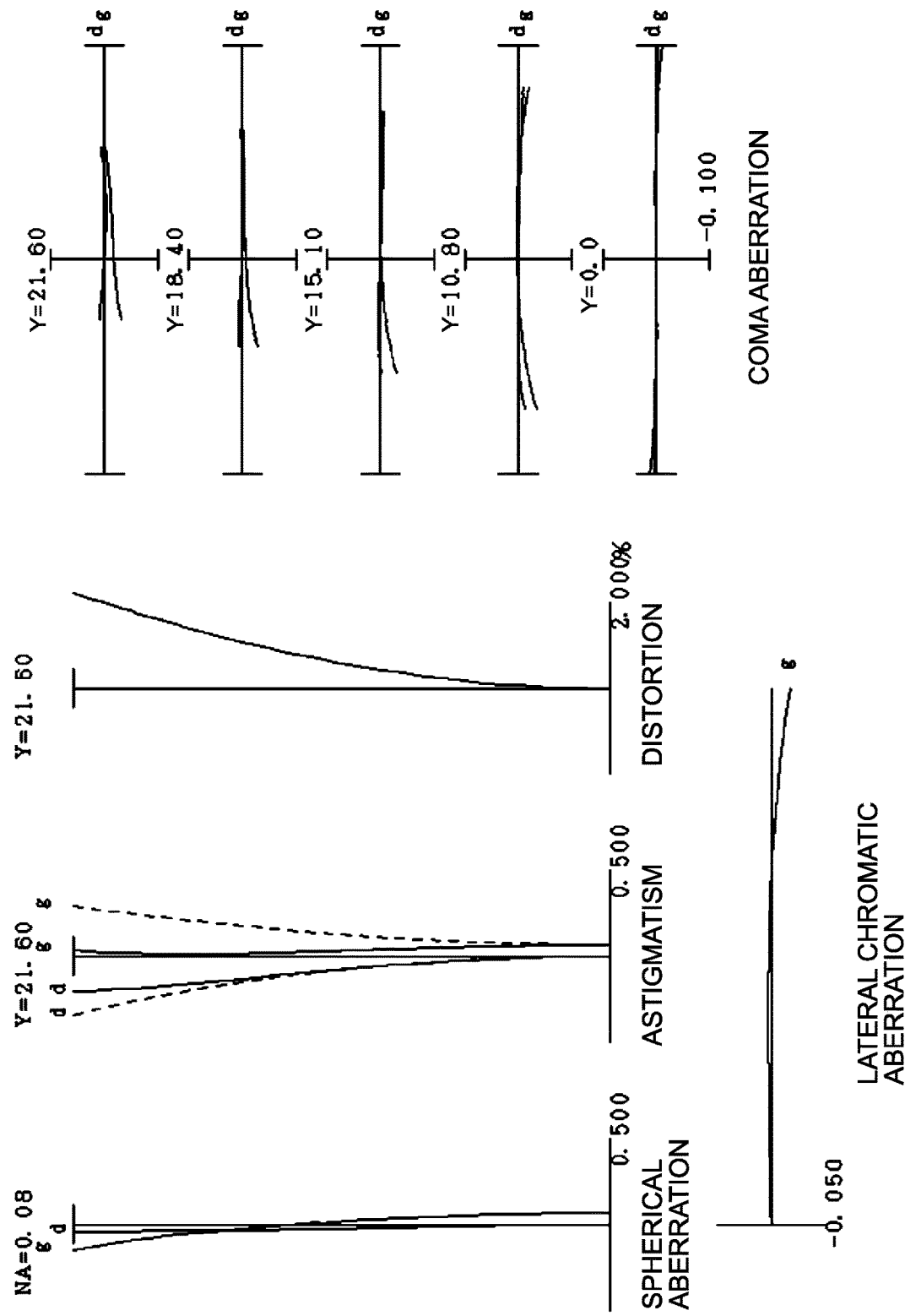

US 11,474,333 B2

ZOOM OPTICAL SYSTEM, OPTICAL APPARATUS AND IMAGING APPARATUS USING THE ZOOM OPTICAL SYSTEM, AND METHOD FOR MANUFACTURING THE ZOOM OPTICAL SYSTEM

TECHNICAL FIELD

The present invention relates to a zoom optical system, an optical apparatus and an imaging apparatus including the same, and a method for manufacturing the zoom optical system.

TECHNICAL BACKGROUND

Conventionally, zoom optical systems suitable for photographic cameras, electronic still cameras, video cameras and the like have been proposed (for example, see Patent literature 1). Unfortunately, the conventional zoom optical systems have insufficient optical performances.

PRIOR ARTS LIST

Patent Document

Patent literature 1: Japanese Laid-Open Patent Publication No. H4-293007(A)

SUMMARY OF THE INVENTION

A zoom optical system according to a first aspect comprises, in order from an object: a first lens group having a positive refractive power; a second lens group having a negative refractive power; a third lens group having a positive refractive power; and a subsequent lens group, wherein upon zooming, a distance between the first lens group and the second lens group changes, a distance between the second lens group and the third lens group changes, and a distance between the third lens group and the subsequent lens group changes, the subsequent lens group comprises a focusing lens group that moves upon focusing, and following conditional expressions are satisfied, $$3.70 < f1/(-f2) < 5.00$$

$$3.20 < f1/f3 < 5.00$$

where f1: a focal length of the first lens group,
f2: a focal length of the second lens group, and
f3: a focal length of the third lens group.

An optical apparatus according to a second aspect comprises the zoom optical system.

An imaging apparatus according to a third aspect comprises: the zoom optical system; and an imaging unit that takes an image formed by the zoom optical system.

A method for manufacturing a zoom optical system according to a fourth aspect is a method for manufacturing a zoom optical system comprising, in order from an object: a first lens group having a positive refractive power; a second lens group having a negative refractive power; a third lens group having a positive refractive power; and a subsequent lens group, wherein upon zooming, a distance between the first lens group and the second lens group changes, a distance between the second lens group and the third lens group changes, and a distance between the third lens group and the subsequent lens group changes, the subsequent lens group comprises a focusing lens group that moves upon focusing, and each lens is arranged in a lens barrel so as to satisfy following conditional expressions, $$3.70 < f1/(-f2) < 5.00$$

$$3.20 < f1/f3 < 5.00$$

where f1: a focal length of the first lens group,
f2: a focal length of the second lens group, and
f3: a focal length of the third lens group.

BRIEF DESCRIPTION OF THE DRAWINGS

FIG. 1 shows a lens configuration of a zoom optical system according to a first example of this embodiment;

FIGS. 5A, 5B and 5C are graphs showing various aberrations of the zoom optical system according to the first example upon focusing on a short distant object in the wide-angle end state, the intermediate focal length state, and the telephoto end state, respectively;

FIGS. 10A, 10B and 10C are graphs showing various aberrations of the zoom optical system according to the second example upon focusing on a short distant object in the wide-angle end state, the intermediate focal length state, and the telephoto end state, respectively;

FIGS. 15A, 15B and 15C are graphs showing various aberrations of the zoom optical system according to the third example upon focusing on a short distant object in the wide-angle end state, the intermediate focal length state, and the telephoto end state, respectively;

FIG. 16 shows a lens configuration of a zoom optical system according to a fourth example of this embodiment;

FIGS. 20A, 20B and 20C are graphs showing various aberrations of the zoom optical system according to the fourth example upon focusing on a short distant object in the wide-angle end state, the intermediate focal length state, and the telephoto end state, respectively;

FIG. 21 shows a lens configuration of a zoom optical system according to a fifth example of this embodiment;

FIGS. 25A, 25B and 25C are graphs showing various aberrations of the zoom optical system according to the fifth example upon focusing on a short distant object in the wide-angle end state, the intermediate focal length state, and the telephoto end state, respectively;

FIGS. 30A, 30B and 30C are graphs showing various aberrations of the zoom optical system according to the sixth example upon focusing on a short distant object in the wide-angle end state, the intermediate focal length state, and the telephoto end state, respectively;

DESCRIPTION OF THE EMBODIMENTS

Hereinafter, a zoom optical system, an optical apparatus, and an imaging apparatus according to this embodiment are described with reference to the drawings. As shown in FIG. 1, a zoom optical system ZL(1) as an example of a zoom optical system (zoom lens) ZL according to this embodiment comprises, in order from an object: a first lens group G1 having a positive refractive power; a second lens group G2 having a negative refractive power; a third lens group G3 having a positive refractive power; and a subsequent lens group GR (a fourth lens group G4 and a fifth lens group G5) consisting of at least one lens group. Upon zooming, a distance between the first lens group G1 and the second lens group G2 changes, a distance between the second lens group G2 and the third lens group G3 changes, and a distance between the third lens group G3 and the subsequent lens group GR changes. The subsequent lens group GR comprises a focusing lens group that moves upon focusing.

Figure 6:
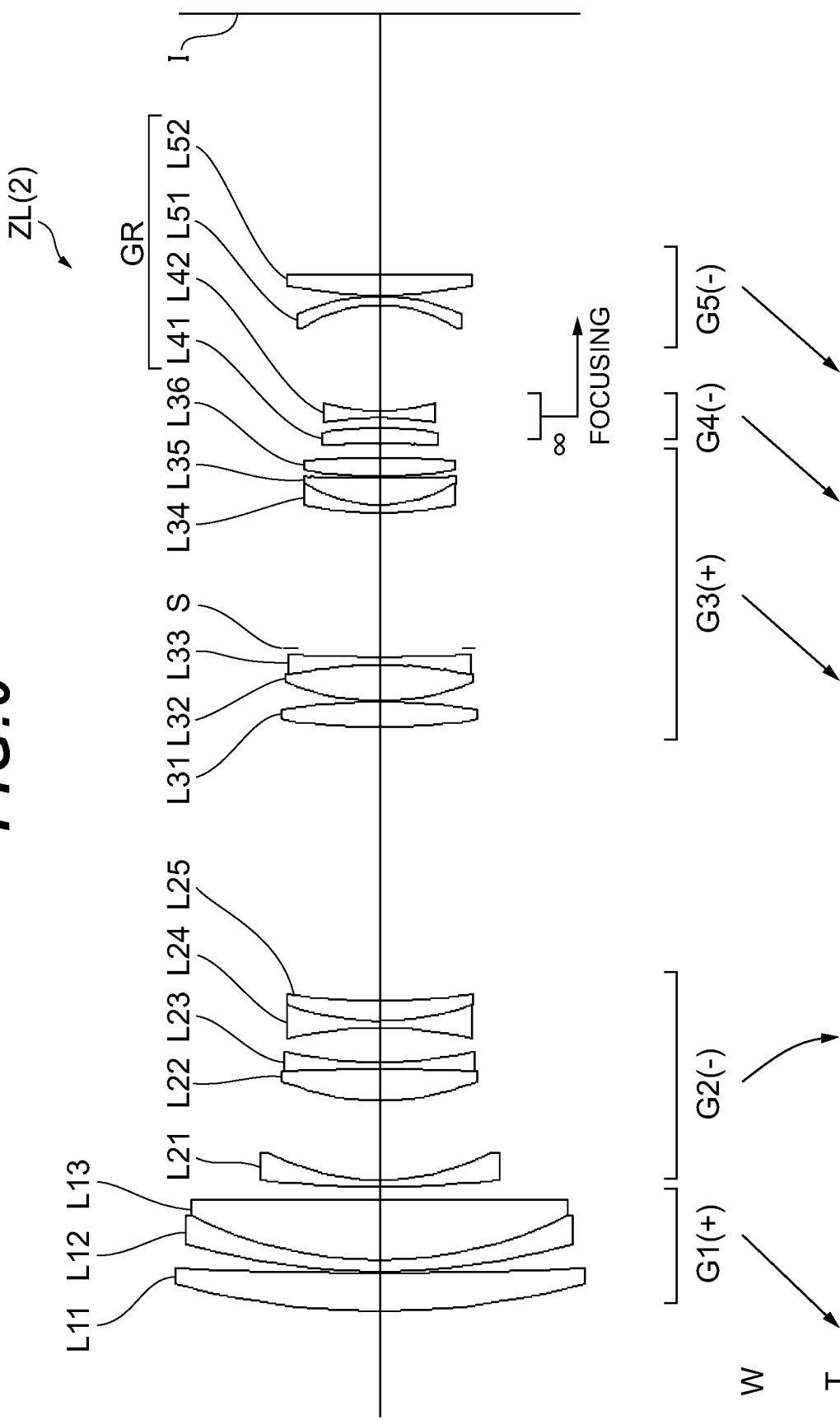
FIG. 6 shows a lens configuration of a zoom optical system according to a second example of this embodiment.
Figure 11:
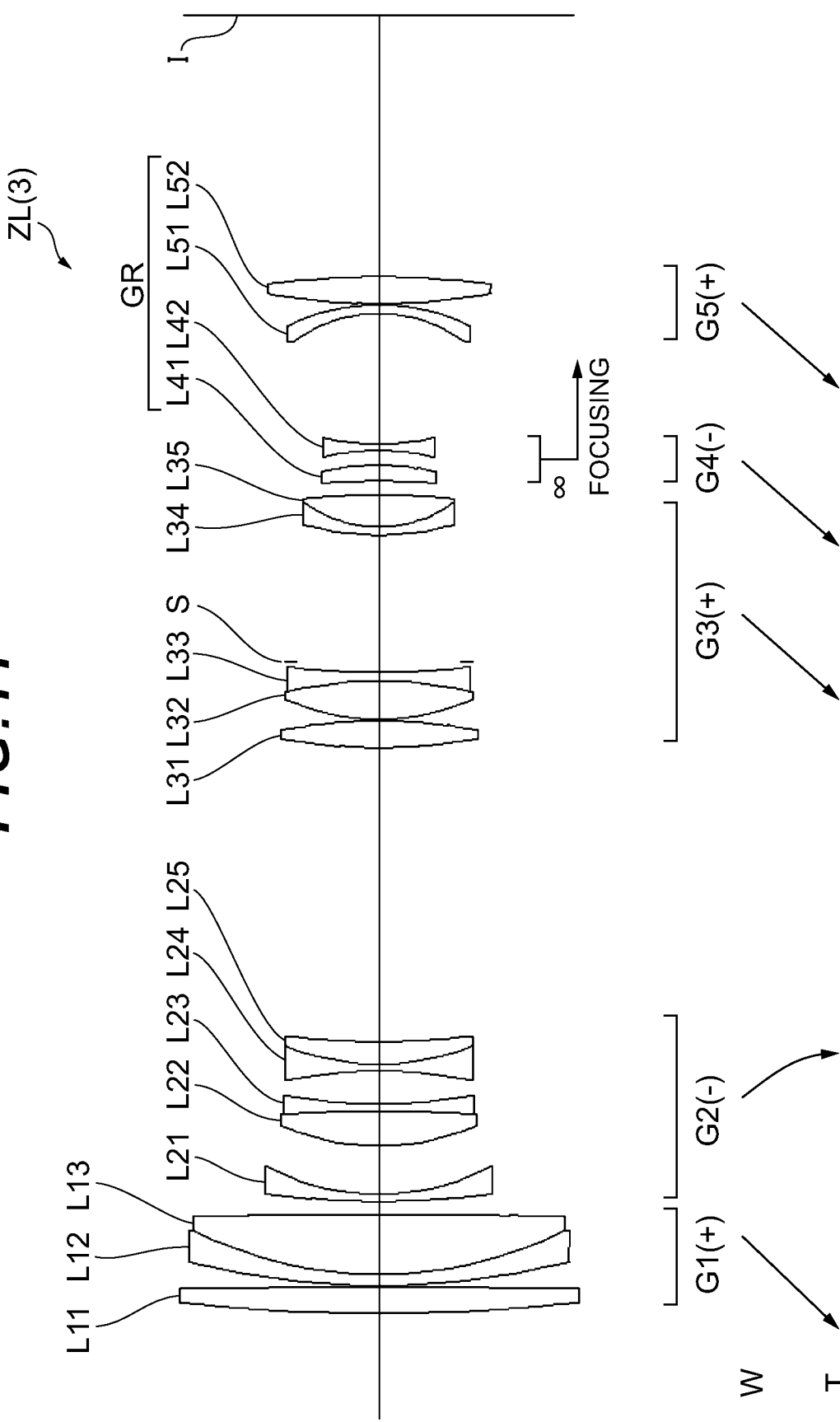
FIG. 11 shows a lens configuration of a zoom optical system according to a third example of this embodiment.
Figure 26:
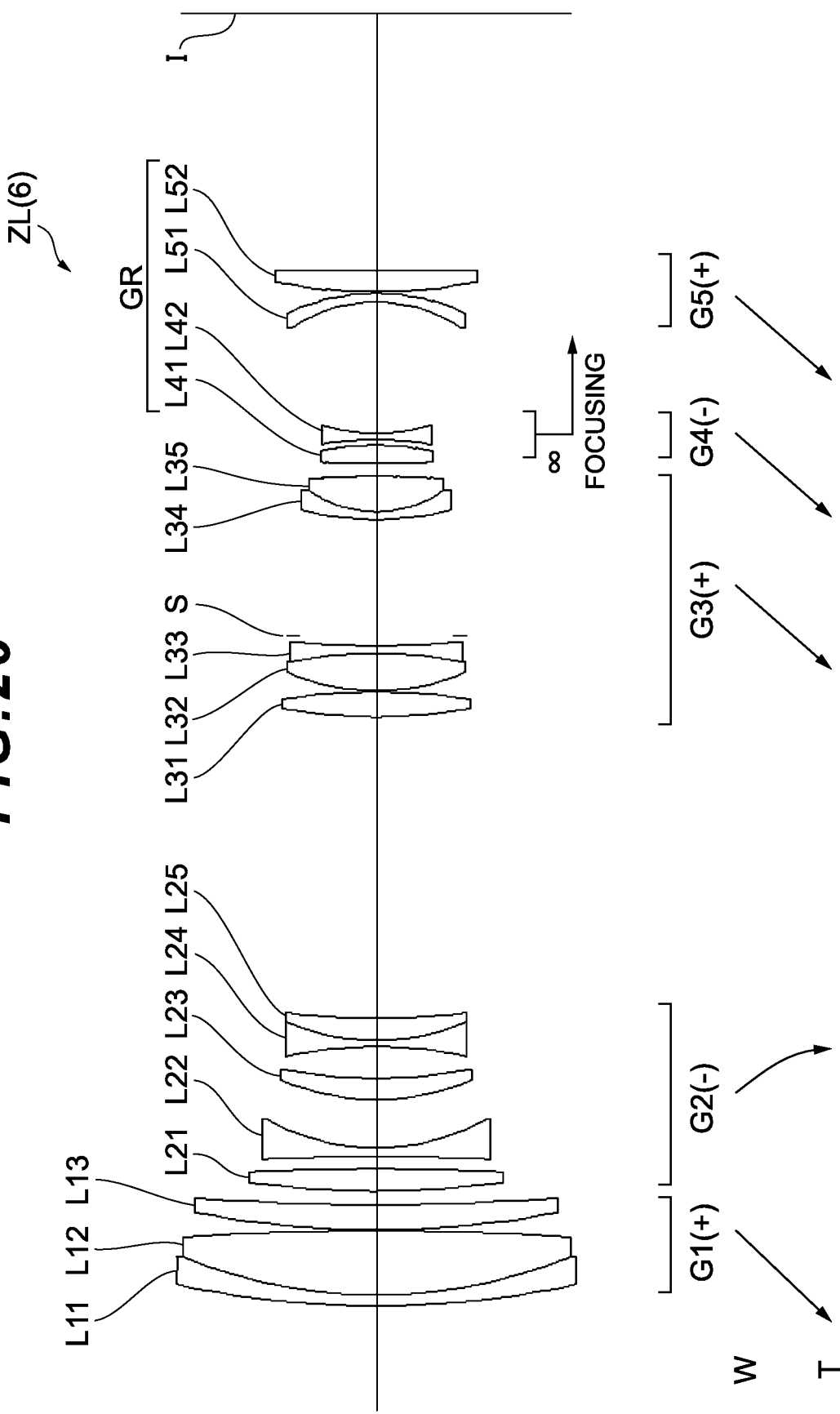
FIG. 26 shows a lens configuration of a zoom optical system according to a sixth example of this embodiment.

The zoom optical system ZL according to this embodiment may be a zoom optical system ZL(2) shown in FIG. 6, a zoom optical system ZL(3) shown in FIG. 11, a zoom optical system ZL(4) shown in FIG. 16, a zoom optical system ZL(5) shown in FIG. 21, or a zoom optical system ZL(6) shown in FIG. 26. The groups in the zoom optical systems ZL(2), ZL(3), ZL(5) and ZL(6) respectively shown in FIGS. 6, 11, 21 and 26 each have a configuration analogous to that of the zoom optical system ZL(1) shown in FIG. 1. In the zoom optical system ZL(4) shown in FIG. 16, the subsequent lens group GR consists of a fourth lens group G4.

The zoom optical system ZL of this embodiment comprises at least four lens groups, and changes the distances between the lens groups upon zooming, thereby allowing favorable aberration correction upon zooming to be facilitated. Furthermore, the arrangement of the focusing lens group in the subsequent lens group GR can reduce the size and weight of the focusing lens group.

With the configuration described above, the zoom optical system ZL according to this embodiment satisfies following conditional expressions.

$$3.70 < f1/(-f2) < 5.00 \quad (1)$$

$$3.20 < f1/f3 < 5.00 \quad (2)$$

where f1: a focal length of the first lens group G1,
f2: a focal length of the second lens group G2, and
f3: a focal length of the third lens group G3.

The conditional expression (1) defines the appropriate range for the ratio of the focal length of the first lens group G1 to the focal length of the second lens group G2. By satisfying the conditional expression (1), variation in various aberrations including the spherical aberration upon zooming from the wide-angle end state to the telephoto end state can be suppressed.

If the corresponding value of the conditional expression (1) exceeds the upper limit value, the refractive power of the second lens group G2 becomes strong, and it is difficult to suppress variation in various aberrations including the spherical aberration upon zooming. Setting of the upper limit value of the conditional expression (1) to 4.90 can more securely achieve the advantageous effects of this embodiment. To further secure the advantageous effects of this embodiment, it is preferable to set the upper limit value of the conditional expression (1) to 4.80.

If the corresponding value of the conditional expression (1) falls below the lower limit value, the refractive power of the first lens group G1 becomes strong, and it is difficult to correct various aberrations including the spherical aberration upon zooming. Setting of the lower limit value of the conditional expression (1) to 3.90 can more securely achieve the advantageous effects of this embodiment. To further secure the advantageous effects of this embodiment, it is preferable to set the lower limit value of the conditional expression (1) to 3.95.

The conditional expression (2) defines the appropriate range for the ratio of the focal length of the first lens group G1 to the focal length of the third lens group G3. By satisfying the conditional expression (2), variation in various aberrations including the spherical aberration upon zooming from the wide-angle end state to the telephoto end state can be suppressed.

If the corresponding value of the conditional expression (2) exceeds the upper limit value, the refractive power of the third lens group G3 becomes strong, and it is difficult to suppress variation in various aberrations including the spherical aberration upon zooming. Setting of the upper limit value of the conditional expression (2) to 4.80 can more securely achieve the advantageous effects of this embodiment. To further secure the advantageous effects of this embodiment, it is preferable to set the upper limit value of the conditional expression (2) to 4.60.

If the corresponding value of the conditional expression (2) falls below the lower limit value, the refractive power of the first lens group G1 becomes strong, and it is difficult to correct various aberrations including the spherical aberration upon zooming. Setting of the lower limit value of the conditional expression (2) to 3.40 can more securely achieve the advantageous effects of this embodiment. To further secure the advantageous effects of this embodiment, it is preferable to set the lower limit value of the conditional expression (2) to 3.60.

It is desirable that the zoom optical system of this embodiment satisfy a following conditional expression (3), $$0.18 < (-fF)/f1 < 0.30 \qquad (3)$$

where fF: a focal length of the focusing lens group.

The conditional expression (3) defines the appropriate range for the ratio of the focal length of the focusing lens group to the focal length of the first lens group G1. By satisfying the conditional expression (3), variation in various aberrations including the spherical aberration upon zooming from the wide-angle end state to the telephoto end state can be suppressed. Furthermore, variation in various aberrations including the spherical aberration upon focusing from the infinite distant object to the short distant object can be suppressed.

If the corresponding value of the conditional expression (3) exceeds the upper limit value, the refractive power of the first lens group G1 becomes strong, and it is difficult to suppress variation in various aberrations including the spherical aberration upon zooming. Setting of the upper limit value of the conditional expression (3) to 0.29 can more securely achieve the advantageous effects of this embodiment. To further secure the advantageous effects of this embodiment, it is preferable to set the upper limit value of the conditional expression (3) to 0.28.

If the corresponding value of the conditional expression (3) falls below the lower limit value, the refractive power of the focusing lens group becomes strong, and it is difficult to correct various aberrations including the spherical aberration upon focusing. Setting of the lower limit value of the conditional expression (3) to 0.19 can more securely achieve the advantageous effects of this embodiment. To further secure the advantageous effects of this embodiment, it is preferable to set the lower limit value of the conditional expression (3) to 0.20.

It is desirable that the zoom optical system of this embodiment satisfy a following conditional expression (4), $$0.84 < (-f2)/f3 < 1.20 \qquad (4)$$

The conditional expression (4) defines the appropriate range for the ratio of the focal length of the second lens group G2 to the focal length of the third lens group G3. By satisfying the conditional expression (4), variation in various aberrations including the spherical aberration upon zooming from the wide-angle end state to the telephoto end state can be suppressed.

If the corresponding value of the conditional expression (4) exceeds the upper limit value, the refractive power of the third lens group G3 becomes strong, and it is difficult to suppress variation in various aberrations including the spherical aberration upon zooming. Setting of the upper limit value of the conditional expression (4) to 1.15 can more securely achieve the advantageous effects of this embodiment. To further secure the advantageous effects of this embodiment, it is preferable to set the upper limit value of the conditional expression (4) to 1.10.

If the corresponding value of the conditional expression (4) falls below the lower limit value, the refractive power of the second lens group G2 becomes strong, and it is difficult to correct various aberrations including the spherical aberration upon zooming. Setting of the lower limit value of the conditional expression (4) to 0.87 can more securely achieve the advantageous effects of this embodiment. To further secure the advantageous effects of this embodiment, it is preferable to set the lower limit value of the conditional expression (4) to 0.90.

In the zoom optical system of this embodiment, preferably, upon zooming from a wide-angle end state to a telephoto end state, the first lens group G1 moves toward the object. Accordingly, the entire length of the lens at the wide-angle end state can be reduced, which can facilitate reduction in the size of the zoom optical system.

In the zoom optical system of this embodiment, preferably, the focusing lens group comprises: at least one lens having a positive refractive power; and at least one lens having a negative refractive power. Accordingly, variation in various aberrations including the spherical aberration upon focusing from the infinite distant object to the short distant object can be suppressed.

In the zoom optical system of this embodiment, preferably, the second lens group G2 comprises a vibration-proof lens group movable so as to have a component in a direction perpendicular to an optical axis in order to correct an image blur. Accordingly, degradation in performance upon blur correction can be effectively suppressed.

In the zoom optical system of this embodiment, preferably, the vibration-proof lens group consists of, in order from the object: a lens having a negative refractive power; and a lens having a positive refractive power. Accordingly, degradation in performance upon blur correction can be effectively suppressed.

It is desirable that the zoom optical system of this embodiment satisfy a following conditional expression (5), $$0.80 < nN/nP < 1.00 \qquad (5)$$

where nN: a refractive index of the lens having the negative refractive power in the vibration-proof lens group, and nP: a refractive index of the lens having the positive refractive power in the vibration-proof lens group.

The conditional expression (5) defines the appropriate range for the ratio of the refractive index of the lens that is in the vibration-proof lens group and has a negative refractive power to the refractive index of the lens that is in the vibration-proof lens group and has a positive refractive power. By satisfying the conditional expression (5), degradation in performance upon blur correction can be effectively suppressed.

If the corresponding value of the conditional expression (5) exceeds the upper limit value, the refractive index of the lens that is in the vibration-proof lens group and has a positive refractive power decreases, and it becomes difficult to correct the decentering coma aberration caused upon blur correction. Setting of the upper limit value of the conditional expression (5) to 0.98 can more securely achieve the advantageous effects of this embodiment. To further secure the advantageous effects of this embodiment, it is preferable to set the upper limit value of the conditional expression (5) to 0.96.

If the corresponding value of the conditional expression (5) falls below the lower limit value, the refractive index of the lens that is in the vibration-proof lens group and has a negative refractive power decreases, and it becomes difficult to correct the decentering coma aberration caused upon blur correction. Setting of the lower limit value of the conditional expression (5) to 0.82 can more securely achieve the advantageous effects of this embodiment. To further secure the advantageous effects of this embodiment, it is preferable to set the lower limit value of the conditional expression (5) to 0.84.

It is desirable that the zoom optical system of this embodiment satisfy a following conditional expression (6), $$1.20 < \nu N/\nu P < 2.40 \quad (6)$$

where νN: an Abbe number of the lens having the negative refractive power in the vibration-proof lens group, and νP: an Abbe number of the lens having the positive refractive power in the vibration-proof lens group.

The conditional expression (6) defines the appropriate range for the ratio of the Abbe number of the lens that is in the vibration-proof lens group and has a negative refractive power to the Abbe number of the lens that is in the vibration-proof lens group and has a positive refractive power. By satisfying the conditional expression (6), degradation in performance upon blur correction can be effectively suppressed.

If the corresponding value of the conditional expression (6) exceeds the upper limit value, the Abbe number of the lens that is in the vibration-proof lens group and has a positive refractive power becomes too small, and it becomes difficult to correct the chromatic aberration caused upon blur correction. Setting of the upper limit value of the conditional expression (6) to 2.30 can more securely achieve the advantageous effects of this embodiment. To further secure the advantageous effects of this embodiment, it is preferable to set the upper limit value of the conditional expression (6) to 2.20.

If the corresponding value of the conditional expression (6) falls below the lower limit value, the Abbe number of the lens that is in the vibration-proof lens group and has a negative refractive power becomes too small, and it becomes difficult to correct the chromatic aberration caused upon blur correction. Setting of the lower limit value of the conditional expression (6) to 1.30 can more securely achieve the advantageous effects of this embodiment. To further secure the advantageous effects of this embodiment, it is preferable to set the lower limit value of the conditional expression (6) to 1.40.

Preferably, in the zoom optical system of this embodiment, the subsequent lens group GR comprises: a lens that is disposed to the image side of the focusing lens group, and has a negative refractive power; and a lens that is disposed to the image side of the lens having the negative refractive power, and has a positive refractive power. Accordingly, various aberrations including the coma aberration can be effectively corrected.

It is desirable that the zoom optical system of this embodiment satisfy a following conditional expression (7), $$0.70 < (-fN)/fP < 2.00 \quad (7)$$

where fN: a focal length of the lens that is disposed to the image side of the focusing lens group and has the negative refractive power, and fP: a focal length of the lens that is disposed to the image side of the lens having the negative refractive power, and has the positive refractive power.

The conditional expression (7) defines the appropriate range for the ratio of the focal length of the lens that is disposed to the image side of the focusing lens group and has the negative refractive power to the focal length of the lens that is disposed to the image side of the focusing lens group (image side of the lens having the negative refractive power) and has the positive refractive power. By satisfying the conditional expression (7), various aberrations including the coma aberration can be effectively corrected.

If the corresponding value of the conditional expression (7) exceeds the upper limit value, the refractive power of the lens that is disposed to the image side of the focusing lens group and has the positive refractive power becomes strong, and it becomes difficult to correct the coma aberration. Setting of the upper limit value of the conditional expression (7) to 1.90 can more securely achieve the advantageous effects of this embodiment. To further secure the advantageous effects of this embodiment, it is preferable to set the upper limit value of the conditional expression (7) to 1.80.

If the corresponding value of the conditional expression (7) falls below the lower limit value, the refractive power of the lens that is disposed to the image side of the focusing lens group and has the negative refractive power becomes strong, and it becomes difficult to correct the coma aberration. Setting of the lower limit value of the conditional expression (7) to 0.80 can more securely achieve the advantageous effects of this embodiment. To further secure the advantageous effects of this embodiment, it is preferable to set the lower limit value of the conditional expression (7) to 0.90.

Figure 31:
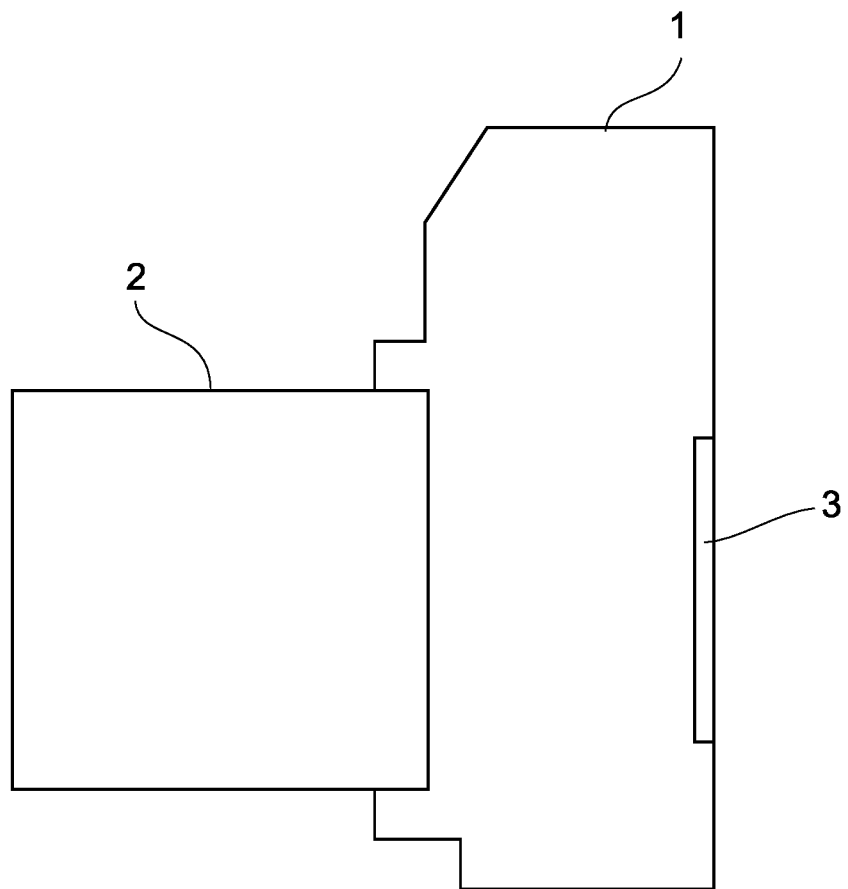
FIG. 31 shows a configuration of a camera including the zoom optical system according to this embodiment.

An optical apparatus and an imaging apparatus according to this embodiment comprise the zoom optical system having the configuration described above. As a specific example, a camera (corresponding to the imaging apparatus of the invention of the present application) including the aforementioned zoom optical system ZL is described with reference to FIG. 31. As shown in FIG. 31, this camera 1 has a lens assembly configuration including a replaceable imaging lens 2. The zoom optical system having the configuration described above is provided in the imaging lens 2. That is, the imaging lens 2 corresponds to the optical apparatus of the invention of the present application. The camera 1 is a digital camera. Light from an object (subject), not shown, is collected by the imaging lens 2, and reaches an imaging element 3. Accordingly, the light from the subject is imaged by the imaging element 3, and recorded as a subject image in a memory, not shown. As described above, a photographer can take an image of the subject through the camera 1. Note that this camera may be a mirrorless camera, or a single-lens reflex type camera including a quick return mirror.

According to the configuration described above, the camera 1 mounted with the zoom optical system ZL described above in the imaging lens 2 can achieve high-speed AF and silence during AF without increasing the size of the lens barrel by reducing the size and weight of the focusing lens group. Furthermore, variation of aberrations upon zooming from the wide-angle end state to the telephoto end state, and variation of aberrations upon focusing from an infinite distant object to a short distant object can be favorably suppressed, and a favorable optical performance can be achieved.

Figure 32:
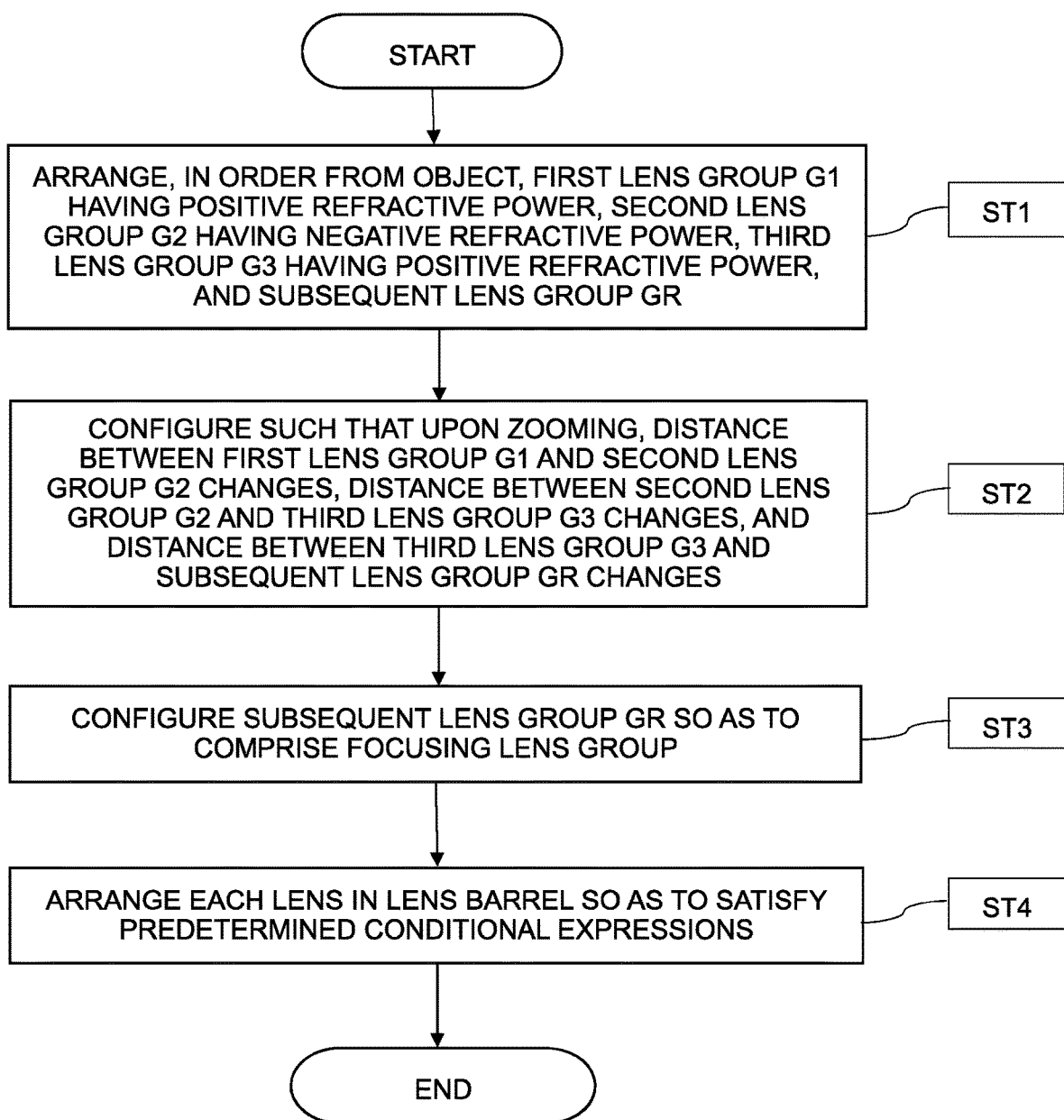
FIG. 32 is a flowchart showing a method for manufacturing the zoom optical system according to this embodiment.

Subsequently, referring to FIG. 32, an overview of a method for manufacturing the aforementioned zoom optical system ZL is described. First, in order from an object, a first lens group G1 having a positive refractive power, a second lens group G2 having a negative refractive power, a third lens group G3 having a positive refractive power, and a subsequent lens group GR are arranged (step ST1). Subsequently, it is configured such that upon zooming, the distance between the first lens group G1 and the second lens group G2 changes, the distance between the second lens group G2 and the third lens group G3 changes, and the distance between the third lens group G3 and the subsequent lens group GR changes (step ST2). It is also configured such that the subsequent lens group GR comprises the focusing lens group that moves upon focusing (step ST3). Furthermore, each lens is arranged in a lens barrel so as to satisfy at least the conditional expressions (1) and (2) (step ST4).

EXAMPLES

Hereinafter, zoom optical systems (zoom lens) ZL according to the examples of this embodiment are described with reference to the drawings. FIGS. 1, 6, 11, 16, 21 and 26 are sectional views showing the configurations and refractive power distributions of the zoom optical systems ZL {ZL(1) to ZL(6)} according to first to sixth examples. At lower parts of the sectional views of the zoom optical systems ZL(1) to ZL(6), the movement direction of each lens group along the optical axis during zooming from the wide-angle end state (W) to the telephoto end state (T) is indicated by a corresponding arrow. Furthermore, the movement direction during focusing the focusing lens group from infinity to a short distant object is indicated by an arrow accompanied by characters "FOCUSING."

FIGS. 1, 6, 11, 16, 21 and 26 show each lens group by a combination of a symbol G and a numeral, and show each lens by a combination of a symbol L and a numeral. In this case, to prevent the types and numbers of symbols and numerals from increasing and being complicated, the lens groups and the like are indicated using the combinations of symbols and numerals independently on an example-by-example basis. Accordingly, even though the same combinations of symbols and numerals are used among the examples, the combinations do not mean the same configurations.

Tables 1 to 6 are shown below. Among these tables, Table 1 is a table listing various data in the first example, Table 2 is that in the second example, Table 3 is that in the third example, Table 4 is that in the fourth example, Table 5 is that in the fifth example, and Table 6 is that in the sixth example.

In each example, d-line (wavelength $\lambda$=587.6 nm) and g-line (wavelength $\lambda$=435.8 nm) are selected as calculation targets of aberration characteristics.

In [Lens data] tables, the surface number denotes the order of optical surfaces from the object along a light beam traveling direction, R denotes the radius of curvature (a surface whose center of curvature is nearer to the image is assumed to have a positive value) of each optical surface, D denotes the surface distance, which is the distance on the optical axis from each optical surface to the next optical surface (or the image surface), nd denotes the refractive index of the material of an optical element for the d-line, and vd denotes the Abbe number of the material of an optical element with reference to the d-line. The object surface denotes the surface of an object. "∞" of the radius of curvature indicates a flat surface or an aperture. (Stop S) indicates an aperture stop S. The image surface indicates an image surface I. The description of the air refractive index nd=1.00000 is omitted.

In [Various data] tables, f denotes the focal length of the entire zoom lens, FNO denotes the f-number, 2ω denotes the angle of view (represented in units of ° (degree); ω denotes the half angle of view), and Ymax denotes the maximum image height. TL denotes the distance obtained by adding BF to the distance on the optical axis from the lens forefront surface to the lens last surface upon focusing on infinity. BF denotes the distance (back focus) on the optical axis from the lens last surface to the image surface I upon focusing on infinity. Note that these values are represented for zooming states of the wide-angle end (W), the intermediate focal length (M), and the telephoto end (T).

[Variable distance data] tables show the surface distances at surface numbers to which the surface distance of "Variable" in the table representing [Lens data] correspond. This shows the surface distances in the zooming states of the wide-angle end (W), the intermediate focal length (M) and the telephoto end (T) upon focusing on infinity and a short distant object.

[Lens group data] tables show the starting surfaces (the surfaces nearest to the object) and the focal lengths of the first to fifth lens groups (or the fourth lens group).

[Conditional expression corresponding value] tables show values corresponding to the conditional expressions (1) to (7) described above.

Hereinafter, for all the data values, the listed focal length f, radius of curvature R, surface distance D, other lengths and the like are typically represented in "mm" if not otherwise specified. However, the optical system can exert equivalent optical performances even if being proportionally magnified or proportionally reduced. Consequently, the representation is not limited thereto.

The above descriptions of the tables are common to all the examples. Hereinafter, redundant description is omitted.

First Example

The first example is described with reference to FIGS. 1 to 5 and Table 1. FIG. 1 shows a lens configuration of a zoom optical system according to the first example of this embodiment. The zoom optical system ZL(1) according to the first example consists of, in order from the object: a first lens group G1 having a positive refractive power; a second lens group G2 having a negative refractive power; a third lens group G3 having a positive refractive power; a fourth lens group G4 having a negative refractive power; and a fifth lens group G5 having a positive refractive power. Upon zooming from the wide-angle end state (W) to the telephoto end state (T), the first to fifth lens groups G1 to G5 move in the directions indicated by the respective arrows in FIG. 1. In this example, the fourth lens group G4 and the fifth lens group G5 constitute the subsequent lens group GR. The sign (+) or (−) assigned to each lens group symbol indicates the refractive power of the corresponding lens group. This similarly applies to all the following examples.

The first lens group G1 consists of, in order from the object: a positive meniscus lens L11 having a convex surface facing the object; and a positive cemented lens consisting of a negative meniscus lens L12 having a convex surface facing the object, and a positive biconvex lens L13.

The second lens group G2 consists of, in order from the object: a negative meniscus lens L21 having a convex surface facing the object; a positive biconvex lens L22; a negative biconcave lens L23; and a negative cemented lens consisting of a negative biconcave lens L24, and a positive meniscus lens L25 having a convex surface facing the object.

The third lens group G3 consists of, in order from the object: a positive biconvex lens L31; a positive cemented lens consisting of a positive biconvex lens L32 and a negative biconcave lens L33; an aperture stop S; a positive cemented lens consisting of a negative meniscus lens L34 having a convex surface facing the object, and a positive biconvex lens L35; and a positive biconvex lens L36.

The fourth lens group G4 consists of, in order from the object: a positive meniscus lens L41 having a concave surface facing the object; and a negative biconcave lens L42.

The fifth lens group G5 consists of, in order from the object: a negative meniscus lens L51 having a concave surface facing the object; and a positive meniscus lens L52 having a convex surface facing the object. An image surface I is disposed to the image side of the fifth lens group G5.

In the zoom optical system ZL(1) according to the first example, the entire fourth lens group G4 constitutes the focusing lens group, and focusing from a long distant object to a short distant object is performed by moving the entire fourth lens group G4 in the image surface direction. In the zoom optical system ZL(1) according to the first example, the negative cemented lens, which consists of the negative lens L24 and the positive meniscus lens L25 of the second lens group G2, constitutes the vibration-proof lens group movable in a direction perpendicular to the optical axis, and corrects the imaging position displacement (image blur on the image surface I) due to a camera shake or the like.

Note that to correct a rotational blur with an angle θ at a lens having the focal length f of the entire system and a vibration proof coefficient K (the ratio of the amount of image movement on the image forming surface to the amount of movement of the movable lens group upon blur correction), the movable lens group for blur correction is moved in a direction orthogonal to the optical axis by (f·tan θ)/K. In the wide-angle end state in the first example, the vibration proof coefficient is 0.97, and the focal length is 72.1 mm. Accordingly, the amount of movement of the vibration-proof lens group to correct a rotational blur by 0.30° is 0.39 mm. In the telephoto end state in the first example, the vibration proof coefficient is 2.01, and the focal length is 292.0 mm. Accordingly, the amount of movement of the vibration-proof lens group to correct a rotational blur by 0.20° is 0.51 mm.

The following Table 1 lists the values of data on the optical system according to the first example.

TABLE 1

| [Lens data] | | | | |
|---|---|---|---|---|
| Surface No. | R | D | nd | νd |
| Object surface | ∞ | | | |
| 1 | 121.1094 | 4.980 | 1.48749 | 70.31 |
| 2 | 474.6427 | 0.200 | | |
| 3 | 104.9110 | 1.700 | 1.83400 | 37.18 |
| 4 | 63.9583 | 9.069 | 1.49700 | 81.73 |
| 5 | −1816.1542 | Variable | | |
| 6 | 153.9285 | 1.000 | 1.83400 | 37.18 |
| 7 | 37.0130 | 9.180 | | |
| 8 | 41.8122 | 5.321 | 1.80518 | 25.45 |
| 9 | −148.0087 | 1.552 | | |
| 10 | −153.0936 | 1.000 | 1.90366 | 31.27 |
| 11 | 74.4958 | 4.888 | | |
| 12 | −65.0702 | 1.000 | 1.69680 | 55.52 |
| 13 | 35.9839 | 3.310 | 1.83400 | 37.18 |
| 14 | 121.5659 | Variable | | |
| 15 | 85.1793 | 3.534 | 1.80400 | 46.60 |
| 16 | −101.3301 | 0.200 | | |
| 17 | 38.9890 | 5.033 | 1.49700 | 81.73 |
| 18 | −62.2191 | 1.200 | 1.95000 | 29.37 |
| 19 | 378.6744 | 1.198 | | |
| 20 | ∞ | 19.885 | | (Stop S) |
| 21 | 44.8832 | 1.200 | 1.85026 | 32.35 |
| 22 | 20.5002 | 4.485 | 1.51680 | 63.88 |
| 23 | −586.4581 | 0.200 | | |
| 24 | 64.4878 | 2.563 | 1.62004 | 36.40 |
| 25 | −357.2881 | Variable | | |
| 26 | −801.6030 | 2.383 | 1.80518 | 25.45 |
| 27 | −50.3151 | 1.298 | | |
| 28 | −57.1873 | 1.000 | 1.77250 | 49.62 |
| 29 | 26.1668 | Variable | | |
| 30 | −21.0000 | 1.300 | 1.77250 | 49.62 |
| 31 | −28.8136 | 0.200 | | |
| 32 | 58.9647 | 3.137 | 1.62004 | 36.40 |
| 33 | 524.5289 | BF | | |
| Image surface | ∞ | | | |

| [Various data] | | |
|---|---|---|
| Zooming ratio 4.05 | | |
| | W | M | T |
| f | 72.1 | 99.9 | 292.0 |
| FNO | 4.57 | 4.79 | 5.88 |
| 2ω | 33.24 | 23.82 | 8.24 |
| Ymax | 21.60 | 21.60 | 21.60 |
| TL | 191.32 | 204.14 | 241.16 |
| BF | 38.52 | 42.04 | 60.52 |

| [Variable distance data] | | | | | | |
|---|---|---|---|---|---|---|
| | W Infinity | M Infinity | T Infinity | W Short distance | M Short distance | T Short distance |
| d5 | 2.000 | 22.163 | 69.630 | 2.000 | 22.163 | 69.630 |
| d14 | 41.783 | 30.929 | 2.000 | 41.783 | 30.929 | 2.000 |
| d25 | 2.000 | 3.259 | 2.000 | 2.462 | 3.867 | 3.166 |
| d29 | 14.999 | 13.740 | 14.999 | 14.538 | 13.133 | 13.833 |

| [Lens group data] | | |
|---|---|---|
| Group | Starting surface | Focal Length |
| G1 | 1 | 167.635 |
| G2 | 6 | −39.933 |
| G3 | 15 | 37.727 |
| G4 | 26 | −36.765 |
| G5 | 30 | 2825.740 |

TABLE 1-continued

[Conditional expression corresponding value]

Conditional Expression (1) f1/(−f2) = 4.198
Conditional Expression (2) f1/f3 = 4.443
Conditional Expression (3) (−fF)/f1 = 0.219
Conditional Expression (4) (−f2)/f3 = 1.058
Conditional Expression (5) nN/nP = 0.925
Conditional Expression (6) vN/vP = 1.493
Conditional Expression (7) (−fN)/fP = 1.011

Figure 2A:
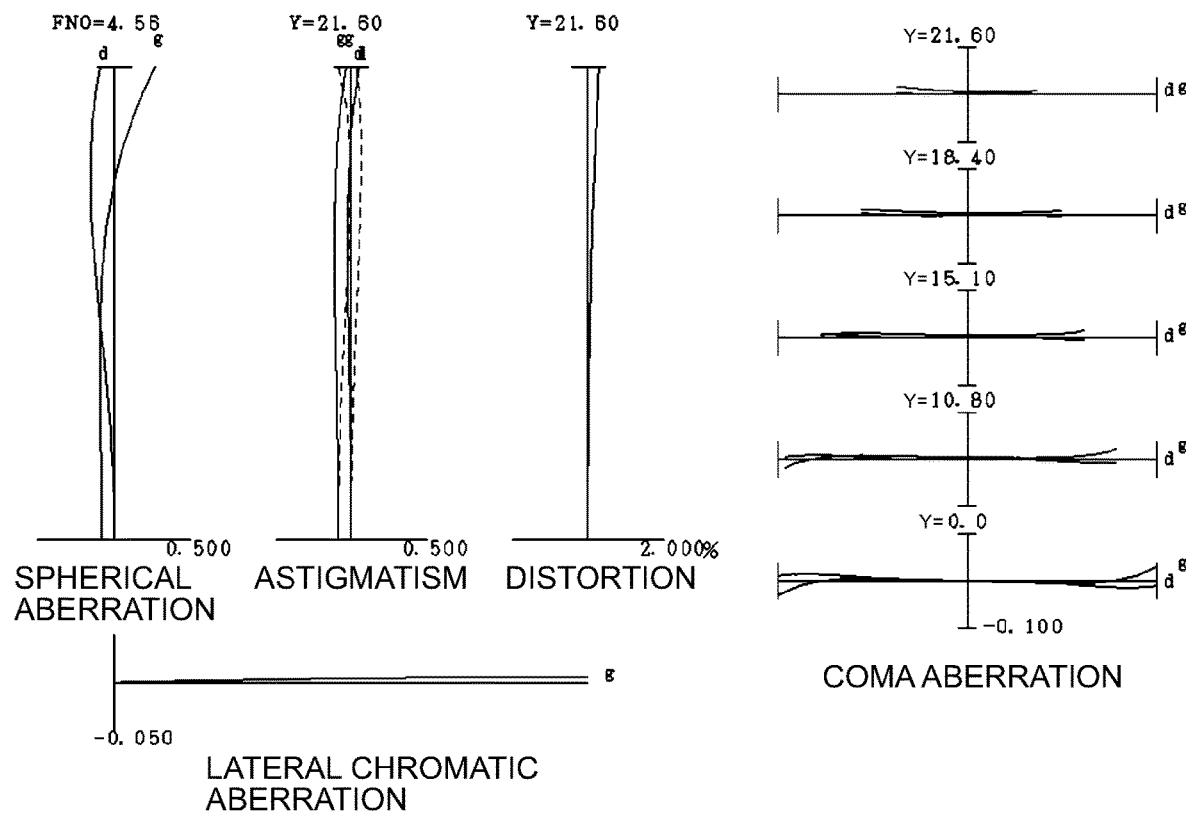
FIG. 2A is graphs showing various aberrations of the zoom optical system according to the first example upon focusing on infinity in the wide-angle end state.
Figure 2B:
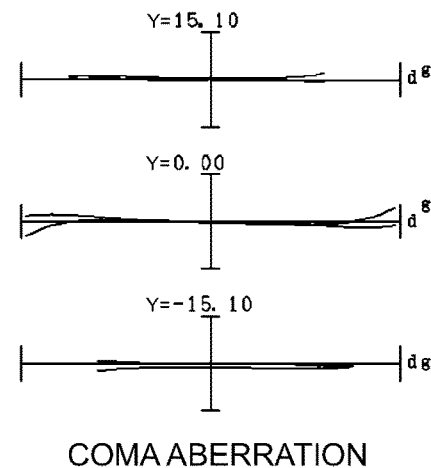
FIG. 2B is graphs showing meridional lateral aberrations when blur correction is applied to a rotational blur by 0.30°.
Figure 3:
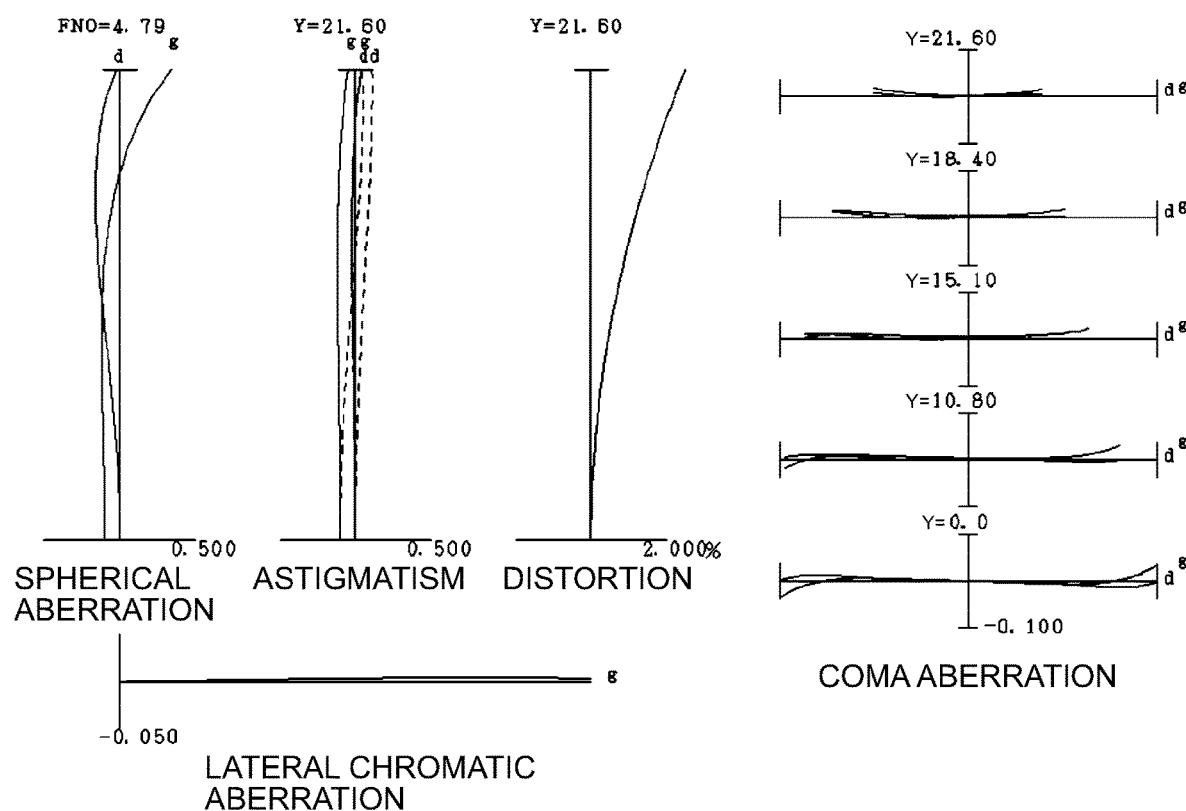
FIG. 3 is graphs showing various aberrations of the zoom optical system according to the first example upon focusing on infinity in the intermediate focal length state.
Figure 4A:
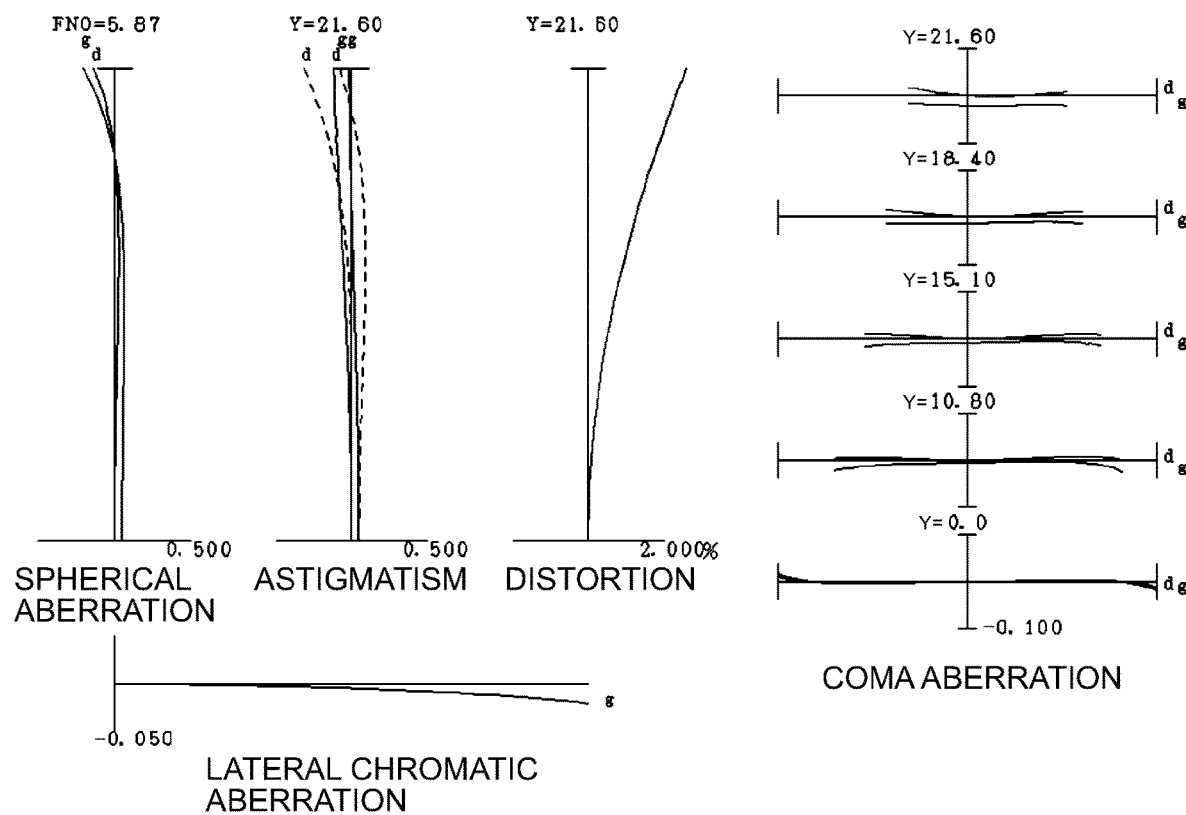
FIG. 4A is graphs showing various aberrations of the zoom optical system according to the first example upon focusing on infinity in the telephoto end state.
Figure 4B:
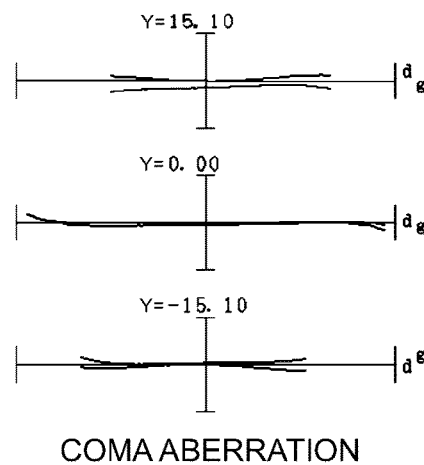
FIG. 4B is graphs showing meridional lateral aberrations when blur correction is applied to a rotational blur by 0.20°.
Figure 5C:
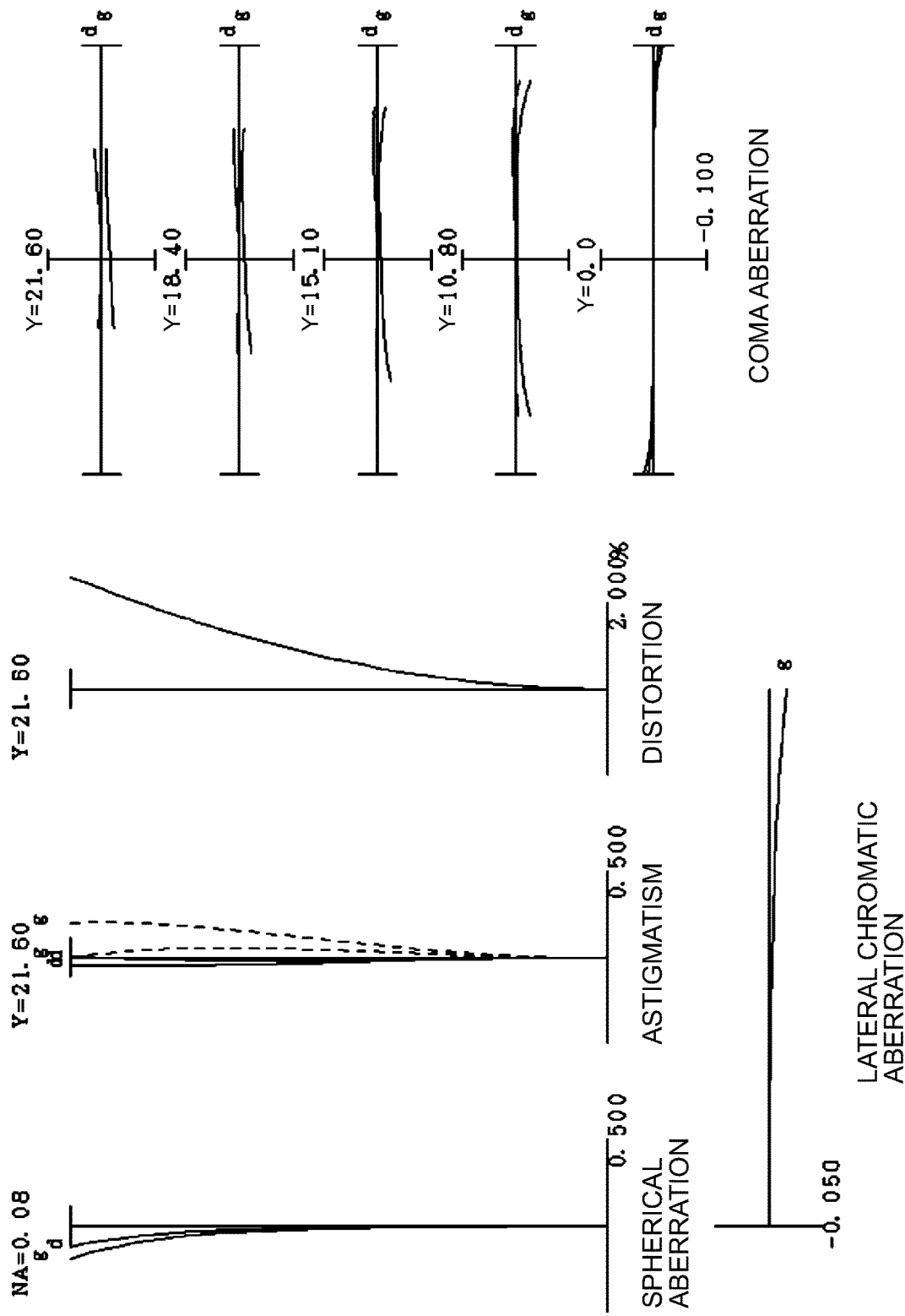

FIGS. 2A and 2B are graphs showing various aberrations of the zoom optical system having a vibration-proof function according to the first example upon focusing on infinity in the wide-angle end state, and graphs showing meridional lateral aberrations when blur correction is applied to a rotational blur by 0.30°, respectively. FIG. 3 is graphs showing various aberrations of the zoom optical system having the vibration-proof function according to the first example upon focusing on infinity in the intermediate focal length state. FIGS. 4A and 4B are graphs showing various aberrations of the zoom optical system having a vibration-proof function according to the first example upon focusing on infinity in the telephoto end state, and graphs showing meridional lateral aberrations when blur correction is applied to a rotational blur by 0.20°, respectively. FIGS. 5A, 5B and 5C are graphs showing various aberrations of the zoom optical system according to the first example upon focusing on a short distant object in the wide-angle end state, the intermediate focal length state, and the telephoto end state, respectively.

In the aberration graphs of FIGS. 2 to 5, FNO denotes the f-number, NA denotes the numerical aperture, and Y denotes the image height. Note that the spherical aberration graph shows the value of the f-number or the numerical aperture corresponding to the maximum aperture. The astigmatism graph and the distortion graph show the maximum value of the image height. The coma aberration graph shows the value of each image height. d denotes the d-line (wavelength λ=587.6 nm), and g denotes the g-line (wavelength λ=435.8 nm). In the astigmatism graph, solid lines indicate sagittal image surfaces, and broken lines indicate meridional image surfaces. Note that symbols analogous to those in this example are used also in the aberration graphs in the following examples. Redundant description is omitted.

The graphs showing various aberrations show that the zoom optical system according to first example favorably corrects the various aberrations and has excellent image forming performances from the wide-angle end state to the telephoto end state, and further has excellent image forming performances also upon focusing on a short distant object.

Second Example

The second example is described with reference to FIGS. 6 to 10 and Table 2. FIG. 6 shows a lens configuration of a zoom optical system according to the second example of this embodiment. The zoom optical system ZL(2) according to the second example consists of, in order from the object: a first lens group G1 having a positive refractive power; a second lens group G2 having a negative refractive power; a third lens group G3 having a positive refractive power; a fourth lens group G4 having a negative refractive power; and a fifth lens group G5 having a negative refractive power.

Upon zooming from the wide-angle end state (W) to the telephoto end state (T), the first to fifth lens groups G1 to G5 move in the directions indicated by the respective arrows in FIG. 6. In this example, the fourth lens group G4 and the fifth lens group G5 constitute the subsequent lens group GR.

The first lens group G1 consists of, in order from the object: a positive meniscus lens L11 having a convex surface facing the object; and a positive cemented lens consisting of a negative meniscus lens L12 having a convex surface facing the object, and a positive biconvex lens L13.

The second lens group G2 consists of, in order from the object: a negative meniscus lens L21 having a convex surface facing the object; a positive cemented lens consisting of a positive biconvex lens L22 and a negative biconcave lens L23; and a negative cemented lens consisting of a negative biconcave lens L24, and a positive meniscus lens L25 having a convex surface facing the object.

The third lens group G3 consists of, in order from the object: a positive biconvex lens L31; a positive cemented lens consisting of a positive biconvex lens L32 and a negative biconcave lens L33; an aperture stop S; a negative cemented lens consisting of a negative meniscus lens L34 having a convex surface facing the object, and a positive meniscus lens L35 having a convex surface facing the object; and a positive biconvex lens L36.

The fourth lens group G4 consists of, in order from the object: a positive meniscus lens L41 having a concave surface facing the object; and a negative biconcave lens L42.

The fifth lens group G5 consists of, in order from the object: a negative meniscus lens L51 having a concave surface facing the object; and a positive meniscus lens L52 having a convex surface facing the object. An image surface I is disposed to the image side of the fifth lens group G5.

In the zoom optical system ZL(2) according to the second example, the entire fourth lens group G4 constitutes the focusing lens group, and focusing from a long distant object to a short distant object is performed by moving the entire fourth lens group G4 in the image surface direction. In the zoom optical system ZL(2) according to the second example, the negative cemented lens, which consists of the negative lens L24 and the positive meniscus lens L25 of the second lens group G2, constitutes the vibration-proof lens group movable in a direction perpendicular to the optical axis, and corrects the imaging position displacement (image blur on the image surface I) due to a camera shake or the like.

Note that to correct a rotational blur with an angle θ at a lens having the focal length f of the entire system and a vibration proof coefficient K (the ratio of the amount of image movement on the image forming surface to the amount of movement of the movable lens group upon blur correction), the movable lens group for blur correction is moved in a direction orthogonal to the optical axis by (f·tan θ)/K. In the wide-angle end state in the second example, the vibration proof coefficient is 0.93, and the focal length is 72.1 mm. Accordingly, the amount of movement of the vibration-proof lens group to correct a rotational blur by 0.30° is 0.41 mm. In the telephoto end state in the second example, the vibration proof coefficient is 1.90, and the focal length is 292.0 mm. Accordingly, the amount of movement of the vibration-proof lens group to correct a rotational blur by 0.20° is 0.54 mm.

The following Table 2 lists the values of data on the optical system according to the second example.

TABLE 2

[Lens data]

| Surface No. | R | D | nd | νd |
|---|---|---|---|---|
| Object surface | ∞ | | | |
| 1 | 114.5391 | 5.639 | 1.48749 | 70.31 |
| 2 | 663.8041 | 0.200 | | |
| 3 | 103.9783 | 1.700 | 1.83400 | 37.18 |
| 4 | 62.4686 | 8.805 | 1.49700 | 81.73 |
| 5 | −43979.1830 | Variable | | |
| 6 | 146.6152 | 1.000 | 1.77250 | 49.62 |
| 7 | 35.8241 | 11.693 | | |
| 8 | 37.5245 | 4.696 | 1.68893 | 31.16 |
| 9 | −254.6834 | 1.000 | 1.83400 | 37.18 |
| 10 | 64.6045 | 5.066 | | |
| 11 | −60.5874 | 1.000 | 1.56883 | 56.00 |
| 12 | 39.1203 | 2.952 | 1.75520 | 27.57 |
| 13 | 93.1442 | Variable | | |
| 14 | 92.3597 | 3.688 | 1.80400 | 46.60 |
| 15 | −87.7395 | 0.200 | | |
| 16 | 36.8528 | 5.291 | 1.49700 | 81.73 |
| 17 | −63.3187 | 1.200 | 1.95000 | 29.37 |
| 18 | 264.8384 | 1.289 | | |
| 19 | ∞ | 19.911 | | (Stop S) |
| 20 | 52.0583 | 1.200 | 1.85026 | 32.35 |
| 21 | 20.7485 | 3.983 | 1.51680 | 63.88 |
| 22 | 439.3463 | 0.200 | | |
| 23 | 64.0215 | 2.788 | 1.62004 | 36.40 |
| 24 | −130.2911 | Variable | | |
| 25 | −343.5287 | 2.371 | 1.80518 | 25.45 |
| 26 | −47.6881 | 1.474 | | |
| 27 | −51.9782 | 1.000 | 1.77250 | 49.62 |
| 28 | 29.6298 | Variable | | |
| 29 | −21.0360 | 1.300 | 1.60300 | 65.44 |
| 30 | −30.1613 | 0.200 | | |
| 31 | 64.8879 | 2.981 | 1.57501 | 41.51 |
| 32 | 614.9077 | BF | | |
| Image surface | ∞ | | | |

[Various data]
Zooming ratio 4.05

| | W | M | T |
|---|---|---|---|
| f | 72.1 | 99.9 | 292.0 |
| FNO | 4.59 | 4.76 | 5.87 |
| 2ω | 33.22 | 23.72 | 8.22 |
| Ymax | 21.60 | 21.60 | 21.60 |
| TL | 191.32 | 205.16 | 240.15 |
| BF | 38.52 | 41.03 | 60.02 |

[Variable distance data]

| | W Infinity | M Infinity | T Infinity | W Short distance | M Short distance | T Short distance |
|---|---|---|---|---|---|---|
| d5 | 2.000 | 23.304 | 67.717 | 2.000 | 23.304 | 67.717 |
| d13 | 40.383 | 30.413 | 2.000 | 40.383 | 30.413 | 2.000 |
| d24 | 2.000 | 3.305 | 2.001 | 2.487 | 3.962 | 3.248 |
| d28 | 15.588 | 14.284 | 15.587 | 15.101 | 13.626 | 14.340 |

[Lens group data]

| Group | Starting surface | Focal Length |
|---|---|---|
| G1 | 1 | 161.728 |
| G2 | 6 | −38.469 |
| G3 | 14 | 38.469 |
| G4 | 25 | −39.083 |
| G5 | 29 | −12107.081 |

TABLE 2-continued

[Conditional expression corresponding value]

Conditional Expression (1) f1/(−f2) = 4.204
Conditional Expression (2) f1/f3 = 4.204
Conditional Expression (3) (−fF)/f1 = 0.242
Conditional Expression (4) (−f2)/f3 = 1.000
Conditional Expression (5) nN/nP = 0.894
Conditional Expression (6) νN/νP = 2.031
Conditional Expression (7) (−fN)/fP = 0.968

Figure 7A:
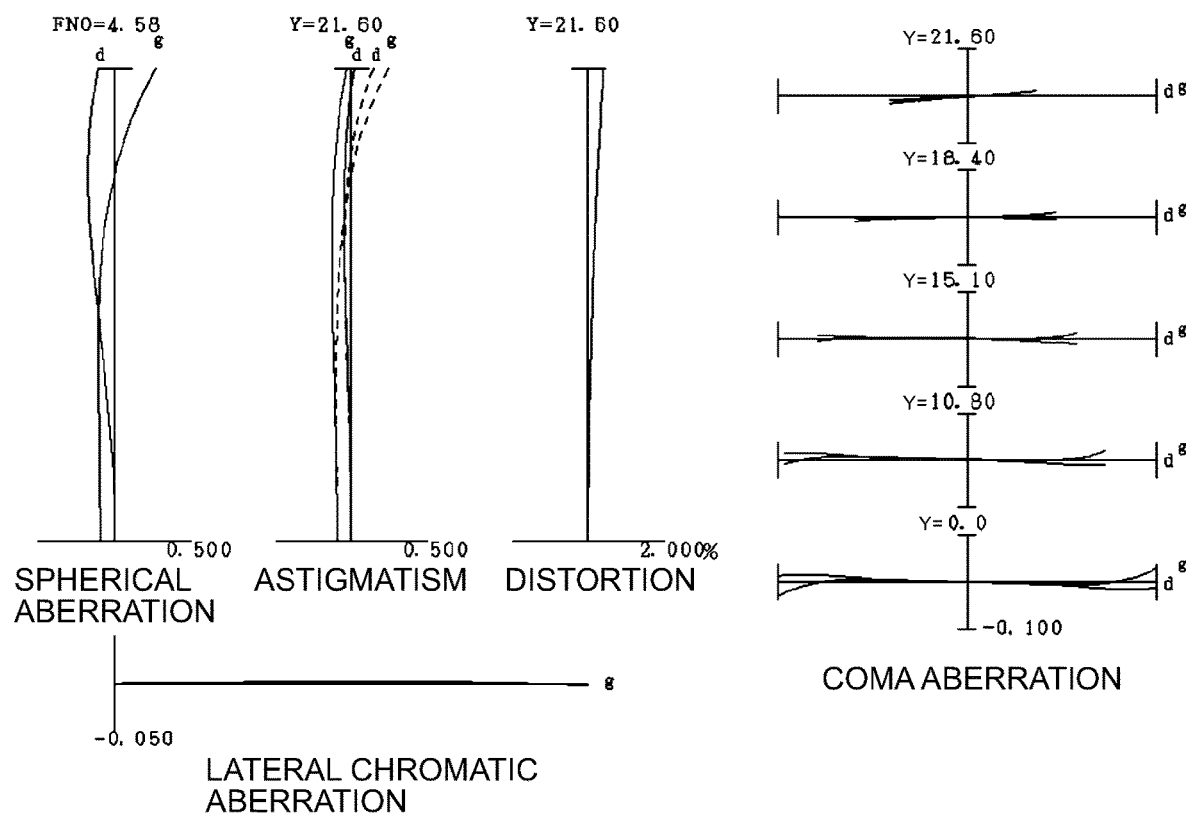
FIG. 7A is graphs showing various aberrations of the zoom optical system according to the second example upon focusing on infinity in the wide-angle end state.
Figure 7B:
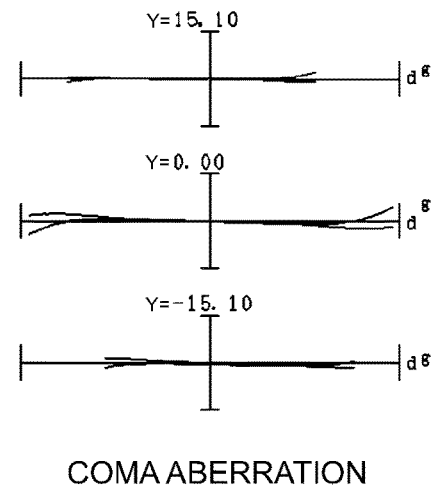
FIG. 7B is graphs showing meridional lateral aberrations when blur correction is applied to a rotational blur by 0.30°.
Figure 8:
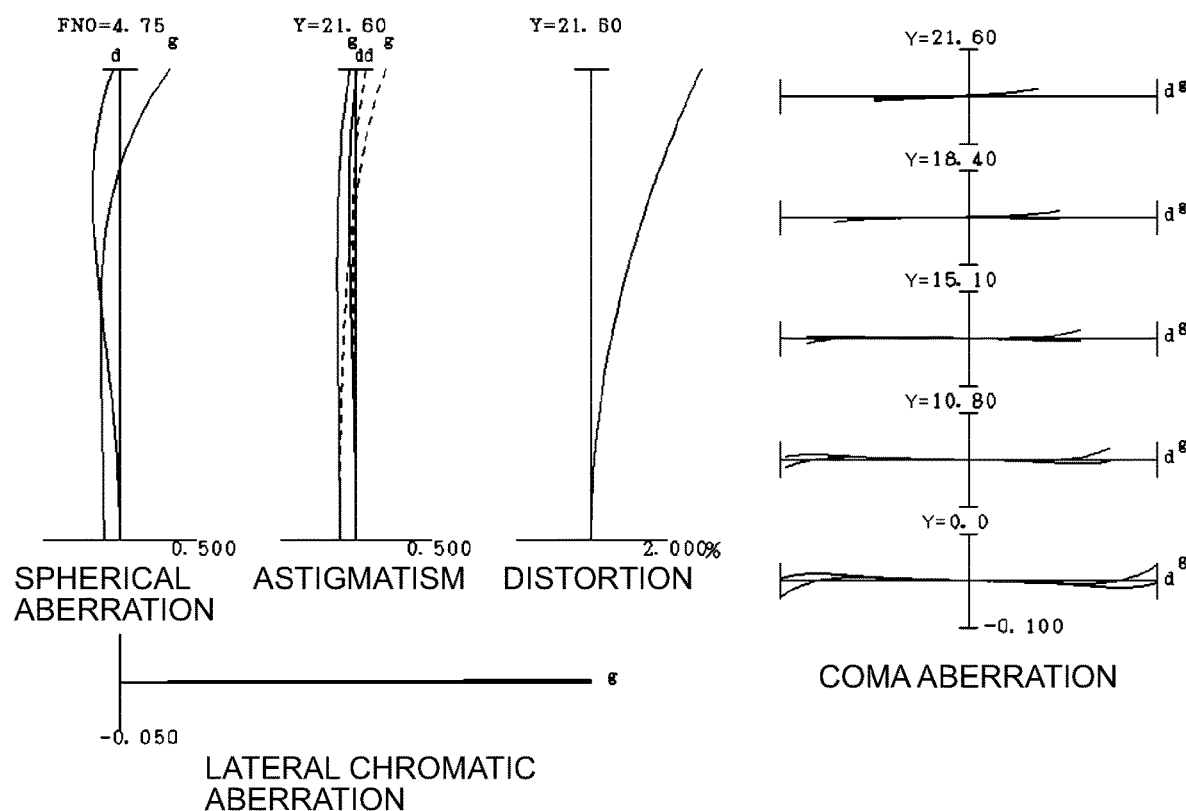
FIG. 8 is graphs showing various aberrations of the zoom optical system according to the second example upon focusing on infinity in the intermediate focal length state.
Figure 9A:
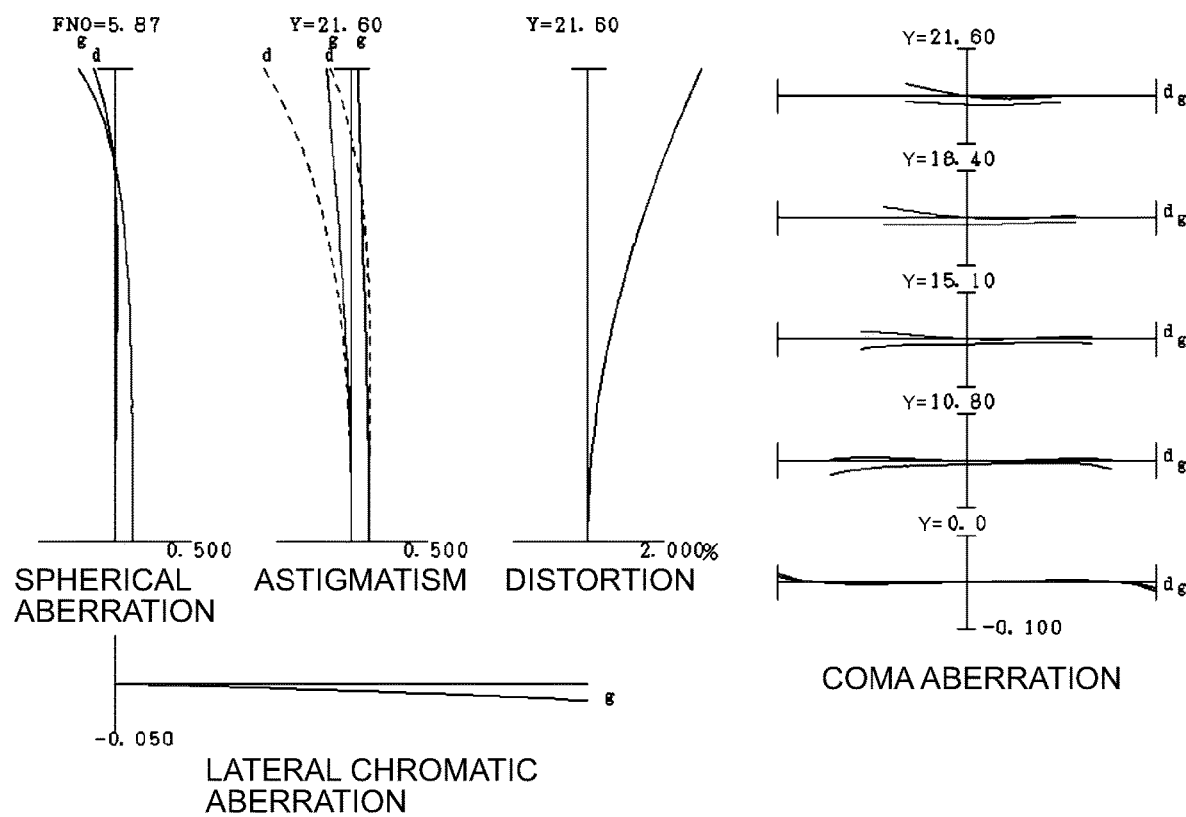
FIG. 9A is graphs showing various aberrations of the zoom optical system according to the second example upon focusing on infinity in the telephoto end state.
Figure 9B:
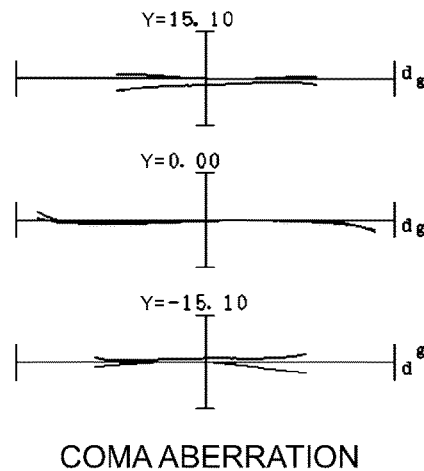
FIG. 9B is graphs showing meridional lateral aberrations when blur correction is applied to a rotational blur by 0.20°.
Figure 10B:
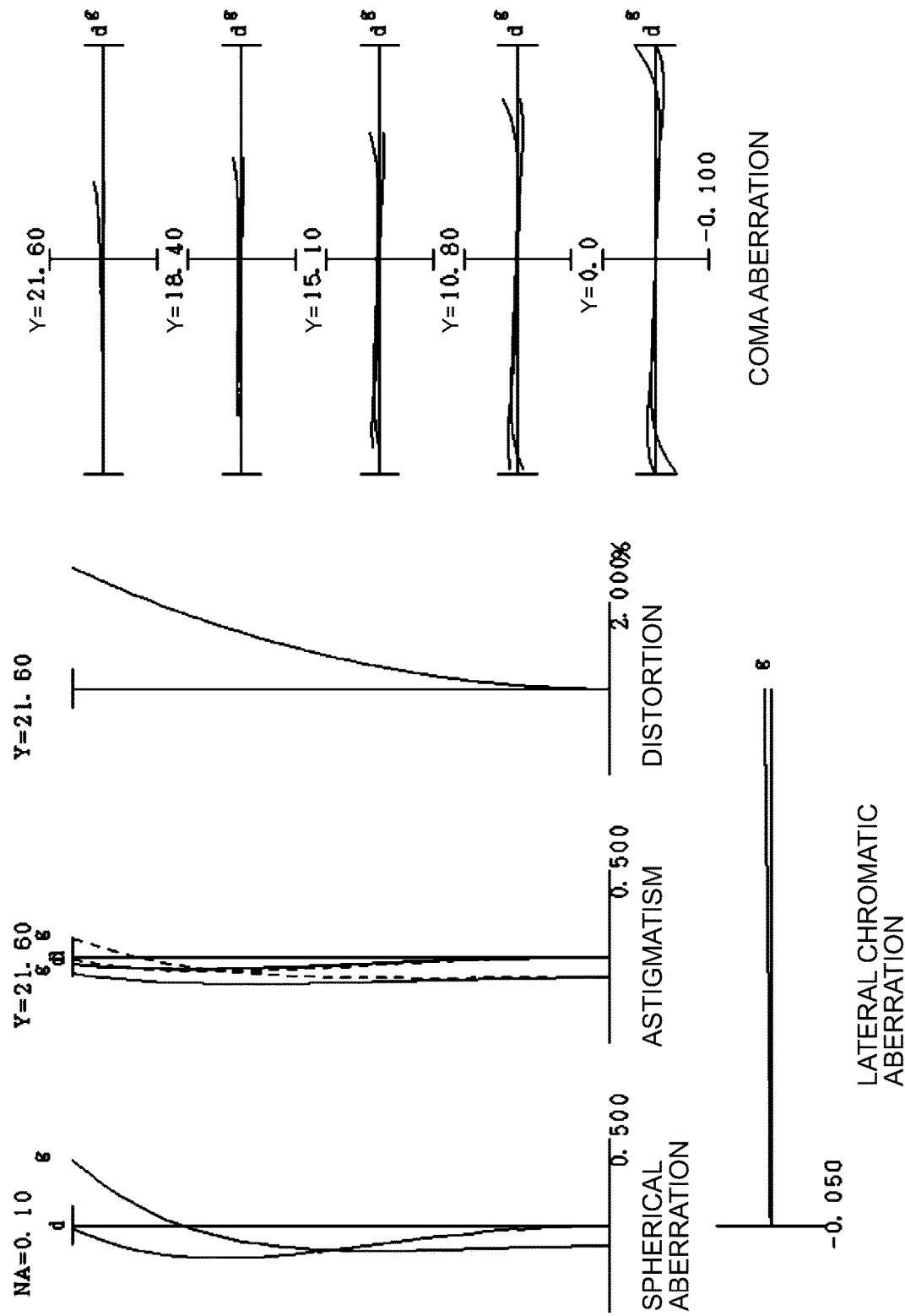

FIGS. 7A and 7B are graphs showing various aberrations of the zoom optical system having a vibration-proof function according to the second example upon focusing on infinity in the wide-angle end state, and graphs showing meridional lateral aberrations when blur correction is applied to a rotational blur by 0.30°, respectively. FIG. 8 is graphs showing various aberrations of the zoom optical system having the vibration-proof function according to the second example upon focusing on infinity in the intermediate focal length state. FIGS. 9A and 9B are graphs showing various aberrations of the zoom optical system having a vibration-proof function according to the second example upon focusing on infinity in the telephoto end state, and graphs showing meridional lateral aberrations when blur correction is applied to a rotational blur by 0.20°, respectively. FIGS. 10A, 10B and 10C are graphs showing various aberrations of the zoom optical system according to the second example upon focusing on a short distant object in the wide-angle end state, the intermediate focal length state, and the telephoto end state, respectively.

The graphs showing various aberrations show that the zoom optical system according to second example favorably corrects the various aberrations and has excellent image forming performances from the wide-angle end state to the telephoto end state, and further has excellent image forming performances also upon focusing on a short distant object.

Third Example

The third example is described with reference to FIGS. 11 to 15 and Table 3. FIG. 11 shows a lens configuration of a zoom optical system according to the third example of this embodiment. The zoom optical system ZL(3) according to the third example consists of, in order from the object: a first lens group G1 having a positive refractive power; a second lens group G2 having a negative refractive power; a third lens group G3 having a positive refractive power; a fourth lens group G4 having a negative refractive power; and a fifth lens group G5 having a positive refractive power. Upon zooming from the wide-angle end state (W) to the telephoto end state (T), the first to fifth lens groups G1 to G5 move in the directions indicated by the respective arrows in FIG. 11. In this example, the fourth lens group G4 and the fifth lens group G5 constitute the subsequent lens group GR.

The first lens group G1 consists of, in order from the object: a positive biconvex lens L11; and a positive cemented lens consisting of a negative meniscus lens L12 having a convex surface facing the object, and a positive biconvex lens L13.

The second lens group G2 consists of, in order from the object: a negative meniscus lens L21 having a convex surface facing the object; a positive cemented lens consisting of a positive biconvex lens L22 and a negative biconcave lens L23; and a negative cemented lens consisting of a negative biconcave lens L24, and a positive meniscus lens L25 having a convex surface facing the object.

The third lens group G3 consists of, in order from the object: a positive biconvex lens L31; a positive cemented lens consisting of a positive biconvex lens L32 and a negative biconcave lens L33; an aperture stop S; and a positive cemented lens consisting of a negative meniscus lens L34 having a convex surface facing the object, and a positive biconvex lens L35.

The fourth lens group G4 consists of, in order from the object: a positive meniscus lens L41 having a concave surface facing the object; and a negative biconcave lens L42.

The fifth lens group G5 consists of, in order from the object: a negative meniscus lens L51 having a concave surface facing the object; and a positive biconvex lens L52. An image surface I is disposed to the image side of the fifth lens group G5.

In the zoom optical system ZL(3) according to the third example, the entire fourth lens group G4 constitutes the focusing lens group, and focusing from a long distant object to a short distant object is performed by moving the entire fourth lens group G4 in the image surface direction. In the zoom optical system ZL(3) according to the third example, the negative cemented lens, which consists of the negative lens L24 and the positive meniscus lens L25 of the second lens group G2, constitutes the vibration-proof lens group movable in a direction perpendicular to the optical axis, and corrects the imaging position displacement (image blur on the image surface I) due to a camera shake or the like.

Note that to correct a rotational blur with an angle θ at a lens having the focal length f of the entire system and a vibration proof coefficient K (the ratio of the amount of image movement on the image forming surface to the amount of movement of the movable lens group upon blur correction), the movable lens group for blur correction is moved in a direction orthogonal to the optical axis by (f·tan θ)/K. In the wide-angle end state in the third example, the vibration proof coefficient is 0.96, and the focal length is 72.1 mm. Accordingly, the amount of movement of the vibration-proof lens group to correct a rotational blur by 0.30° is 0.39 mm. In the telephoto end state in the third example, the vibration proof coefficient is 2.00, and the focal length is 292.0 mm. Accordingly, the amount of movement of the vibration-proof lens group to correct a rotational blur by 0.20° is 0.51 mm.

The following Table 3 lists the values of data on the optical system according to the third example.

TABLE 3

[Lens data]

| Surface No. | R | D | nd | vd |
|---|---|---|---|---|
| Object surface | ∞ | | | |
| 1 | 268.8673 | 3.827 | 1.48749 | 70.31 |
| 2 | −1922.6559 | 0.200 | | |
| 3 | 111.5860 | 1.700 | 1.62004 | 36.40 |
| 4 | 61.6123 | 8.761 | 1.49700 | 81.73 |
| 5 | −1745.4439 | Variable | | |
| 6 | 124.2629 | 1.000 | 1.77250 | 49.62 |
| 7 | 34.3759 | 7.147 | | |
| 8 | 35.3149 | 5.189 | 1.60342 | 38.03 |
| 9 | −190.5775 | 1.000 | 1.77250 | 49.62 |
| 10 | 75.4448 | 4.904 | | |
| 11 | −65.2960 | 1.000 | 1.67003 | 47.14 |
| 12 | 37.2634 | 3.301 | 1.80518 | 25.45 |
| 13 | 119.9726 | Variable | | |
| 14 | 80.9765 | 3.968 | 1.77250 | 49.62 |
| 15 | −78.4621 | 0.200 | | |
| 16 | 33.2120 | 5.701 | 1.49700 | 81.73 |
| 17 | −56.7466 | 1.200 | 1.85026 | 32.35 |
| 18 | 108.8392 | 1.685 | | |
| 19 | ∞ | 18.569 | | (Stop S) |
| 20 | 40.1917 | 1.200 | 1.85026 | 32.35 |
| 21 | 18.3878 | 4.752 | 1.54814 | 45.79 |
| 22 | −98.0255 | Variable | | |
| 23 | −121.4042 | 2.367 | 1.75520 | 27.57 |
| 24 | −36.6433 | 2.111 | | |
| 25 | −37.5895 | 1.000 | 1.77250 | 49.62 |
| 26 | 35.8631 | Variable | | |
| 27 | −21.0000 | 1.300 | 1.60311 | 60.69 |
| 28 | −30.2149 | 0.200 | | |
| 29 | 95.7916 | 3.938 | 1.67003 | 47.14 |
| 30 | −115.9256 | BF | | |
| Image surface | ∞ | | | |

[Various data]
Zooming ratio 4.05

| | W | M | T |
|---|---|---|---|
| f | 72.1 | 99.9 | 292.0 |
| FNO | 4.61 | 4.79 | 5.87 |
| 2ω | 33.52 | 23.90 | 8.28 |
| Ymax | 21.60 | 21.60 | 21.60 |
| TL | 191.32 | 207.98 | 243.25 |
| BF | 38.52 | 41.37 | 61.52 |

[Variable distance data]

| | W Infinity | M Infinity | T Infinity | W Short distance | M Short distance | T Short distance |
|---|---|---|---|---|---|---|
| d5 | 2.000 | 25.429 | 72.273 | 2.000 | 25.429 | 72.273 |
| d13 | 43.342 | 33.718 | 2.000 | 43.342 | 33.718 | 2.000 |
| d22 | 2.000 | 3.210 | 3.710 | 2.512 | 3.900 | 5.147 |
| d26 | 19.235 | 18.025 | 17.525 | 18.723 | 17.335 | 16.088 |

[Lens group data]

| Group | Starting surface | Focal Length |
|---|---|---|
| G1 | 1 | 169.647 |
| G2 | 6 | −39.988 |
| G3 | 14 | 38.817 |
| G4 | 23 | −37.515 |
| G5 | 27 | 207.702 |

[Conditional expression corresponding value]

Conditional Expression (1) f1/(−f2) = 4.242
Conditional Expression (2) f1/f3 = 4.370
Conditional Expression (3) (−fF)/f1 = 0.221
Conditional Expression (4) (−f2)/f3 = 1.030
Conditional Expression (5) nN/nP = 0.925
Conditional Expression (6) νN/νP = 1.852
Conditional Expression (7) (−fN)/fP = 1.529

Figure 12A:
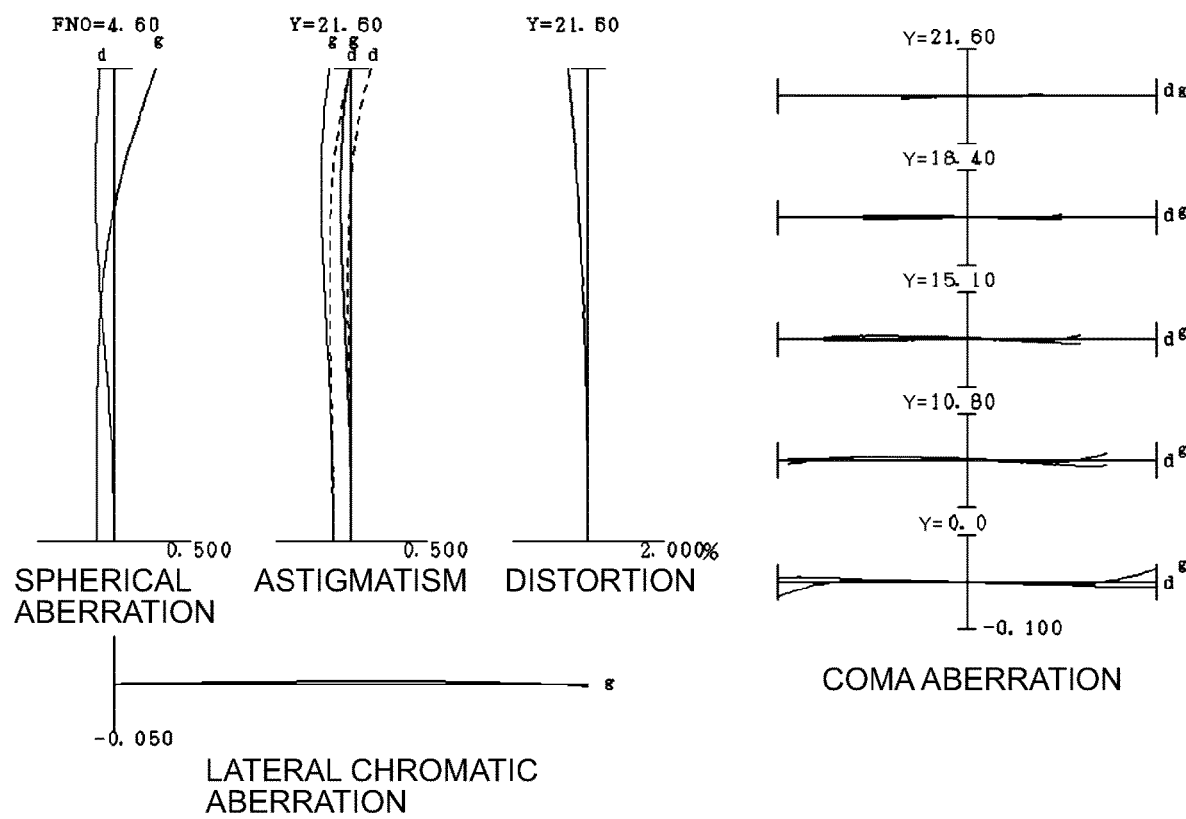
FIG. 12A is graphs showing various aberrations of the zoom optical system according to the third example upon focusing on infinity in the wide-angle end state.
Figure 12B:
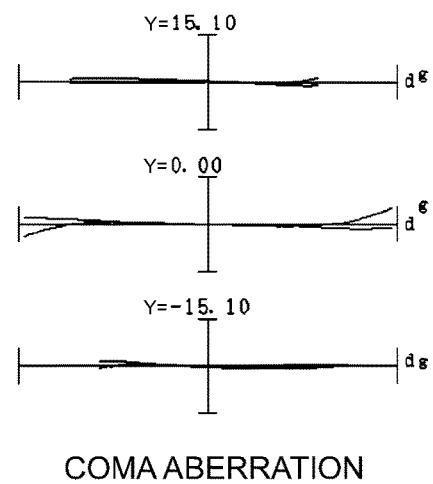
FIG. 12B is graphs showing meridional lateral aberrations when blur correction is applied to a rotational blur by 0.30°.
Figure 13:
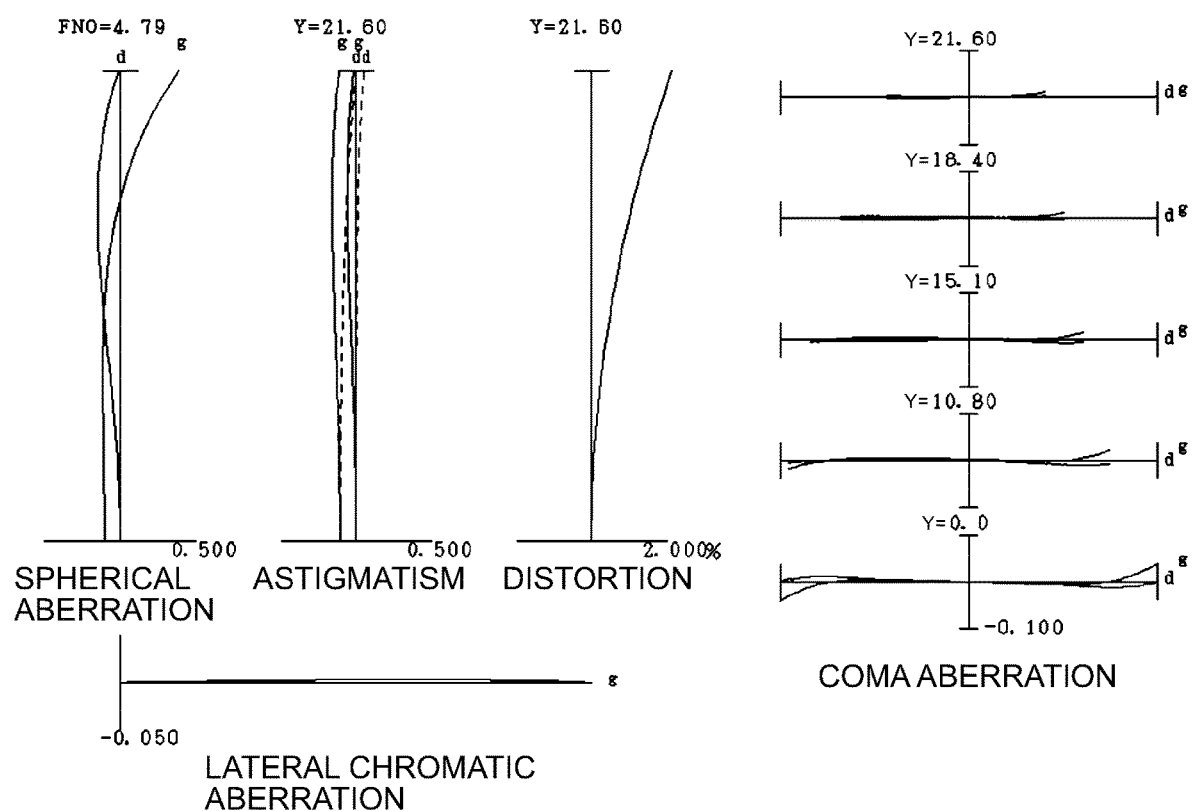
FIG. 13 is graphs showing various aberrations of the zoom optical system according to the third example upon focusing on infinity in the intermediate focal length state.
Figure 14A:
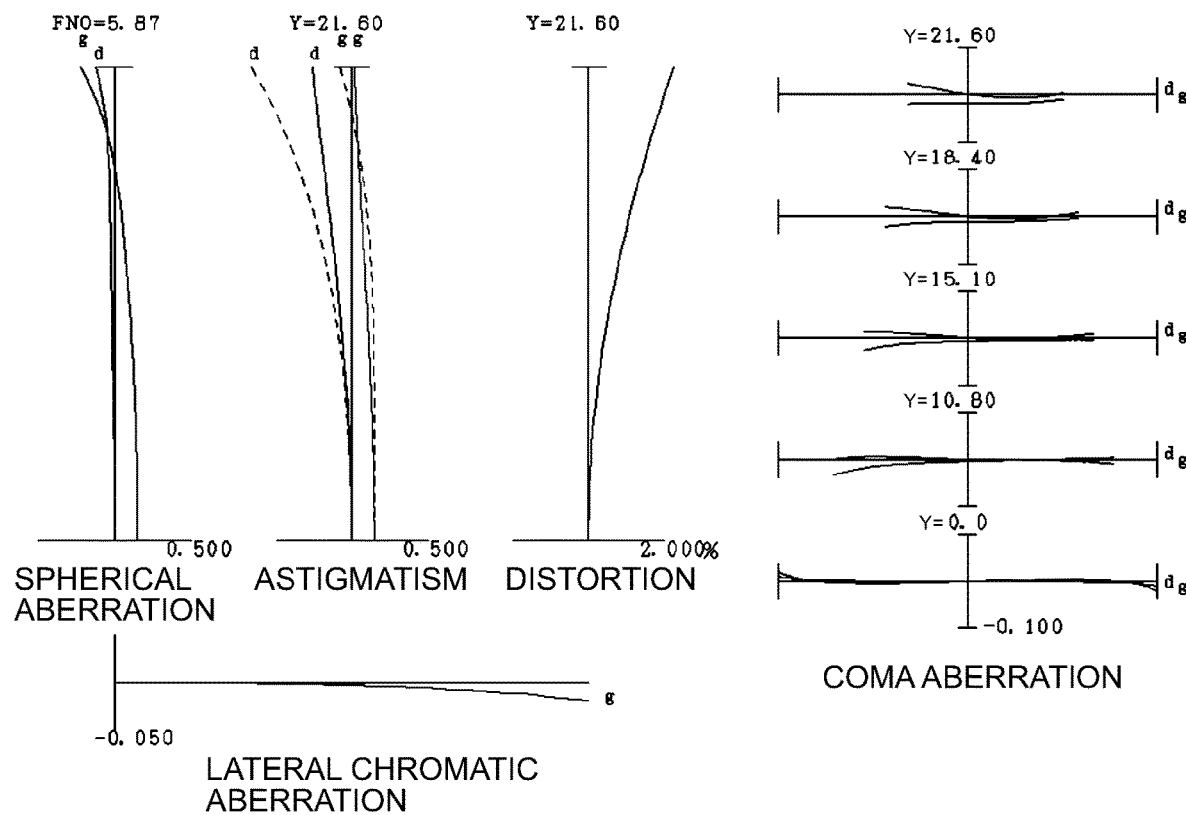
FIG. 14A is graphs showing various aberrations of the zoom optical system according to the third example upon focusing on infinity in the telephoto end state.
Figure 14B:
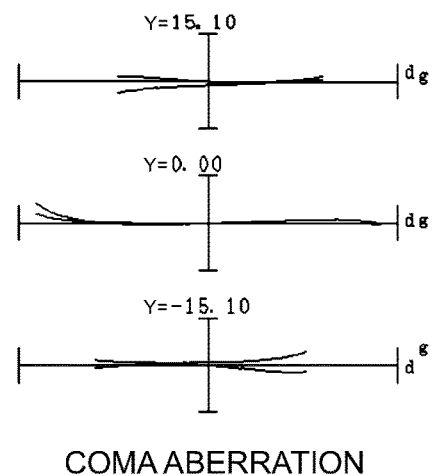
FIG. 14B is graphs showing meridional lateral aberrations when blur correction is applied to a rotational blur by 0.20°.
Figure 15B:
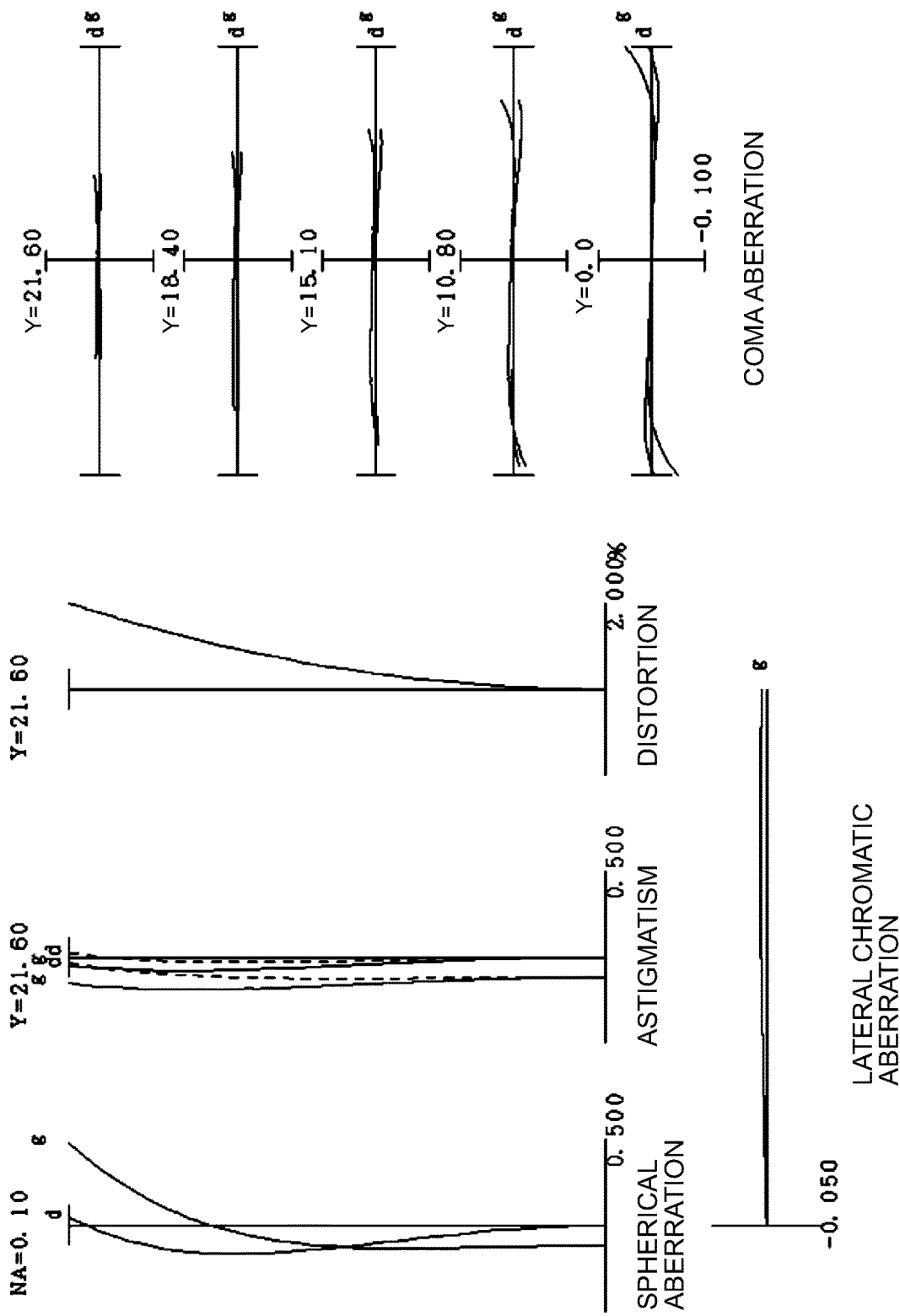

FIGS. 12A and 12B are graphs showing various aberrations of the zoom optical system having a vibration-proof function according to the third example upon focusing on infinity in the wide-angle end state, and graphs showing meridional lateral aberrations when blur correction is applied to a rotational blur by 0.30°, respectively. FIG. 13 is graphs showing various aberrations of the zoom optical system having the vibration-proof function according to the third example upon focusing on infinity in the intermediate focal length state. FIGS. 14A and 14B are graphs showing various aberrations of the zoom optical system having a vibration-proof function according to the third example upon focusing on infinity in the telephoto end state, and graphs showing meridional lateral aberrations when blur correction is applied to a rotational blur by 0.20°, respectively. FIGS. 15A, 15B and 15C are graphs showing various aberrations of the zoom optical system according to the third example upon focusing on a short distant object in the wide-angle end state, the intermediate focal length state, and the telephoto end state, respectively.

The graphs showing various aberrations show that the zoom optical system according to third example favorably corrects the various aberrations and has excellent image forming performances from the wide-angle end state to the telephoto end state, and further has excellent image forming performances also upon focusing on a short distant object.

Fourth Example

The fourth example is described with reference to FIGS. 16 to 20 and Table 4. FIG. 16 shows a lens configuration of a zoom optical system according to the fourth example of this embodiment. The zoom optical system ZL(4) according to the fourth example consists of, in order from the object: a first lens group G1 having a positive refractive power; a second lens group G2 having a negative refractive power; a third lens group G3 having a positive refractive power; and a fourth lens group G4 having a negative refractive power. Upon zooming from the wide-angle end state (W) to the telephoto end state (T), the first to fourth lens groups G1 to G4 move in the directions indicated by the respective arrows in FIG. 16. In this example, the fourth lens group G4 constitutes the subsequent lens group GR.

The first lens group G1 consists of, in order from the object: a positive biconvex lens L11; and a positive cemented lens consisting of a negative meniscus lens L12 having a convex surface facing the object, and a positive biconvex L13.

The second lens group G2 consists of, in order from the object: a negative meniscus lens L21 having a convex surface facing the object; a positive cemented lens consisting of a positive biconvex lens L22 and a negative biconcave lens L23; and a negative cemented lens consisting of a negative biconcave lens L24, and a positive meniscus lens L25 having a convex surface facing the object.

The third lens group G3 consists of, in order from the object: a positive biconvex lens L31; a positive cemented lens consisting of a positive biconvex lens L32 and a negative biconcave lens L33; an aperture stop S; and a positive cemented lens consisting of a negative meniscus lens L34 having a convex surface facing the object, and a positive biconvex lens L35.

The fourth lens group G4 consists of, in order from the object: a positive meniscus lens L41 having a concave surface facing the object; a negative biconcave lens L42; a negative meniscus lens L43 having a concave surface facing the object; and a positive biconvex lens L44. An image surface I is disposed to the image side of the fourth lens group G4.

In the zoom optical system ZL(4) according to the fourth example, the positive meniscus lens L41 and the negative lens L42 in the fourth lens group G4 constitute the focusing lens group, and focusing from a long distant object to a short distant object is performed by moving the positive meniscus lens L41 and the negative lens L42 in the fourth lens group G4 in the image surface direction. In the zoom optical system ZL(4) according to the fourth example, the negative cemented lens, which consists of the negative lens L24 and the positive meniscus lens L25 of the second lens group G2, constitutes the vibration-proof lens group movable in a direction perpendicular to the optical axis, and corrects the imaging position displacement (image blur on the image surface I) due to a camera shake or the like.

Note that to correct a rotational blur with an angle θ at a lens having the focal length f of the entire system and a vibration proof coefficient K (the ratio of the amount of image movement on the image forming surface to the amount of movement of the movable lens group upon blur correction), the movable lens group for blur correction is moved in a direction orthogonal to the optical axis by (f·tan θ)/K. In the wide-angle end state in the fourth example, the vibration proof coefficient is 1.05, and the focal length is 72.1 mm. Accordingly, the amount of movement of the vibration-proof lens group to correct a rotational blur by 0.30° is 0.36 mm. In the telephoto end state in the fourth example, the vibration proof coefficient is 2.20, and the focal length is 292.0 mm. Accordingly, the amount of movement of the vibration-proof lens group to correct a rotational blur by 0.20° is 0.46 mm.

The following Table 4 lists the values of data on the optical system according to the fourth example.

TABLE 4

| [Lens data] | | | | |
|---|---|---|---|---|
| Surface No. | R | D | nd | vd |
| Object surface | ∞ | | | |
| 1 | 384.8872 | 4.307 | 1.48749 | 70.31 |
| 2 | −459.3665 | 0.200 | | |
| 3 | 108.5471 | 1.700 | 1.62004 | 36.40 |
| 4 | 59.1633 | 8.722 | 1.49700 | 81.73 |
| 5 | −3828.8091 | Variable | | |
| 6 | 116.0785 | 1.000 | 1.77250 | 49.62 |
| 7 | 33.3782 | 6.789 | | |
| 8 | 34.8547 | 5.123 | 1.64769 | 33.73 |
| 9 | −166.2311 | 1.000 | 1.80400 | 46.60 |
| 10 | 68.6485 | 5.021 | | |
| 11 | −58.3172 | 1.000 | 1.66755 | 41.87 |
| 12 | 33.1524 | 3.543 | 1.80518 | 25.45 |
| 13 | 108.5224 | Variable | | |
| 14 | 80.6236 | 4.111 | 1.77250 | 49.62 |
| 15 | −73.7947 | 0.200 | | |
| 16 | 32.8485 | 5.846 | 1.49700 | 81.73 |
| 17 | −53.4390 | 1.200 | 1.85026 | 32.35 |
| 18 | 100.1735 | 1.748 | | |
| 19 | ∞ | 17.032 | | (Stop S) |
| 20 | 45.6071 | 1.200 | 1.80100 | 34.92 |
| 21 | 18.9488 | 5.048 | 1.54814 | 45.79 |
| 22 | −90.5382 | Variable | | |
| 23 | −106.0821 | 2.387 | 1.72825 | 28.38 |
| 24 | −35.2284 | 2.066 | | |
| 25 | −36.8890 | 1.000 | 1.77250 | 49.62 |
| 26 | 46.9619 | Variable | | |
| 27 | −21.5153 | 1.300 | 1.60311 | 60.69 |
| 28 | −31.7338 | 0.200 | | |
| 29 | 126.4587 | 3.612 | 1.77250 | 49.62 |
| 30 | −132.9868 | BF | | |
| Image surface | ∞ | | | |

| [Various data] Zooming ratio 4.05 | | | |
|---|---|---|---|
| | W | M | T |
| f | 72.1 | 99.9 | 292.0 |
| FNO | 4.60 | 4.77 | 5.88 |
| 2ω | 33.56 | 23.82 | 8.26 |
| Ymax | 21.60 | 21.60 | 21.60 |
| TL | 192.32 | 210.67 | 244.12 |
| BF | 38.52 | 40.08 | 57.94 |

TABLE 4-continued

[Variable distance data]

|  | W Infinity | M Infinity | T Infinity | W Short distance | M Short distance | T Short distance |
|---|---|---|---|---|---|---|
| d5 | 2.000 | 25.713 | 69.580 | 2.000 | 25.713 | 69.580 |
| d13 | 40.783 | 32.701 | 2.000 | 40.783 | 32.701 | 2.000 |
| d22 | 2.000 | 3.163 | 5.584 | 2.559 | 3.917 | 7.234 |
| d26 | 23.661 | 23.661 | 23.661 | 23.103 | 22.908 | 22.012 |

[Lens group data]

| Group | Starting surface | Focal Length |
|---|---|---|
| G1 | 1 | 164.404 |
| G2 | 6 | −37.386 |
| G3 | 14 | 38.634 |
| G4 | 23 | −61.380 |

[Conditional expression corresponding value]

Conditional Expression (1) f1/(−f2) = 4.397
Conditional Expression (2) f1/f3 = 4.255
Conditional Expression (3) (−fF)/f1 = 0.268
Conditional Expression (4) (−f2)/f3 = 0.968
Conditional Expression (5) nN/nP = 0.924
Conditional Expression (6) vN/vP = 1.645
Conditional Expression (7) (−fN)/fP = 1.378

Figure 17A:
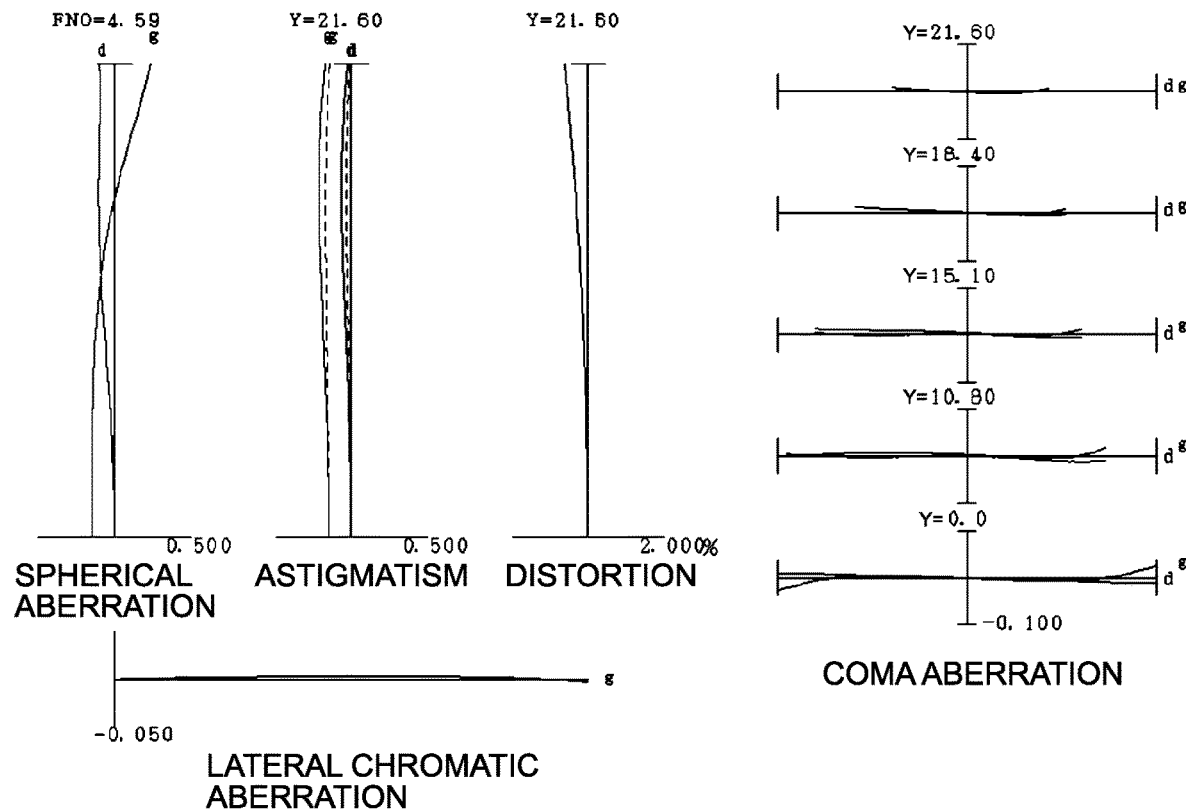
FIG. 17A is graphs showing various aberrations of the zoom optical system according to the fourth example upon focusing on infinity in the wide-angle end state.
Figure 17B:
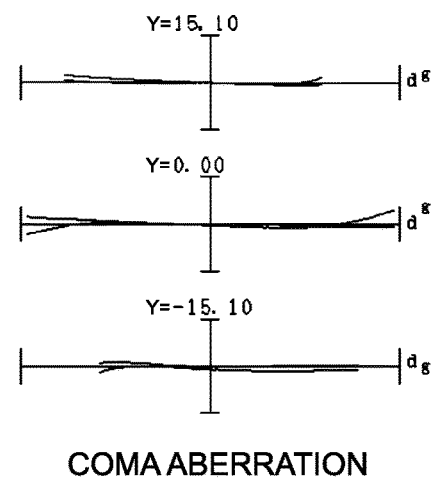
FIG. 17B is graphs showing meridional lateral aberrations when blur correction is applied to a rotational blur by 0.30°.
Figure 18:
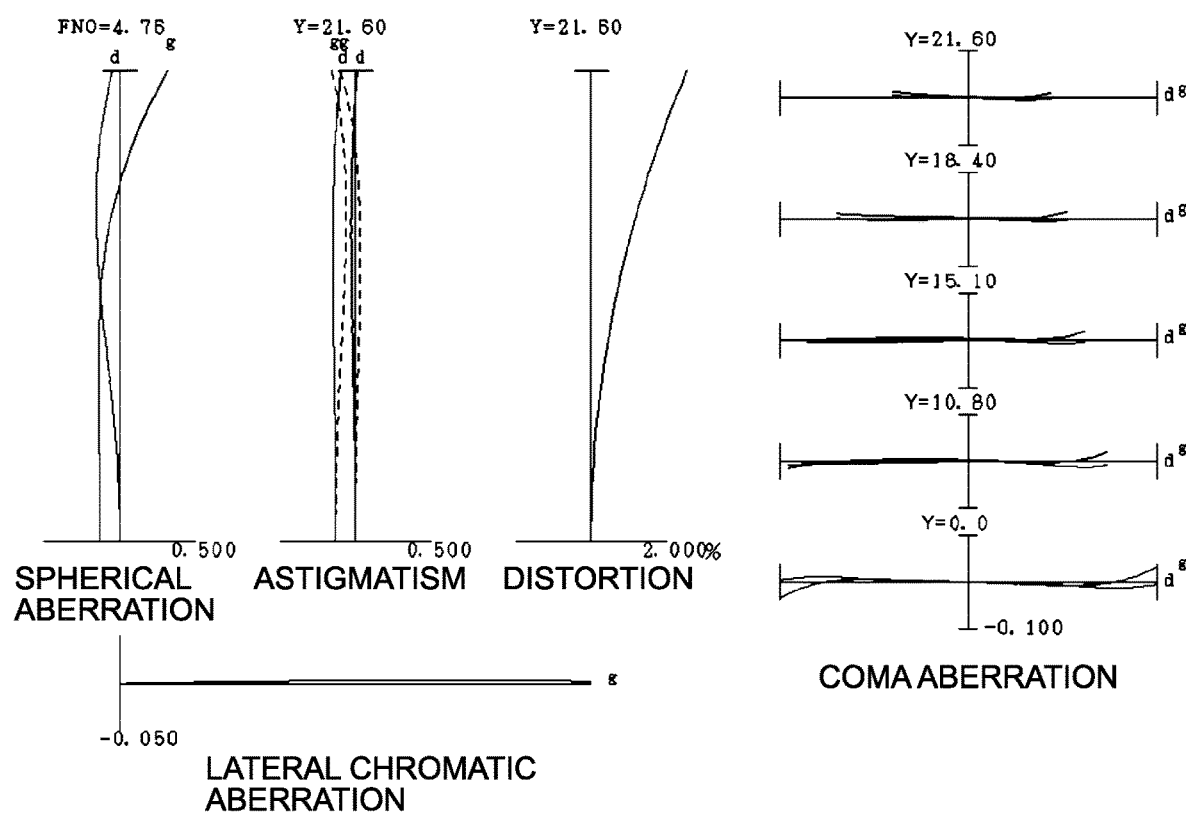
FIG. 18 is graphs showing various aberrations of the zoom optical system according to the fourth example upon focusing on infinity in the intermediate focal length state.
Figure 19A:
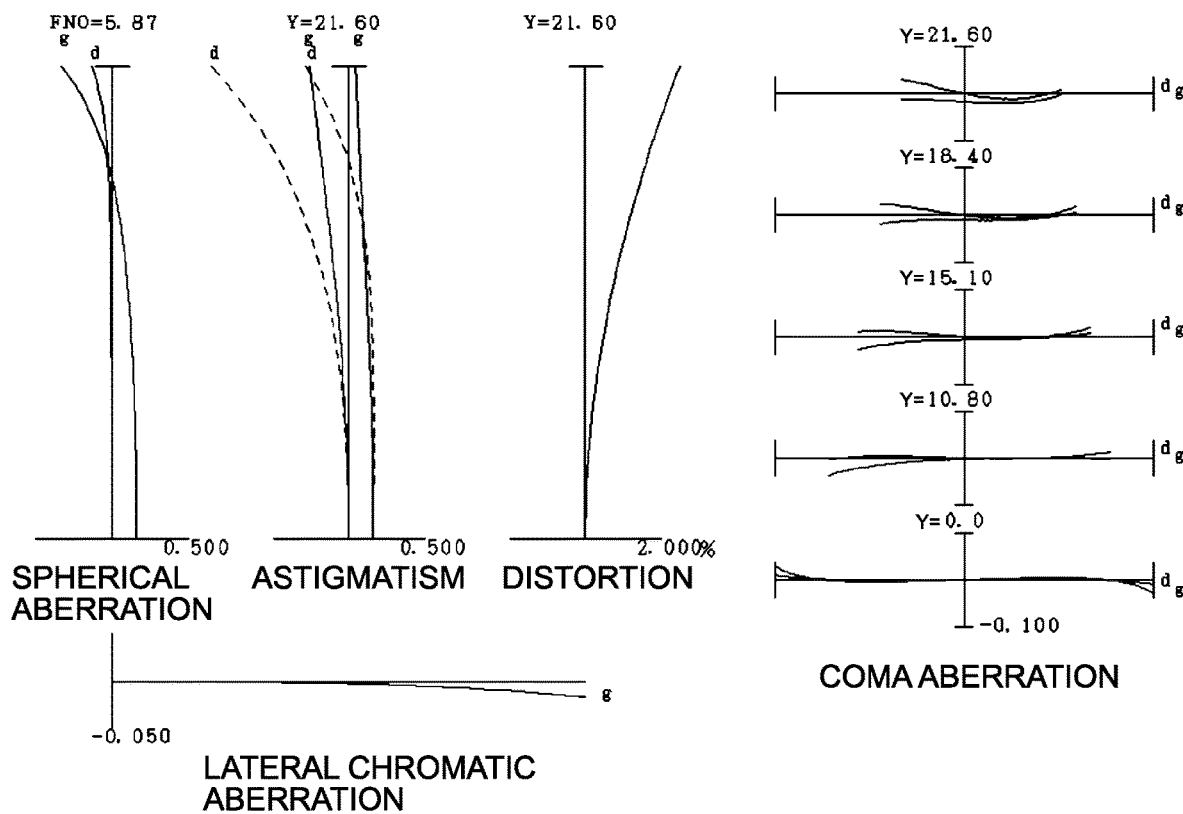
FIG. 19A is graphs showing various aberrations of the zoom optical system according to the fourth example upon focusing on infinity in the telephoto end state.
Figure 19B:
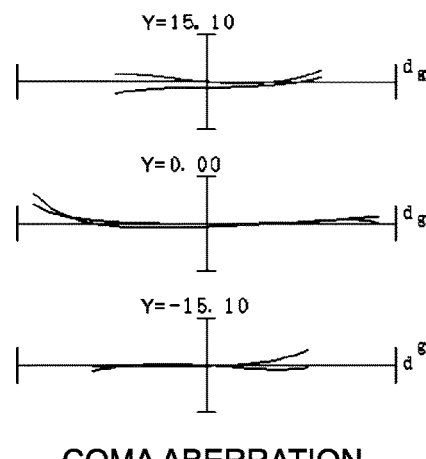
FIG. 19B is graphs showing meridional lateral aberrations when blur correction is applied to a rotational blur by 0.20°.

FIGS. 17A and 17B are graphs showing various aberrations of the zoom optical system having a vibration-proof function according to the fourth example upon focusing on infinity in the wide-angle end state, and graphs showing meridional lateral aberrations when blur correction is applied to a rotational blur by 0.30°, respectively. FIG. 18 is graphs showing various aberrations of the zoom optical system having the vibration-proof function according to the fourth example upon focusing on infinity in the intermediate focal length state. FIGS. 19A and 19B are graphs showing various aberrations of the zoom optical system having a vibration-proof function according to the fourth example upon focusing on infinity in the telephoto end state, and graphs showing meridional lateral aberrations when blur correction is applied to a rotational blur by 0.20°, respectively. FIGS. 20A, 20B and 20C are graphs showing various aberrations of the zoom optical system according to the fourth example upon focusing on a short distant object in the wide-angle end state, the intermediate focal length state, and the telephoto end state, respectively.

The graphs showing various aberrations show that the zoom optical system according to fourth example favorably corrects the various aberrations and has excellent image forming performances from the wide-angle end state to the telephoto end state, and further has excellent image forming performances also upon focusing on a short distant object.

Fifth Example

The fifth example is described with reference to FIGS. 21 to 25 and Table 5. FIG. 21 shows a lens configuration of a zoom optical system according to the fifth example of this embodiment. The zoom optical system ZL(5) according to the fifth example consists of, in order from the object: a first lens group G1 having a positive refractive power; a second lens group G2 having a negative refractive power; a third lens group G3 having a positive refractive power; a fourth lens group G4 having a negative refractive power; and a fifth lens group G5 having a positive refractive power. Upon zooming from the wide-angle end state (W) to the telephoto end state (T), the first to fifth lens groups G1 to G5 move in the directions indicated by the respective arrows in FIG. 21. In this example, the fourth lens group G4 and the fifth lens group G5 constitute the subsequent lens group GR.

The first lens group G1 consists of, in order from the object: a positive biconvex lens L11; and a positive cemented lens consisting of a negative meniscus lens L12 having a convex surface facing the object, and a positive biconvex lens L13.

The second lens group G2 consists of, in order from the object: a negative meniscus lens L21 having a convex surface facing the object; a positive meniscus lens L22 having a convex surface facing the object; and a negative cemented lens consisting of a negative biconcave lens L23, and a positive meniscus lens L24 having a convex surface facing the object.

The third lens group G3 consists of, in order from the object: a positive biconvex lens L31; a positive cemented lens consisting of a positive biconvex lens L32 and a negative biconcave lens L33; an aperture stop S; and a positive cemented lens consisting of a negative meniscus lens L34 having a convex surface facing the object, and a positive biconvex lens L35.

The fourth lens group G4 consists of, in order from the object: a positive meniscus lens L41 having a concave surface facing the object; and a negative biconcave lens L42.

The fifth lens group G5 consists of, in order from the object: a negative meniscus lens L51 having a concave surface facing the object; and a positive biconvex lens L52. An image surface I is disposed to the image side of the fifth lens group G5.

In the zoom optical system ZL(5) according to the fifth example, the entire fourth lens group G4 constitutes the focusing lens group, and focusing from a long distant object to a short distant object is performed by moving the entire fourth lens group G4 in the image surface direction. In the zoom optical system ZL(5) according to the fifth example, the negative cemented lens, which consists of the negative lens L23 and the positive meniscus lens L24 of the second lens group G2, constitutes the vibration-proof lens group movable in a direction perpendicular to the optical axis, and corrects the imaging position displacement (image blur on the image surface I) due to a camera shake or the like.

Note that to correct a rotational blur with an angle θ at a lens having the focal length f of the entire system and a vibration proof coefficient K (the ratio of the amount of image movement on the image forming surface to the amount of movement of the movable lens group upon blur correction), the movable lens group for blur correction is moved in a direction orthogonal to the optical axis by (f·tan θ)/K. In the wide-angle end state in the fifth example, the vibration proof coefficient is 1.02, and the focal length is 72.1 mm. Accordingly, the amount of movement of the vibration-proof lens group to correct a rotational blur by 0.30° is 0.37 mm. In the telephoto end state in the fifth example, the vibration proof coefficient is 2.10, and the focal length is 292.0 mm. Accordingly, the amount of movement of the vibration-proof lens group to correct a rotational blur by 0.20° is 0.49 mm.

The following Table 5 lists the values of data on the optical system according to the fifth example.

TABLE 5

[Lens data]

| Surface No. | R | D | nd | νd |
|---|---|---|---|---|
| Object surface | ∞ | | | |
| 1 | 494.4763 | 3.486 | 1.48749 | 70.31 |
| 2 | −654.7200 | 0.200 | | |
| 3 | 104.3848 | 1.700 | 1.62004 | 36.40 |
| 4 | 60.0944 | 8.673 | 1.49700 | 81.73 |
| 5 | −2277.9468 | Variable | | |
| 6 | 131.3496 | 1.300 | 1.80400 | 46.60 |
| 7 | 35.6812 | 7.900 | | |
| 8 | 36.7192 | 2.871 | 1.68893 | 31.16 |
| 9 | 62.4101 | 4.726 | | |
| 10 | −66.4912 | 1.000 | 1.70000 | 48.11 |
| 11 | 36.3174 | 3.414 | 1.80518 | 25.45 |
| 12 | 127.2974 | Variable | | |
| 13 | 90.0733 | 3.862 | 1.80400 | 46.60 |
| 14 | −78.6804 | 0.200 | | |
| 15 | 33.8033 | 5.583 | 1.49700 | 81.73 |
| 16 | −57.6791 | 1.200 | 1.85026 | 32.35 |
| 17 | 101.7237 | 1.726 | | |
| 18 | ∞ | 19.598 | | (Stop S) |
| 19 | 49.9975 | 1.200 | 1.85026 | 32.35 |
| 20 | 20.1023 | 4.713 | 1.54814 | 45.79 |
| 21 | −72.4003 | Variable | | |
| 22 | −158.4470 | 2.458 | 1.71736 | 29.57 |
| 23 | −37.7406 | 1.732 | | |
| 24 | −39.9149 | 1.000 | 1.77250 | 49.62 |
| 25 | 43.7406 | Variable | | |
| 26 | −22.3495 | 1.300 | 1.69680 | 55.52 |
| 27 | −32.8093 | 0.200 | | |
| 28 | 139.7659 | 3.301 | 1.80610 | 40.97 |
| 29 | −141.5832 | BF | | |
| Image surface | ∞ | | | |

[Various data]
Zooming ratio 4.05

| | W | M | T |
|---|---|---|---|
| f | 72.1 | 99.9 | 292.0 |
| FNO | 4.68 | 4.85 | 5.88 |
| 2ω | 33.48 | 23.86 | 8.26 |
| Ymax | 21.60 | 21.60 | 21.60 |
| TL | 192.32 | 208.96 | 243.67 |
| BF | 38.32 | 41.06 | 60.32 |

[Variable distance data]

| | W Infinity | M Infinity | T Infinity | W Short distance | M Short distance | T Short distance |
|---|---|---|---|---|---|---|
| d5 | 2.000 | 26.074 | 74.834 | 2.000 | 26.074 | 77.834 |
| d12 | 45.487 | 35.318 | 2.000 | 45.487 | 35.318 | 2.000 |
| d21 | 2.000 | 3.315 | 2.845 | 2.597 | 4.123 | 4.511 |
| d25 | 21.171 | 19.856 | 20.326 | 20.574 | 19.048 | 18.660 |

[Lens group data]

| Group | Starting surface | Focal Length |
|---|---|---|
| G1 | 1 | 171.348 |
| G2 | 6 | −41.929 |
| G3 | 13 | 40.969 |
| G4 | 22 | −45.959 |
| G5 | 26 | 423.598 |

[Conditional expression corresponding value]

Conditional Expression (1) f1/(−f2) = 4.087
Conditional Expression (2) f1/f3 = 4.182

TABLE 5-continued

Conditional Expression (3) (−fF)/f1 = 0.268
Conditional Expression (4) (−f2)/f3 = 1.023
Conditional Expression (5) nN/nP = 0.942
Conditional Expression (6) νN/νP = 1.890
Conditional Expression (7) (−fN)/fP = 1.209

Figure 22A:
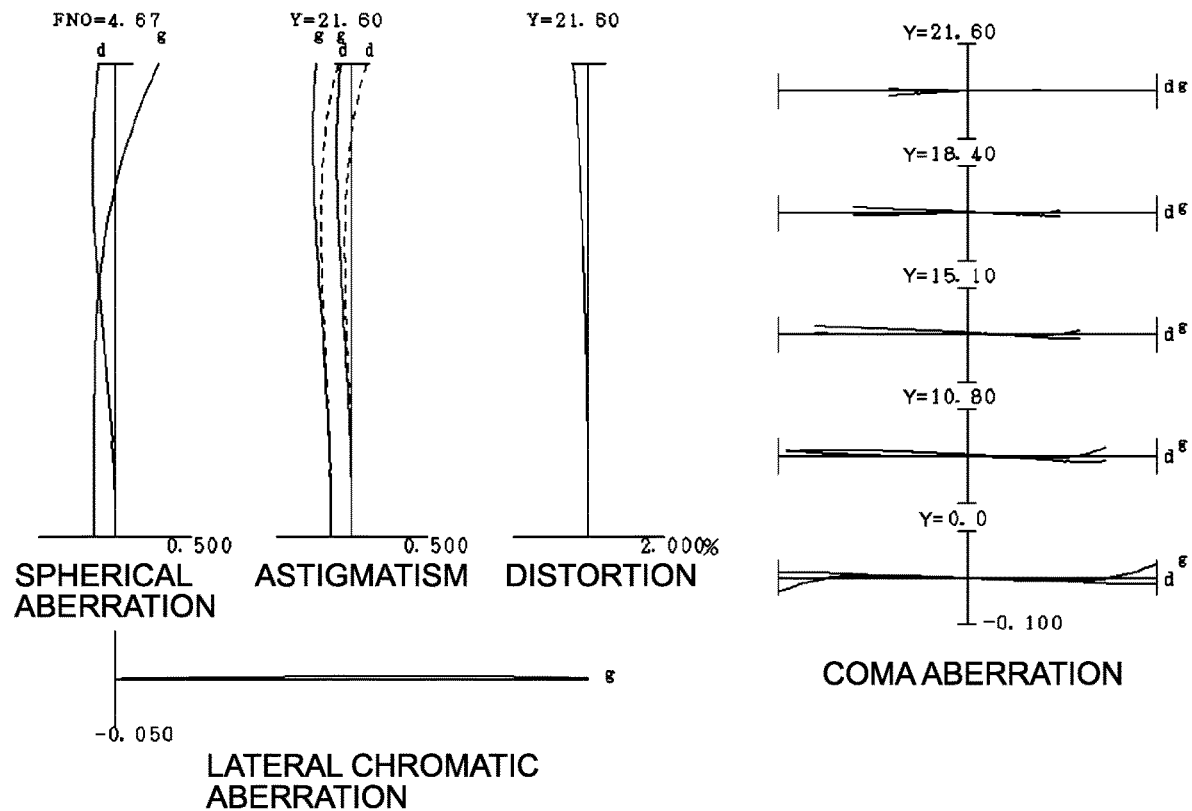
FIG. 22A is graphs showing various aberrations of the zoom optical system according to the fifth example upon focusing on infinity in the wide-angle end state.
Figure 22B:
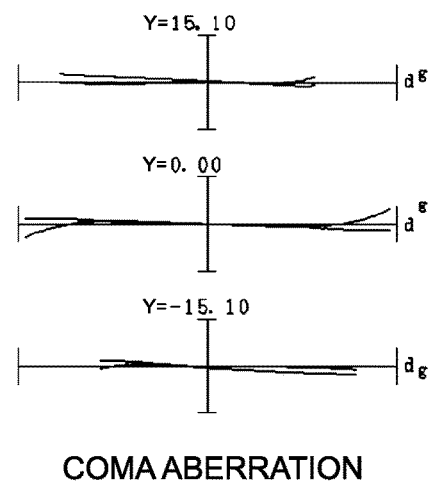
FIG. 22B is graphs showing meridional lateral aberrations when blur correction is applied to a rotational blur by 0.30°.
Figure 23:
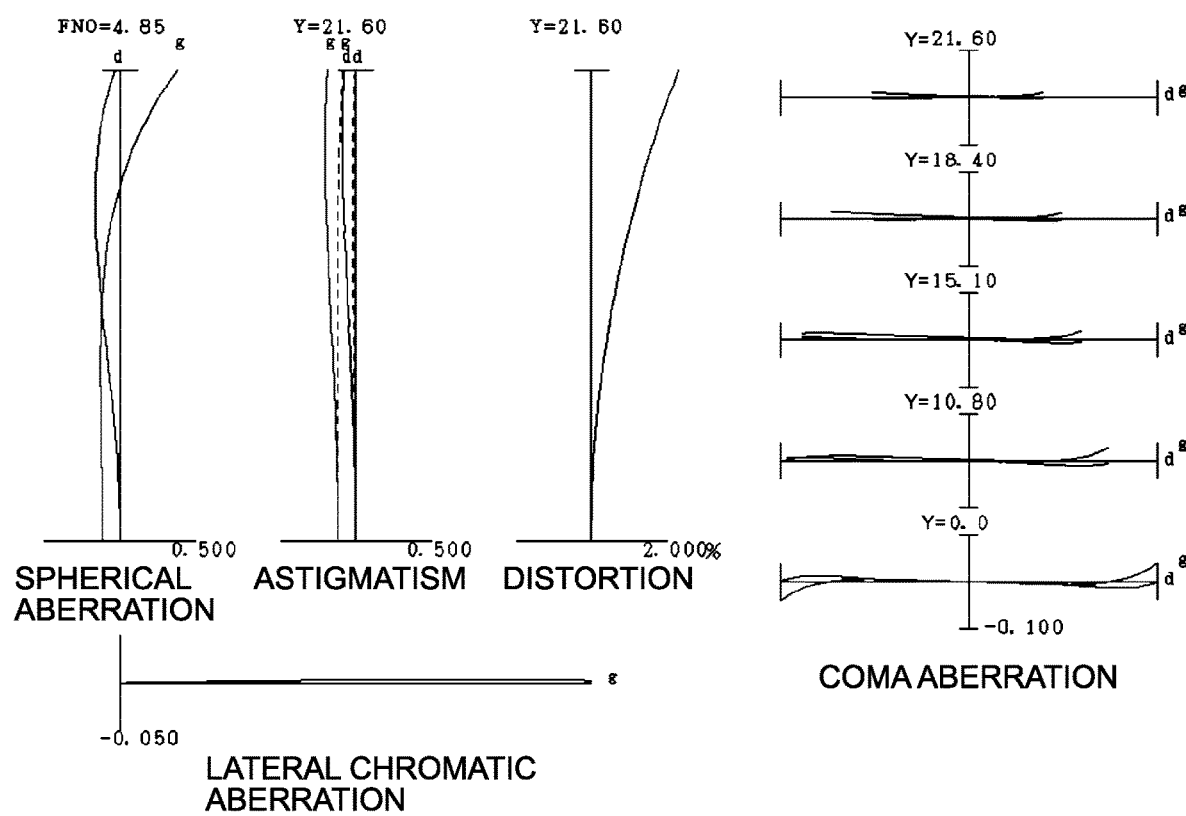
FIG. 23 is graphs showing various aberrations of the zoom optical system according to the fifth example upon focusing on infinity in the intermediate focal length state.
Figure 24A:
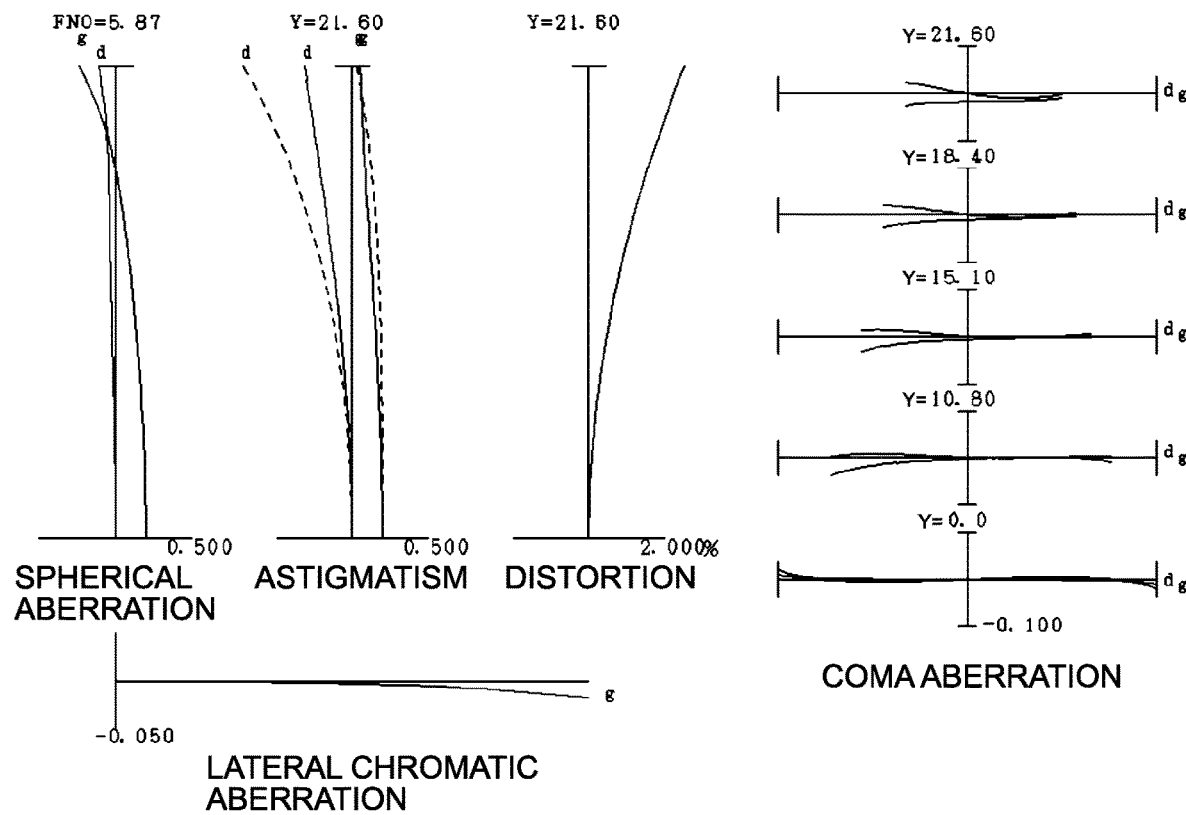
FIG. 24A is graphs showing various aberrations of the zoom optical system according to the fifth example upon focusing on infinity in the telephoto end state.
Figure 24B:
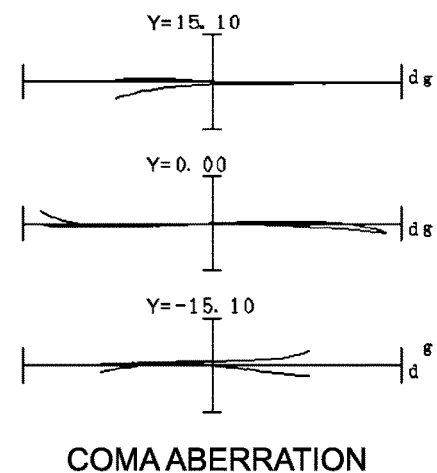
FIG. 24B is graphs showing meridional lateral aberrations when blur correction is applied to a rotational blur by 0.20°.
Figure 25A:
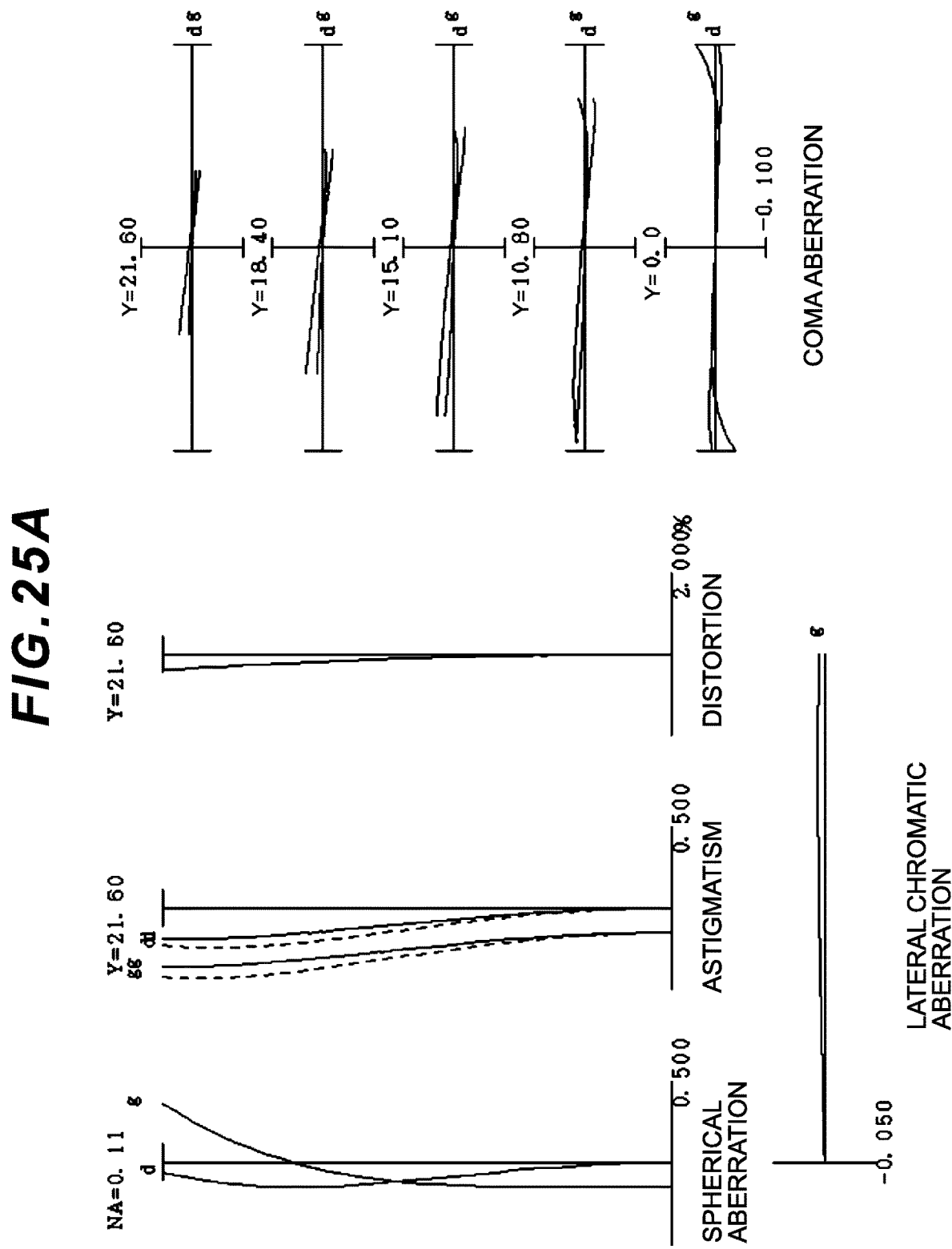

FIGS. 22A and 22B are graphs showing various aberrations of the zoom optical system having a vibration-proof function according to the fifth example upon focusing on infinity in the wide-angle end state, and graphs showing meridional lateral aberrations when blur correction is applied to a rotational blur by 0.30°, respectively. FIG. 23 is graphs showing various aberrations of the zoom optical system having the vibration-proof function according to the fifth example upon focusing on infinity in the intermediate focal length state. FIGS. 24A and 24B are graphs showing various aberrations of the zoom optical system having a vibration-proof function according to the fifth example upon focusing on infinity in the telephoto end state, and graphs showing meridional lateral aberrations when blur correction is applied to a rotational blur by 0.20°, respectively. FIGS. 25A, 25B and 25C are graphs showing various aberrations of the zoom optical system according to the fifth example upon focusing on a short distant object in the wide-angle end state, the intermediate focal length state, and the telephoto end state, respectively.

The graphs showing various aberrations show that the zoom optical system according to fifth example favorably corrects the various aberrations and has excellent image forming performances from the wide-angle end state to the telephoto end state, and further has excellent image forming performances also upon focusing on a short distant object.

Sixth Example

The sixth example is described with reference to FIGS. 26 to 30 and Table 6. FIG. 26 shows a lens configuration of a zoom optical system according to the sixth example of this embodiment. The zoom optical system ZL(6) according to the sixth example consists of, in order from the object: a first lens group G1 having a positive refractive power; a second lens group G2 having a negative refractive power; a third lens group G3 having a positive refractive power; a fourth lens group G4 having a negative refractive power; and a fifth lens group G5 having a positive refractive power. Upon zooming from the wide-angle end state (W) to the telephoto end state (T), the first to fifth lens groups G1 to G5 move in the directions indicated by the respective arrows in FIG. 26. In this example, the fourth lens group G4 and the fifth lens group G5 constitute the subsequent lens group GR.

The first lens group G1 consists of, in order from the object: a positive cemented lens consisting of a negative meniscus lens L11 having a convex surface facing the object, and a positive biconvex lens L12; and a positive meniscus lens L13 having a convex surface facing the object.

The second lens group G2 consists of, in order from the object: a positive biconvex lens L21; a negative biconcave lens L22; a positive meniscus lens L23 having a convex surface facing the object; and a negative cemented lens consisting of a negative biconcave lens L24, and a positive meniscus lens L25 having a convex surface facing the object.

The third lens group G3 consists of, in order from the object: a positive biconvex lens L31; a positive cemented lens consisting of a positive biconvex lens L32 and a negative biconcave lens L33; an aperture stop S; and a positive cemented lens consisting of a negative meniscus lens L34 having a convex surface facing the object, and a positive biconvex lens L35.

The fourth lens group G4 consists of, in order from the object: a positive biconvex lens L41; and a negative biconcave lens L42.

The fifth lens group G5 consists of, in order from the object: a negative meniscus lens L51 having a concave surface facing the object; and a positive meniscus lens L52 having a convex surface facing the object. An image surface I is disposed to the image side of the fifth lens group G5.

In the zoom optical system ZL(6) according to the sixth example, the entire fourth lens group G4 constitutes the focusing lens group, and focusing from a long distant object to a short distant object is performed by moving the entire fourth lens group G4 in the image surface direction. In the zoom optical system ZL(6) according to the sixth example, the negative cemented lens, which consists of the negative lens L24 and the positive meniscus lens L25 of the second lens group G2, constitutes the vibration-proof lens group movable in a direction perpendicular to the optical axis, and corrects the imaging position displacement (image blur on the image surface I) due to a camera shake or the like.

Note that to correct a rotational blur with an angle θ at a lens having the focal length f of the entire system and a vibration proof coefficient K (the ratio of the amount of image movement on the image forming surface to the amount of movement of the movable lens group upon blur correction), the movable lens group for blur correction is moved in a direction orthogonal to the optical axis by (f·tan θ)/K. In the wide-angle end state in the sixth example, the vibration proof coefficient is 1.01, and the focal length is 72.1 mm. Accordingly, the amount of movement of the vibration-proof lens group to correct a rotational blur by 0.30° is 0.37 mm. In the telephoto end state in the sixth example, the vibration proof coefficient is 2.10, and the focal length is 292.0 mm. Accordingly, the amount of movement of the vibration-proof lens group to correct a rotational blur by 0.20° is 0.49 mm.

The following Table 6 lists the values of data on the optical system according to the sixth example.

TABLE 6

[Lens data]

| Surface No. | R | D | nd | vd |
|---|---|---|---|---|
| Object surface | ∞ | | | |
| 1 | 139.3408 | 1.700 | 1.64769 | 33.73 |
| 2 | 77.5654 | 9.455 | 1.49700 | 81.73 |
| 3 | −496.0322 | 0.200 | | |
| 4 | 144.5249 | 3.734 | 1.48749 | 70.31 |
| 5 | 357.2933 | Variable | | |
| 6 | 142.3498 | 3.303 | 1.84666 | 23.80 |
| 7 | −361.0297 | 1.824 | | |
| 8 | −451.3220 | 1.300 | 1.83400 | 37.18 |
| 9 | 33.3045 | 7.193 | | |
| 10 | 35.8308 | 3.147 | 1.71736 | 29.57 |
| 11 | 69.2532 | 4.718 | | |
| 12 | −63.1663 | 1.000 | 1.66755 | 41.87 |
| 13 | 34.7105 | 3.239 | 1.80518 | 25.45 |
| 14 | 102.2323 | Variable | | |
| 15 | 73.7312 | 3.697 | 1.77250 | 49.62 |
| 16 | −95.2978 | 0.200 | | |
| 17 | 33.5557 | 5.512 | 1.49700 | 81.73 |
| 18 | −68.5312 | 1.200 | 1.90366 | 31.27 |
| 19 | 129.3820 | 1.534 | | |
| 20 | ∞ | 17.193 | | (Stop S) |
| 21 | 40.0826 | 1.200 | 1.85026 | 32.35 |
| 22 | 17.3868 | 5.268 | 1.56732 | 42.58 |
| 23 | −141.3282 | Variable | | |
| 24 | 297.2824 | 2.624 | 1.64769 | 33.73 |
| 25 | −42.2438 | 0.835 | | |
| 26 | −48.9103 | 1.000 | 1.77250 | 49.62 |
| 27 | 31.0082 | Variable | | |
| 28 | −22.3095 | 1.300 | 1.69680 | 55.52 |
| 29 | −31.0148 | 0.200 | | |
| 30 | 73.8865 | 3.135 | 1.80100 | 34.92 |
| 31 | 3043.5154 | BF | | |
| Image surface | ∞ | | | |

[Various data]
Zooming ratio 4.05

| | W | M | T |
|---|---|---|---|
| f | 72.1 | 100.0 | 292.0 |
| FNO | 4.65 | 4.93 | 5.88 |
| 2ω | 33.24 | 23.86 | 8.28 |
| Ymax | 21.60 | 21.60 | 21.60 |
| TL | 192.32 | 206.35 | 244.34 |
| BF | 38.32 | 42.77 | 60.32 |

[Variable distance data]

| | W Infinity | M Infinity | T Infinity | W Short distance | M Short distance | T Short distance |
|---|---|---|---|---|---|---|
| d5 | 2.000 | 22.642 | 74.835 | 2.000 | 22.642 | 74.835 |
| d14 | 44.818 | 33.757 | 2.000 | 44.818 | 33.757 | 2.000 |
| d23 | 2.000 | 3.329 | 2.024 | 2.604 | 4.116 | 3.661 |
| d27 | 19.472 | 18.143 | 19.448 | 18.869 | 17.356 | 17.812 |

[Lens group data]

| Group | Starting surface | Focal Length |
|---|---|---|
| G1 | 1 | 176.000 |
| G2 | 6 | −42.283 |
| G3 | 15 | 38.971 |
| G4 | 24 | −44.470 |
| G5 | 28 | 381.600 |

[Conditional expression corresponding value]

Conditional Expression (1) f1/(−f2) = 4.162
Conditional Expression (2) f1/f3 = 4.516
Conditional Expression (3) (−fF)/f1 = 0.253
Conditional Expression (4) (−f2)/f3 = 1.085
Conditional Expression (5) nN/nP = 0.924
Conditional Expression (6) vN/vP = 1.645
Conditional Expression (7) (−fN)/fP = 1.286

Figure 27A:
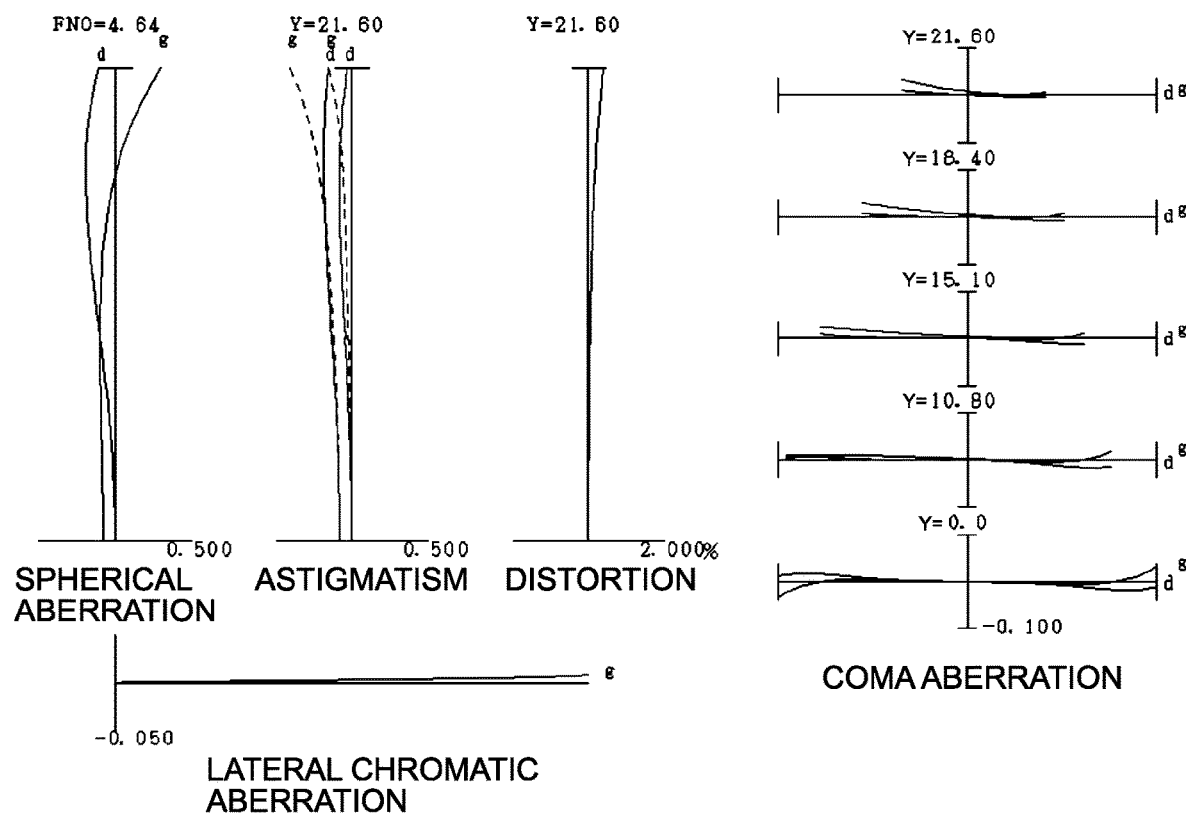
FIG. 27A is graphs showing various aberrations of the zoom optical system according to the sixth example upon focusing on infinity in the wide-angle end state.
Figure 27B:
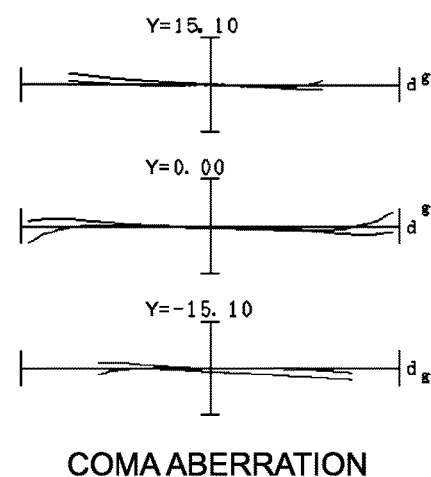
FIG. 27B is graphs showing meridional lateral aberrations when blur correction is applied to a rotational blur by 0.30°.
Figure 28:
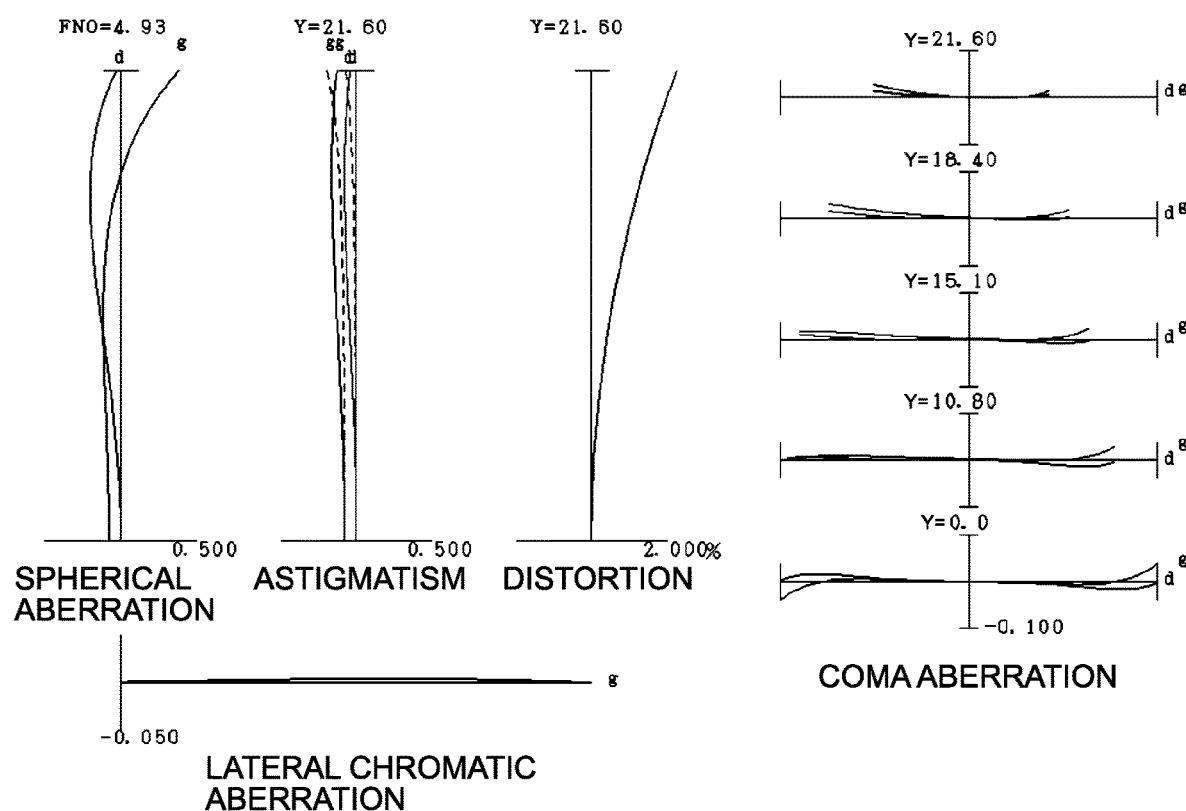
FIG. 28 is graphs showing various aberrations of the zoom optical system according to the sixth example upon focusing on infinity in the intermediate focal length state.
Figure 29A:
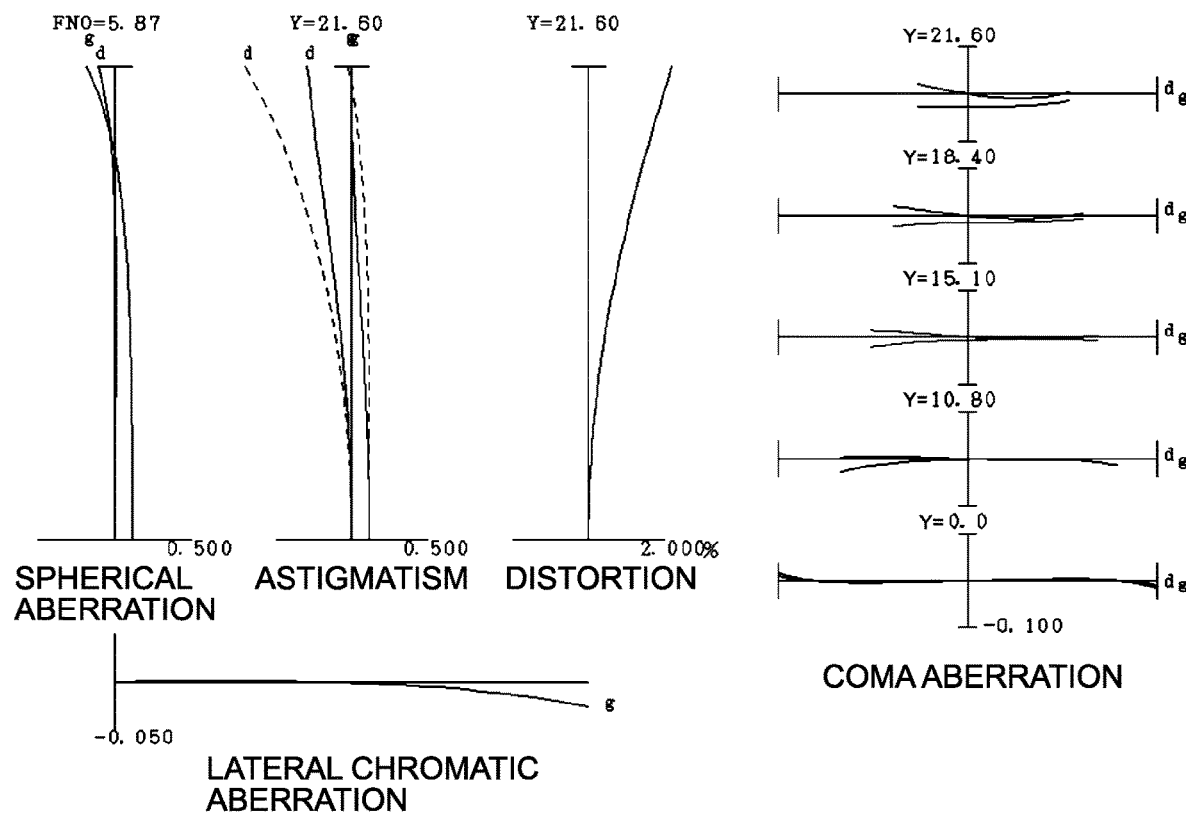
FIG. 29A is graphs showing various aberrations of the zoom optical system according to the sixth example upon focusing on infinity in the telephoto end state.
Figure 29B:
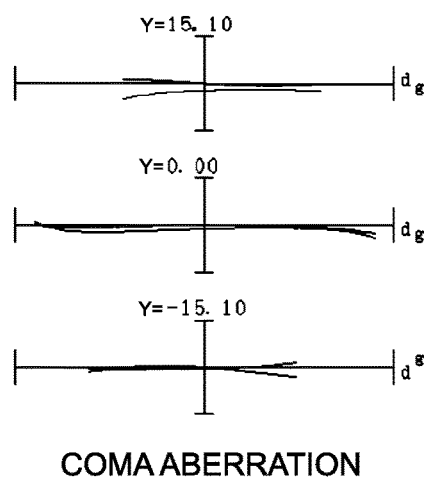
FIG. 29B is graphs showing meridional lateral aberrations when blur correction is applied to a rotational blur by 0.20°.
Figure 30A:
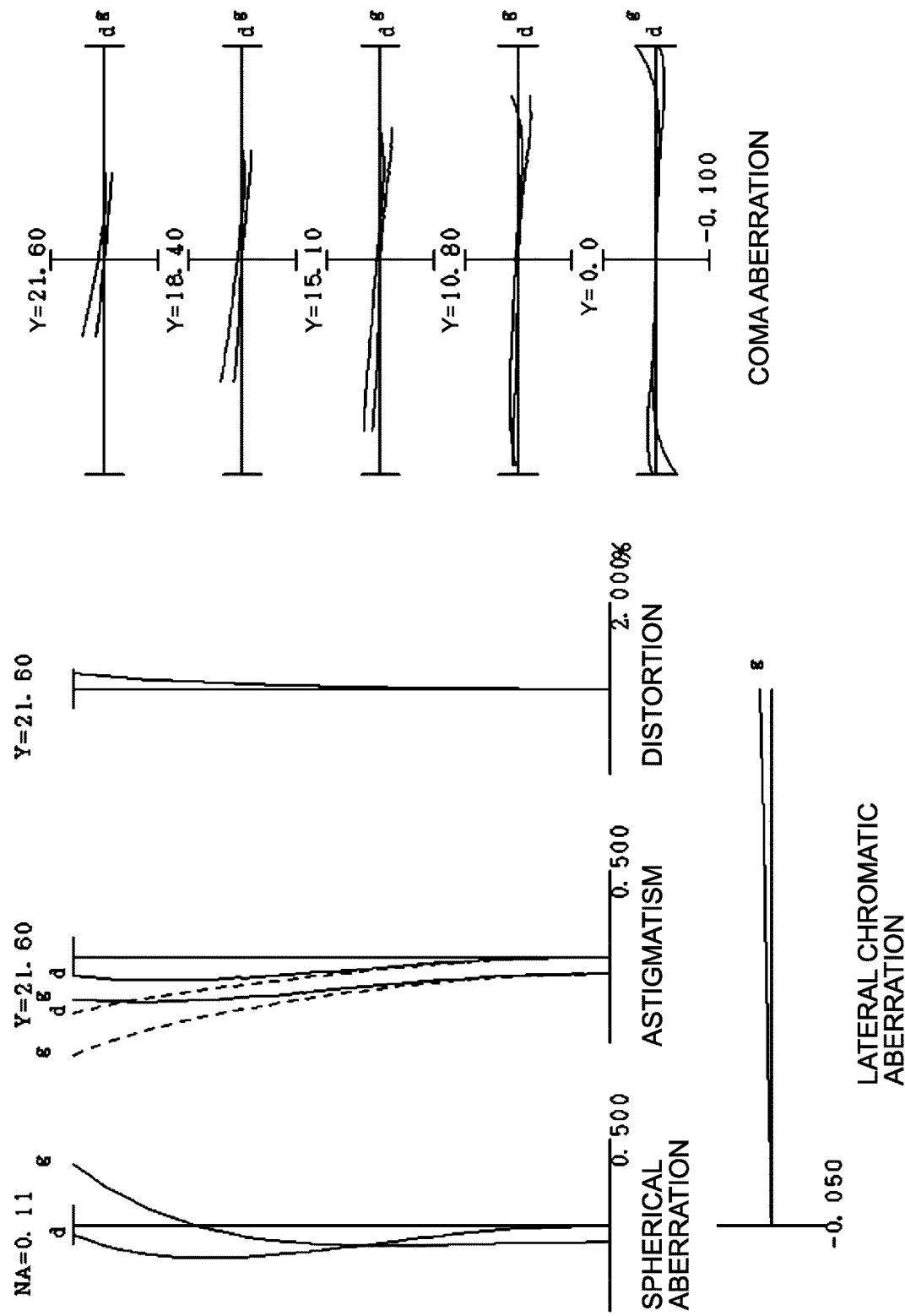

FIGS. 27A and 27B are graphs showing various aberrations of the zoom optical system having a vibration-proof function according to the sixth example upon focusing on infinity in the wide-angle end state, and graphs showing meridional lateral aberrations when blur correction is applied to a rotational blur by 0.30°, respectively. FIG. 28 is graphs showing various aberrations of the zoom optical system having the vibration-proof function according to the sixth example upon focusing on infinity in the intermediate focal length state. FIGS. 29A and 29B are graphs showing various aberrations of the zoom optical system having a vibration-proof function according to the sixth example upon focusing on infinity in the telephoto end state, and graphs showing meridional lateral aberrations when blur correction is applied to a rotational blur by 0.20°, respectively. FIGS. 30A, 30B and 30C are graphs showing various aberrations of the zoom optical system according to the sixth example upon focusing on a short distant object in the wide-angle end state, the intermediate focal length state, and the telephoto end state, respectively.

The graphs showing various aberrations show that the zoom optical system according to sixth example favorably corrects the various aberrations and has excellent image forming performances from the wide-angle end state to the telephoto end state, and further has excellent image forming performances also upon focusing on a short distant object.

According to each of the examples described above, reduction in size and weight of the focusing lens group can achieve high-speed AF (auto focus) and silence during AF without increasing the size of the lens barrel, and the zoom optical system can be achieved that favorably suppresses variation of aberrations upon zooming from the wide-angle end state to the telephoto end state, and variation of aberrations upon focusing from an infinite distant object to a short distant object.

Here, each of the examples described above represents a specific example of the invention of the present application. The invention of the present application is not limited thereto.

Note that the following details can be appropriately adopted in a range without impairing the optical performance of the zoom optical system of this embodiment.

The four-group configurations and the five-group configurations have been described as the numeric examples of the zoom optical systems of this embodiment. However, the present application is not limited thereto. Zoom optical systems having other group configurations (for example, six-group ones and the like) can also be configured. Specifically, a zoom optical system having a configuration where a lens or a lens group is added to the zoom optical system of this embodiment at a position nearest to the object or to the image surface may be configured. Note that the lens group indicates a portion that has at least one lens and is separated by air distances varying upon zooming.

Note that the focusing lens group indicates a portion that has at least one lens and is separated by air distances varying upon focusing. That is, a focusing lens group may be adopted that achieves focusing from the infinite distant object to the short distant object by moving one or more lens groups or the partial lens group in the optical axis direction. The focusing lens group is applicable also to autofocus, and is suitable also to motor drive for autofocus (using an ultrasonic motor or the like).

In each example of the zoom optical system of this embodiment, the configuration having the vibration-proof function is described. However, the present application is not limited thereto. A configuration having no vibration-proof function can be adopted.

The lens surface may be formed of a spherical surface or a plane surface, or an aspherical surface. A case where the lens surface is a spherical surface or a plane surface facilitates lens processing and assembly adjustment, and can prevent the optical performance from being reduced owing to the errors in processing or assembly adjustment. Consequently, the case is preferable. It is also preferable because reduction in depiction performance is small even when the image surface deviates.

In a case where the lens surface is an aspherical surface, the aspherical surface may be an aspherical surface made by a grinding process, a glass mold aspherical surface made by forming glass into an aspherical shape with a mold, or a composite type aspherical surface made by forming resin provided on the glass surface into an aspherical shape. The lens surface may be a diffractive surface. The lens may be a gradient index lens (GRIN lens) or a plastic lens.

Preferably, the aperture stop is disposed in the third lens group. Alternatively, a lens frame may replace the role without providing a member serving as the aperture stop.

To reduce flares and ghosts and achieve a high contrast optical performance, an antireflection film having a high transmissivity over a wide wavelength range may be applied to each lens surface. This reduces flares and ghosts, and can achieve a high optical performance having a high contrast.

EXPLANATION OF NUMERALS AND CHARACTERS

| G1 | First lens group | G2 | Second lens group |
| G3 | Third lens group | G4 | Fourth lens group |
| G5 | Fifth lens group | | |
| GR | Subsequent lens group | | |
| I | Image surface | S | Aperture stop |

The invention claimed is:

1. A zoom optical system comprising, in order from an object:
a first lens group having a positive refractive power;
a second lens group having a negative refractive power;
a third lens group having a positive refractive power; and
a subsequent lens group, wherein
the subsequent lens group comprises, in order from the object, a fourth lens group having a negative refractive power and a fifth lens group having a positive refractive power,
upon zooming, the first to the fifth lens groups each move along an optical axis, a distance between the first lens group and the second lens group changes, a distance between the second lens group and the third lens group changes, and a distance between the third lens group and the subsequent lens group changes,
the subsequent lens group comprises a focusing lens group that moves upon focusing, the focusing lens group being the most object side lens group in the subsequent lens group, and
following conditional expressions are satisfied, $$3.70 < f1/(-f2) < 4.80$$

$$3.20 < f1/f3 < 4.60$$

where f1: a focal length of the first lens group,
f2: a focal length of the second lens group, and
f3: a focal length of the third lens group.

2. The zoom optical system according to claim 1, wherein a following conditional expression is satisfied, $$0.18 < (-fF)/f1 < 0.30$$

where fF: a focal length of the focusing lens group.

3. The zoom optical system according to claim 1, wherein a following conditional expression is satisfied, $$0.84 < (-f2)/f3 < 1.20.$$

4. The zoom optical system according to claim 1, wherein upon zooming from a wide-angle end state to a telephoto end state, the first lens group moves toward the object.

5. The zoom optical system according to claim 1, wherein the focusing lens group comprises:
at least one lens having a positive refractive power; and
at least one lens having a negative refractive power.

6. The zoom optical system according to claim 1, wherein the second lens group comprises a vibration-proof lens group movable so as to have a displacement component in a direction perpendicular to an optical axis in order to correct an image blur.

7. The zoom optical system according to claim 6, wherein the vibration-proof lens group consists of, in order from the object:
a lens having a negative refractive power; and
a lens having a positive refractive power.

8. The zoom optical system according to claim 7, wherein a following conditional expression is satisfied, $$0.80 < nN/nP < 1.00$$

where nN: a refractive index of the lens having the negative refractive power in the vibration-proof lens group, and
nP: a refractive index of the lens having the positive refractive power in the vibration-proof lens group.

9. The zoom optical system according to claim 7, wherein a following conditional expression is satisfied, $$1.20 < vN/vP < 2.40$$

where vN: an Abbe number of the lens having the negative refractive power in the vibration-proof lens group, and
vP: an Abbe number of the lens having the positive refractive power in the vibration-proof lens group.

10. The zoom optical system according to claim 1, wherein
the subsequent lens group comprises:
a lens that is disposed to the image side of the focusing lens group, and has a negative refractive power; and
a lens that is disposed to the image side of the lens having the negative refractive power, and has a positive refractive power.

11. The zoom optical system according to claim 10, wherein
a following conditional expression is satisfied, $$0.70 < (-fN)/fP < 2.00$$

where fN: a focal length of the lens that is disposed to the image side of the focusing lens group and has the negative refractive power, and
fP: a focal length of the lens that is disposed to the image side of the lens having the negative refractive power, and has the positive refractive power.

12. An optical apparatus comprising:
the zoom optical system according to claim 1; and
a lens barrel holding the zoom optical system.

13. An imaging apparatus comprising:
the zoom optical system according to claim 1; and
an imaging unit that takes an image formed by the zoom optical system.

14. A method for manufacturing a zoom optical system comprising, in order from an object:
a first lens group having a positive refractive power;
a second lens group having a negative refractive power;
a third lens group having a positive refractive power; and
a subsequent lens group, wherein the method comprises:
arranging the lens groups in a lens barrel such that, upon zooming, a distance between the first lens group and the second lens group changes, a distance between the second lens group and the third lens group changes, and a distance between the third lens group and the subsequent lens group changes, and
configuring the subsequent lens group to include a focusing lens group that moves upon focusing, the focusing lens group being the most object side lens group in the subsequent lens group,
the method further comprises:
configuring the subsequent lens group to include, in order from the object, a fourth lens group having a negative refractive power and a fifth lens group having a positive refractive power,
arranging the lens groups in the lens barrel such that, upon zooming, the first to the fifth lens groups each move along an optical axis, and satisfying following conditional expressions, $$3.70 < f1/(-f2) < 4.80$$

$$3.20 < f1/f3 < 60$$

where f1: a focal length of the first lens group,
f2: a focal length of the second lens group, and
f3: a focal length of the third lens group.

* * * * *